(12) United States Patent
Beauregard et al.

(10) Patent No.: US 12,306,081 B2
(45) Date of Patent: May 20, 2025

(54) APPARATUSES AND METHODS FOR FORMATION OF PARTICLES

(71) Applicant: SIGILON THERAPEUTICS, INC., Cambridge, MA (US)

(72) Inventors: Michael Beauregard, Boston, MA (US); Faith C. David-Hegerich, Providence, RI (US); John Patrick Golden, Providence, RI (US); Joseph Gordon, Providence, RI (US); Erika Ellen Johnston, Cambridge, MA (US); Robert James Miller, East Bridgewater, MA (US); Justin David Morse, Providence, RI (US); Peter Calvin Costello, Providence, RI (US)

(73) Assignee: SIGILON THERAPEUTICS, INC., Cambridge, MA (US)

( * ) Notice: Subject to any disclaimer, the term of this patent is extended or adjusted under 35 U.S.C. 154(b) by 289 days.

(21) Appl. No.: 17/782,368

(22) PCT Filed: Dec. 4, 2020

(86) PCT No.: PCT/US2020/063465
§ 371 (c)(1),
(2) Date: Jun. 3, 2022

(87) PCT Pub. No.: WO2021/113751
PCT Pub. Date: Jun. 10, 2021

(65) Prior Publication Data
US 2023/0008121 A1 Jan. 12, 2023

Related U.S. Application Data

(60) Provisional application No. 62/943,533, filed on Dec. 4, 2019.

(51) Int. Cl.
*G01N 1/31* (2006.01)
*B01D 43/00* (2006.01)
(Continued)

(52) U.S. Cl.
CPC .............. *G01N 1/31* (2013.01); *B01D 43/00* (2013.01); *B01J 2/02* (2013.01); *B01J 2/04* (2013.01);
(Continued)

(58) Field of Classification Search
CPC ...... G01N 1/31; G01N 35/1097; B01D 43/00; B01J 2/04; B01J 2/02; B01J 13/08; B01J 2/046; B01J 13/14
See application file for complete search history.

(56) References Cited

U.S. PATENT DOCUMENTS 5,643,594 A * 7/1997 Dorian ..................... B01J 2/003
425/804
6,451,091 B1 9/2002 Avina
(Continued)

FOREIGN PATENT DOCUMENTS

| WO | 2012/167223 A1 | 12/2012 |
| WO | 2014/153126 A1 | 9/2014 |
| WO | 2019/195055 A1 | 10/2019 |

OTHER PUBLICATIONS

International Search Report and Written Opinion for Application No. PCT/2020/063465 mailed Apr. 14, 2021.

*Primary Examiner* — Helen C Kwok
(74) *Attorney, Agent, or Firm* — Lando & Anastasi, LLP

(57) ABSTRACT

Described herein are apparatuses and methods for conditioning particles. In some embodiments, the apparatuses and methods are configured for first-in-first-out transit of particles through a chamber containing a conditioning fluid. In some embodiments, the apparatuses and methods of the
(Continued)

present disclosure enable the manufacture of particle preparations containing large quantities of particles (e.g., cell-containing particles) with more consistent and improved properties relative to alternative manual processes.

29 Claims, 29 Drawing Sheets

(51) Int. Cl.
  *B01J 2/02* (2006.01)
  *B01J 2/04* (2006.01)
  *B01J 13/04* (2006.01)
  *B01J 13/08* (2006.01)
  *B01J 13/14* (2006.01)
  *G01N 35/10* (2006.01)

(52) U.S. Cl.
  CPC ............ *B01J 13/046* (2013.01); *B01J 13/08* (2013.01); *B01J 13/14* (2013.01); *G01N 35/1097* (2013.01)

(56) References Cited

U.S. PATENT DOCUMENTS

| | | |
|---|---|---|
| 9,422,373 B2 | 8/2016 | Vegas et al. |
| 9,555,007 B2 | 1/2017 | Ma et al. |
| 10,172,791 B2 | 1/2019 | Ma et al. |
| 10,285,949 B2 | 5/2019 | Vegas et al. |
| 10,292,936 B2 | 5/2019 | Vegas et al. |
| 10,786,446 B2 | 9/2020 | Ma et al. |
| 10,835,486 B2 | 11/2020 | Ma et al. |
| 10,842,753 B2 | 11/2020 | Vegas et al. |
| 11,337,930 B2 | 5/2022 | Vegas et al. |
| 2003/0148531 A1* | 8/2003 | Hatcher ................ B01L 3/0268 436/63 |
| 2014/0000513 A1 | 1/2014 | Leonard et al. |
| 2016/0266027 A1* | 9/2016 | Muraki .................... B07C 5/342 |
| 2019/0218594 A1 | 7/2019 | Abate et al. |
| 2021/0145759 A1 | 5/2021 | Barney et al. |

* cited by examiner

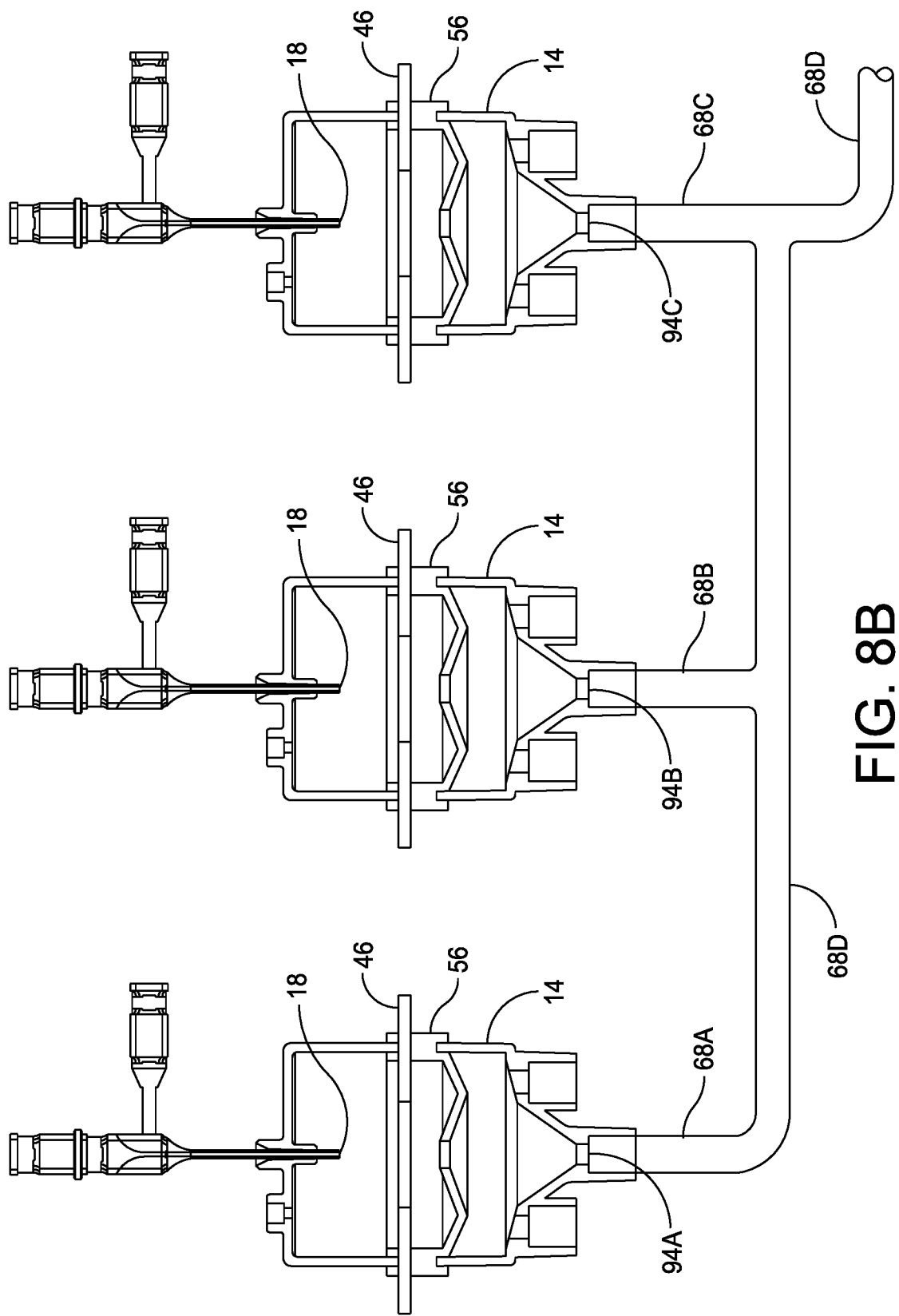

APPARATUSES AND METHODS FOR FORMATION OF PARTICLES

CLAIM OF PRIORITY

This application is a U.S. National Phase Application under 35 U.S.C. § 371 of International Application No. PCT/US2020/063465, filed Dec. 4, 2020, which claims priority to U.S. Provisional Application No. 62/943,533, filed Dec. 4, 2019, the disclosure of which is incorporated herein by reference in its entirety.

BACKGROUND

Production of particles for a variety of purposes, e.g., implantation into hosts of particles encapsulating cells, is typically done by batch processing and often includes manual control of process parameters. There is a need for new methods that eliminate manual control of each step to, e.g., optimize the production processes for manufacturing.

SUMMARY

The particle formation apparatuses and methods described herein can provide advantages over prior art methods of processing of particles in one or more conditioning fluids to provide conditioned particles (e.g., adding droplets of alginate solution to cross-linking solution to form cross-linked alginate hydrogel particles followed by collecting and washing the particles). Apparatuses and methods described herein minimize or eliminate manual control and can be less resource intensive. Apparatuses and methods described herein can increase the speed of manufacturing, while optimizing or providing improved yield of particles and more uniformity of their properties, e.g., particle size and shape, particle strength, and encapsulated cell number. Additionally, apparatuses and methods of the present disclosure can minimize the amount of stress that cells are exposed to when preparing conditioned particles encapsulating cells. In an embodiment, the apparatuses and methods described herein expose particles to conditioning fluids for at least substantially the same amount of time and replenish the conditioning fluids over time during a process run.

In one aspect, the present disclosure features an apparatus (e.g. an apparatus exemplified by FIG. 1) for making conditioned particles comprising: a) a particle dispensing unit comprising an orifice from which particles are dispensed; and b) a conditioning chamber configured to hold a first fluid, e.g., a conditioning fluid, to present a receiving surface of the first fluid, and to receive particles from the particle dispensing unit. In an embodiment, the apparatus further comprises a property selected from i) to x):

i) the apparatus is configured to separate particles from one another based on an attribute of the particles, e.g., to separate a particle of a first class (a first class particle) from a particle of a second class (a second class particle): i.a) the apparatus is configured to separate a particle of a first class from a particle of a second class after particle dispensation but prior to the dispensed particle impinging on the receiving surface of the first fluid, e.g., conditioning fluid, disposed in the conditioning chamber, and comprises a capture element disposed between the orifice and receiving surface and configured to and to hinder, e.g., by capture, a second class particle from impinging on the receiving surface of the first fluid; or i.b) the apparatus comprises a filter element, e.g., a sieve, for fractionation, e.g., size fractionation, of conditioned particles, disposed, e.g., in an exchange unit;

ii) a component of the apparatus, e.g., the particle dispensing unit, is configured to receive a signal, e.g., a signal related to a particle parameter or a process parameter, and responsive to that signal modulate the process parameter or the particle parameter: ii.a) the apparatus is configured such that responsive to a signal, e.g., a signal which is a function of a particle parameter, e.g., size or shape, a field through which the particle passes, is modulated; or ii.b) the apparatus is configured to sense a distance from the orifice to the receiving surface of the first fluid in the conditioning chamber (e.g. the sensor, such as a non-contact sensor or a contact sensor) may sense a height of the orifice of the dispensing unit or a height of the receiving surface in the conditioning chamber) and to change that distance, e.g., to match a reference, e.g., a desired distance (e.g. the apparatus is configured to change a pressure or a partial pressure of a displacement entity, such as a gas, in the conditioning chamber);

iii) the apparatus includes one or more sensors for sensing a parameter, such as an attribute of one or more particles or a parameter of a fluid;

iv) the orifice and the receiving surface are disposed within a housing wherein the housing comprises a port in connection with a source of displacement entity, e.g., a gas, e.g., a pressurized gas, e.g., pressurized air, $O_2$, $N_2$, or a mixture thereof, or a liquid, and the housing is configured such that the distance between a receiving surface of the first fluid and the orifice is capable of being modulated by modulating the volume of displacement entity within the chamber;

v) the conditioning chamber comprises, in fluid connection, a portion configured to present the receiving surface and an exit portal, configured such that a received particle, e.g., wherein a fluid comprising a received particle, flows through the conditioning chamber and through the exit portal;

vi) the apparatus comprises a source of the first fluid, e.g., a first-fluid reservoir, in fluid connection with a first-fluid inlet port on the conditioning chamber and the apparatus is configured so as to allow introduction of the first fluid, e.g., fresh first fluid, through the first-fluid inlet port into the conditioning chamber vii) a portion, or all, of the conditioning chamber beneath the receiving surface is configured to provide a substantially linear path for conditioned particles transiting it, such that the residence time of conditioned particles in the conditioning chamber are substantially similar;

viii) the apparatus comprises an exchange unit in fluid connection with the exit portal of the conditioning chamber in which conditioned particles are separated from the first fluid (e.g. by introduction of a second fluid, optionally with one or more exchange units such as 106a and/or 106b);

ix) the apparatus comprises a plurality of exchange units selectively connectable to other elements of the apparatus to allow an exchange unit of the plurality to be in-line or off-line, e.g., the apparatus can be configured to take an exchange unit off-line or on-line responsive to an attribute of the particle or plurality of particles; and x) the apparatus is configured such that the orifice, the receiving surface of the first fluid, and optionally a voltage potential through which the dispensed particles pass, are disposed within a housing that can maintain sterility.

In an embodiment, the first orifice and the second orifice are configured to produce a particle comprising a first compartment (e.g., a core) and a second compartment (e.g., layer) surrounding the first compartment (e.g., core). In an embodiment, the particle dispensing unit comprises a second orifice and a third orifice. In an embodiment, the particle dispensing unit is configured to receive a signal related to a particle attribute and, responsive to that signal, modulate a particle attribute or process parameter, e.g., the rate of particle dispensation.

In an embodiment, the conditioning chamber comprises a plurality of subcomponents (e.g. features 64, 66). In an embodiment, the conditioning chamber comprises, in the direction of fluid flow through the apparatus, at least one of (i) a proximal subcomponent (e.g. feature 64) and (ii) a distal subcomponent (e.g. feature 66). In an embodiment, the conditioning chamber comprises a funnel element (e.g., feature 66) that has an inner surface that is configured to: (i) minimize swirling of particles within the funnel element a predetermined residence time; and/or (ii) cause particles to transit the funnel element substantially along a predetermined path through the funnel element at a predetermined rate.

In an embodiment, the apparatus further comprises a sensor configured to monitor the pressure at a point above the receiving surface.

In an embodiment, the exchange unit (e.g. feature 106a or 106b) comprises: (i) an exchange unit inlet portal (e.g. at the first inlet 112) configured to receive inlet flow of a fluid comprising first fluid and conditioned particles; (ii) an exchange unit exit portal (e.g. at particle outlet segment 120) configured to allow fluid comprising a second fluid, e.g., subsequent conditioning fluid, and conditioned particles and having a reduced level of first fluid or a component thereof (compared with the inlet flow), to exit the exchange unit; (iii) a first fluid exit portal (e.g. at discharge segment 124) configured to allow exit from the exchange unit of first fluid in which the concentration of conditioned particles has been reduced; and (iv) a second fluid supply portal (e.g. at second inlet 114) configured to allow a second fluid to enter the exchange unit. In an embodiment, the exchange unit is configured to allow a flow of fluid comprising first fluid and conditioned particles to flow into the exchange unit through the exchange unit inlet portal and to impinge on a flow of second fluid, e.g., subsequent conditioning fluid, flowing into the exchange unit through the a second fluid supply portal and produce a post-impingement flow comprising a second fluid and conditioned particles and having reduced level of first fluid or a component thereof to flow through the exchange unit exit portal.

In an embodiment, the apparatus is configured to separate a first particle of a first class of particle from a second particle of a second class of particle after dispensation but prior to impinging on the receiving surface of the conditioning fluid. In an embodiment, the first class of particle differs from the second class of particle by size, e.g., average largest dimension or diameter.

In another aspect, the present disclosure features a method of making a plurality of conditioned particles comprising pumping at least two particle forming fluids to a dispensing port; causing each particle to move from the dispensing port towards a receiving surface of a first conditioning fluid in a conditioning chamber; and at least one of:

i) separating particles from one another based on a property of the particles, e.g., to separate a particle of a first class (a first class particle) from a particle of a second class (a second class particle), e.g., i.a) separating a particle of a first class from a particle of a second class after particle dispensation but prior to the dispensed particle impinging on the receiving surface of the first conditioning fluid disposed in the conditioning chamber, and comprises a capture element disposed between the orifice and receiving surface and configured and to hinder, e.g., by capture, a second class particle from impinging on the receiving surface of the first fluid; or i.b) filtering particles received by the conditioning fluid (e.g., conditioned particles), e.g. by a filter element, e.g., a sieve, for fractionation, e.g., size fractionation, of conditioned particles, disposed, e.g., in an exchange unit;

ii) receiving a signal, e.g., a signal related to a particle parameter or a process parameter, and responsive to that signal modulating a process parameter or a particle parameter, e.g., ii.a) responsive to a signal, e.g., a signal which is a function of a particle parameter, e.g., size or shape, modulating a field through which the particle passes; ii.b) sensing a distance from the orifice to the receiving surface of the conditioning fluid in the conditioning chamber (e.g. the sensor (such as a non-contact sensor or a contact sensor) may sense a height of the orifice of the dispensing unit or a height of the receiving surface in the conditioning chamber) and the apparatus is configured to change that distance to match a desired distance (e.g. the apparatus is configured to change a pressure or a partial pressure of a displacement entity, such as a gas, in the conditioning chamber);

iii.) sensing a parameter, such as a parameter of one or more particles or a parameter of a fluid;

iv) modulating a distance between the receiving surface of the first conditioning fluid and the orifice by modulating a volume of a displacement entity e.g., a gas, e.g., a pressurized gas, e.g., pressurized air, $O_2$, $N_2$, or a mixture thereof, or a liquid, in the chamber;

v) directing flow of a received particle, e.g., can flow though the conditioning chamber and through an exit portal in the conditioning chamber;

vi) introducing a first fluid, e.g., fresh first fluid, through a first fluid inlet port into the conditioning chamber;

vii) providing a substantially linear path for conditioned particles transiting the conditioning chamber;) such that the residence time of conditioned particles in the conditioning chamber are substantially similar;

viii) separating conditioned particles from the first conditioning fluid in an exchange unit;

ix) providing a plurality of exchange units connected in series and selectively connecting or disconnecting an exchange unit of the plurality, e.g. setting the exchange unit to be one of in-line and off-line, e.g., the apparatus can be configured to take an exchange unit off-line or on-line; and x) maintaining sterility of the orifice, the receiving surface of the conditioning fluid, and optionally a housing having a voltage potential through which the dispensed particles pass.

In another aspect, the present disclosure features a preparation of particles prepared by an apparatus described herein.

The details of one or more embodiments of the invention are set forth herein. Other features, objects, and advantages of the invention will be apparent from the Detailed Description, the Figures, the Examples, and the Claims.

In another aspect, the present disclosure features an apparatus (e.g. an apparatus exemplified by FIG. 1 or FIG. 9) for making conditioned particles comprising:

a) a particle dispensing unit comprising an orifice from which particles, e.g. droplets comprising a polymer fluid, e.g., particles comprising a plurality of cells, e.g., suspended in the polymer fluid, are dispensed;

b) a conditioning chamber configured to hold a first fluid, e.g., a conditioning fluid, to present a receiving surface of the first fluid, and to receive particles from the particle dispensing unit; and the apparatus is configured to separate particles from one another based on an attribute of the particles, e.g., to separate a particle of a first class (a first class particle) from a particle of a second class (a second class particle).

In an embodiment, the apparatus is configured to separate a particle of the first class from a particle of the second class after particle dispensation but prior to the dispensed particle impinging on the receiving surface of the first fluid, e.g., conditioning fluid, disposed in the conditioning chamber, and comprises a capture element disposed between the orifice and receiving surface and configured and to hinder, e.g., by capture, a second class particle from impinging on the receiving surface of the first fluid.

In an embodiment, the apparatus comprises a filter element, e.g., a sieve, for fractionation, e.g., size fractionation, of conditioned particles, disposed, e.g., in an exchange unit.

In an embodiment, a component of the apparatus, e.g., the particle dispensing unit, is configured to receive a signal, e.g., a signal related to a particle parameter or a process parameter, and responsive to that signal modulate the process parameter or the particle parameter.

In an embodiment, the apparatus is configured such that responsive to a signal, e.g., a signal which is a function of a particle parameter, e.g., size or shape, a field through which the particle passes, is modulated.

In an embodiment, the orifice and the receiving surface are disposed within a housing wherein the housing comprises a port in connection with a source of displacement entity, e.g., a gas, e.g., a pressurized gas, e.g., pressurized air, $O_2$, $N_2$, or a mixture thereof, or a liquid, and the housing is configured such that the distance between a receiving surface of the first fluid and the orifice is capable of being modulated by modulating the volume of displacement entity within the chamber.

In an embodiment, the apparatus is configured such that the orifice, the receiving surface of the first fluid, and optionally a voltage potential through which the dispensed particles pass, are disposed within a housing that can maintain sterility.

In an embodiment, responsive to a signal related to size from a sensor which is distal to the orifice, e.g., distal to the capture element and proximal to the receiving surface, a parameter, e.g., voltage, of the field is modulated (e.g. via feature 46 and 48).

In an embodiment, responsive to a signal related to particle size or particle droplet rate, a parameter, e.g. voltage, of the field is modulated to cause a change in a dispensing parameter, e.g. dispensed droplet size, rate at which droplets are dispensed, and flight path of the particles after being dispensed.

In an embodiment, the particle dispensing unit comprises a second orifice (e.g. feature 26 and feature 28 being a first and second orifice), in fluid connection with a second particle fluid reservoir for holding a particle component.

In an embodiment, the orifice and the second orifice are disposed co-axially (e.g. feature 26 and feature 28 being a first orifice and a second orifice).

In an embodiment, the first orifice and the second orifice are configured to produce a particle comprising a first compartment (e.g., a core) and a second compartment (e.g., layer) surrounding the first compartment (e.g., core), e.g., a particle comprising a core dispensed from the orifice and an outer layer dispensed from the second orifice (e.g. feature 26 and feature 28 being a first and second orifice).

In an embodiment, the particle dispensing unit comprises a second orifice and a third orifice.

In another aspect, the present disclosure features an apparatus for making conditioned particles comprising:

a) a particle dispensing unit comprising an orifice from which particles are dispensed;

b) a conditioning chamber configured to hold a first fluid to present a receiving surface of the first fluid, and to receive particles from the particle dispensing unit; and a filter element for fractionation of conditioned particles, to separate particles from one another based on an attribute of the particles.

In an embodiment, the filter element is configured to separate a particle of a first class from a particle of a second class.

In an embodiment, the apparatus further comprises an exchange unit that includes the filter element.

In another aspect, the present disclosure features an apparatus (e.g. an apparatus exemplified by FIG. 1 or FIG. 9) for making conditioned particles comprising:

a) a particle dispensing unit comprising an orifice from which particles, e.g. droplets comprising a polymer fluid, e.g., particles comprising a plurality of cells, e.g., suspended in the polymer fluid, are dispensed, the particle dispensing unit including a second orifice (e.g. feature 26 and feature 28 being a first and second orifice), in fluid connection with a second particle fluid reservoir for holding a particle component, the orifice and the second orifice being disposed co-axially (e.g. feature 26 and feature 28 being a first orifice and a second orifice), the particle dispensing unit being configured to receive a signal, e.g., a signal related to a particle parameter or a process parameter, and responsive to that signal modulate the process parameter or the particle parameter;

b) a conditioning chamber configured to hold a first fluid, e.g., a conditioning fluid, to present a receiving surface of the first fluid, and to receive particles from the particle dispensing unit; and a voltage plate positioned between the orifice and the receiving surface of the first fluid; and a controller configured, responsive to a signal related to particle size or particle droplet rate, to modulate a parameter, e.g. voltage, of the field is modulated to cause a change in a dispensing parameter, e.g. dispensed droplet size, rate at which droplets are dispensed, and flight path of the particles after being dispensed.

In an embodiment, the apparatus is configured to separate particles from one another based on an attribute of the particles, e.g., to separate a particle of a first class (a first class particle) from a particle of a second class (a second class particle).

BRIEF DESCRIPTION OF THE DRAWINGS

FIG. 8B is a cross sectional view of a plurality of particle formation units of FIG. 2;

LIST OF FEATURES IN THE DRAWINGS

Figure 1:
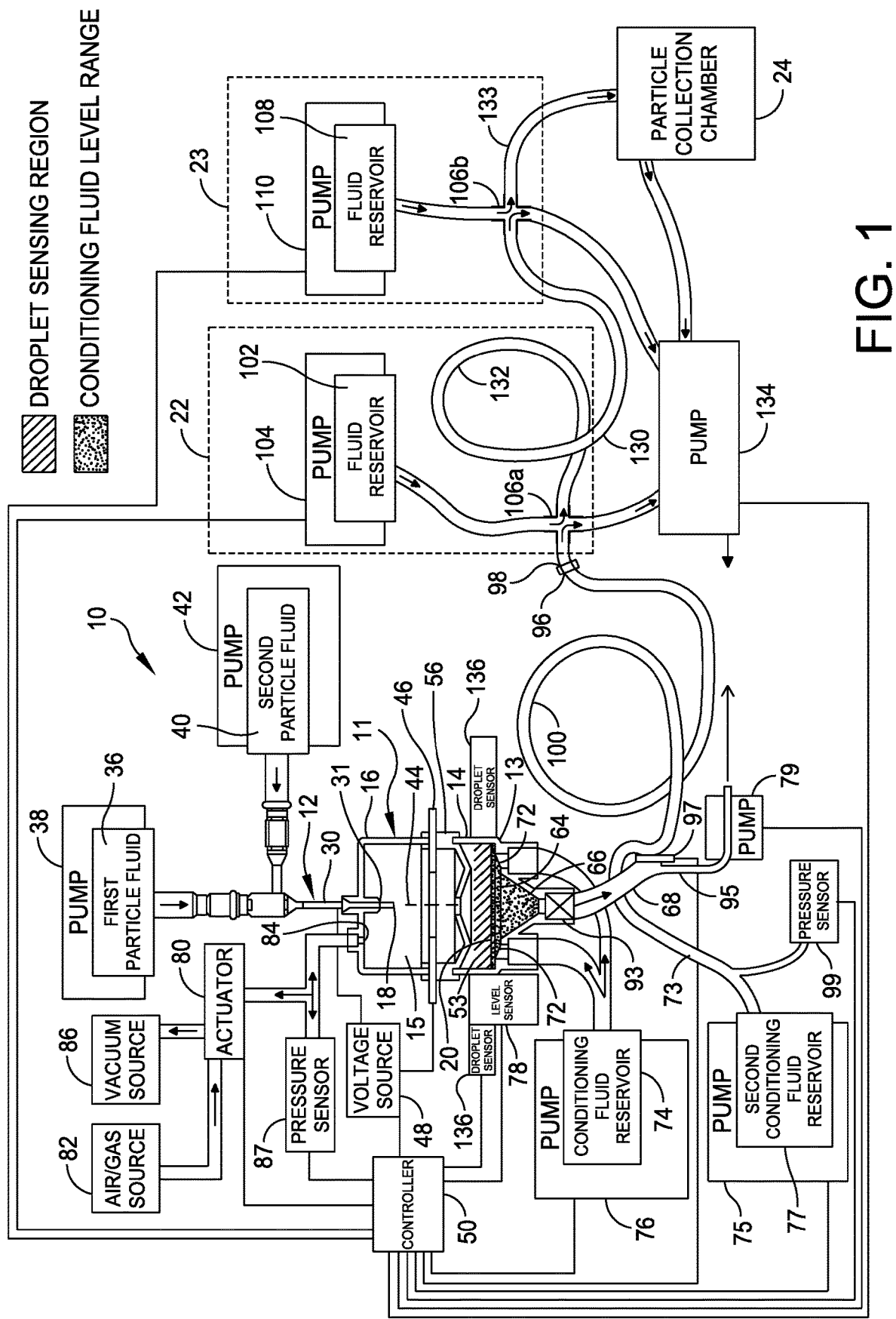
FIG. 1 is a schematic view of an exemplary embodiment of an apparatus according to the present disclosure.

Reference numeral 10 (FIGS. 1, 5, and 6) is an apparatus for making conditioned particles;

Reference numeral 11 (FIGS. 1 and 2) is a particle formation unit;

Reference numeral 12 (FIGS. 1, 5, and 6) is a particle dispensing unit;

Reference numeral 13 (FIGS. 1, 5, and 6) is a vessel component of a conditioning chamber;

Reference numeral 13A (FIGS. 9, 10A and 10B) is a vessel component;

Reference numeral 14 (FIGS. 1, 2, 3, 5, and 6) is a lower compartment in the vessel component of a conditioning chamber;

Reference numeral 14A (FIG. 9) is a lower compartment; Reference number 15 (FIGS. 1, 2 3, 5, and 6) is an upper compartment in the vessel component of the conditioning chamber;

Reference numeral 16 (FIGS. 1, 2, 3, 5, and 6) is a housing;

Reference numeral 18 (FIGS. 1, 2, 3, 5, and 6) is a dispensing port of the particle dispensing unit;

Reference numeral 20 (FIGS. 1, 2, 3, 5, and 6) is a receiving surface of a conditioning fluid, e.g., a cross-linking fluid, in the vessel component of the conditioning chamber;

Reference numeral 22 (FIG. 1) is a first subsequent conditioning fluid exchange module;

Reference numeral 23 (FIG. 1) is a second subsequent conditioning fluid exchange module;

Reference numeral 24 (FIGS. 1, 5, and 6) is a particle collection chamber;

Reference numeral 26 (FIG. 2) is a radially inner orifice of the particle dispensing port;

Reference numeral 28 (FIG. 2) is a radially outer orifice of the particle dispensing port;

Reference numeral 30 (FIGS. 1, 2 and 3) is a particle dispensing conduit;

Reference numeral 31 (FIGS. 1, 2 and 3) is an aperture in the vessel component of the conditioning chamber;

Reference numeral 32 (FIG. 2) is a radially inner dispensing lumen;

Reference numeral 34 (FIG. 2) is a radially outer dispensing lumen;

Reference numeral 36 (FIGS. 1, 2, 5, 6, 7A, 7B, 9, 10A, and 10B) is a first particle fluid reservoir;

Reference numeral 38 (FIGS. 1, 2, 5, 6, and 9) is a first dispensing pump;

Reference numeral 40 (FIGS. 1, 2, 5, 6, 7A, 7B, and 9) is a second particle fluid reservoir;

Reference numeral 42 FIGS. 1, 2, 5, 6, 9, 10A, and 10B) is a second dispensing pump;

Reference numeral 44 (FIGS. 1, 2 and 3) is an example of a flight path of a first-class particle from the dispensing port;

Reference numeral 46 (FIGS. 1, 2 and 3) is a conducting plate;

Reference numeral 47 (FIG. 3) is a central aperture of the conducting plate;

Reference numeral 48 (FIG. 1) is a voltage source;

Reference numeral 50 (FIG. 1) is a controller;

Reference numeral 52 (FIG. 3) is an example of a flight path of a borderline first-class particle from the dispensing port;

Reference numeral 54 (FIG. 3) is an example of a flight path of a second-class particle from the dispensing port;

Reference numeral 56 (FIGS. 1, 2 and 3) is a capture element;

Reference numeral 58 (FIGS. 2 and 3) is an inner aperture edge of an aperture in the capture element;

Reference numeral 60 (FIGS. 2 and 3) is a concave upper surface of the capture element;

Reference numeral 62 (FIGS. 2 and 3) is an annular groove of the capture element;
Reference numeral 64 (FIGS. 1, 2 and 3) is a proximal subcomponent of the vessel component of the conditioning chamber;
Reference numeral 66 (FIGS. 1, 2 and 3) is a distal subcomponent of the vessel component of the conditioning chamber;
Reference numeral 68 (FIGS. 1, 2 and 3) is a lumen component of the conditioning chamber;
Reference numeral 68A (FIGS. 8A and 8B) is a lumen segment;
Reference numeral 68B (FIGS. 8A and 8B) is a lumen segment;
Reference numeral 68C (FIGS. 8A and 8B) is a lumen segment;
Reference numeral 68D (FIGS. 8A and 8B) is a lumen segment;
Reference numeral 70 (FIGS. 2 and 3) is a surface of the proximal subcomponent of the vessel component;
Reference numeral 72 (FIGS. 1, 2 and 3) are conditioning fluid inlet ports;
Reference numeral 73 (FIG. 1) is a conditioning fluid supply lumen;
Reference numeral 74 (FIG. 1) is a first conditioning fluid reservoir;
Reference numeral 75 (FIG. 1) is a pump;
Reference numeral 76 (FIG. 1) is a pump;
Reference numeral 77 (FIG. 1) is a second conditioning fluid reservoir;
Reference numeral 78 (FIG. 1) is a level sensor;
Reference numeral 79 (FIG. 1) is a pump;
Reference numeral 80 (FIG. 1) is an actuator;
Reference numeral 82 (FIG. 1) is a source of displacement fluid (e.g., air or a gas);
Reference numeral 84 (FIG. 1, 2) is a displacement fluid port;
Reference numeral 86 (FIG. 1) is a vacuum source;
Reference number 87 (FIG. 1) is a pressure sensor;
Reference numeral 88 (FIG. 2, 3) is an inwardly tapered surface of the distal subcomponent of the vessel component;
Reference numeral 90 (FIG. 2, 3) is a proximal end of the distal subcomponent of the vessel component;
Reference numeral 92 (FIG. 2, 3) is a distal end of the distal subcomponent of the vessel component;
Reference numeral 93 (FIGS. 1, 2, and 3) is a valve;
Reference numeral 94 (FIG. 2, 3) is an inlet of the lumen component of the conditioning chamber;
Reference numeral 94A (FIGS. 8A and 8B) is an inlet;
Reference numeral 94B (FIG. 8B) is an inlet;
Reference numeral 94C (FIG. 8B) is an inlet;
Reference numeral 95 (FIG. 1) is a diverter lumen;
Reference numeral 96 (FIGS. 1, 5, and 6) is an outlet of the lumen component of the conditioning chamber;
Reference numeral 97 (FIG. 1) is a valve located downstream of the diversion lumen;
Reference numeral 98 (FIGS. 1, 5, and 6) is an inlet of a subsequent conditioning fluid exchange module;
Reference numeral 99 (FIG. 1) is a pressure sensor;
Reference numeral 100 (FIGS. 1, 5, and 6) is a coil in the lumen component of the conditioning chamber;
Reference numeral 102 (FIGS. 1, 5, and 6) is a first subsequent conditioning fluid reservoir;
Reference numeral 104 (FIGS. 1, 5, and 6) is a first subsequent conditioning fluid pump;
Reference numeral 106 (FIG. 4) is a fluid exchange unit;
Reference numeral 106a (FIGS. 1, 5, and 6) is a fluid exchange unit in the first subsequent conditioning fluid exchange module (e.g., cross-linking to wash solution exchange);
Reference numeral 106b (FIGS. 1, 5, and 6) is a fluid exchange unit in the second subsequent fluid exchange module (e.g., wash to storage solution exchange);
Reference numeral 108 (FIGS. 1, 5, and 6) is a second subsequent conditioning fluid reservoir;
Reference numeral 110 (FIGS. 1, 5, and 6) is a second subsequent conditioning fluid pump;
Reference numeral 111 (FIG. 4) is a conditioned particle;
Reference numeral 112 (FIG. 4) is a first inlet in a fluid exchange unit;
Reference numeral 114 (FIG. 4) is a second inlet in a fluid exchange unit;
Reference numeral 116 (FIG. 4) is a transfer junction in a fluid exchange unit;
Reference numeral 118 (FIG. 4) is a particle inlet segment of a fluid exchange unit;
Reference numeral 120 (FIG. 4) is a particle outlet segment of a fluid exchange unit;
Reference numeral 122 (FIG. 4) is a fluid supply segment of a fluid exchange unit;
Reference numeral 124 (FIG. 4) is a discharge segment of a fluid exchange unit;
Reference numeral 126 (FIG. 4) is a filter element;
Reference numeral 128 (FIG. 4) is an interface between two different conditioning fluids;
Reference numeral 130 (FIGS. 1, 5, and 6) is a lumen in the first subsequent conditioning fluid exchange module;
Reference numeral 132 (FIGS. 1, 5, and 6) is a coil in lumen 130;
Reference numeral 133 (FIGS. 1, 5, and 6) is a lumen in the second subsequent conditioning fluid exchange module;
Reference numeral 134 (FIGS. 1, 5, and 6) is a pump;
Reference numeral 136 (FIGS. 1, 5, 6, and 9) is a particle droplet sensor;
Reference numeral 139 (FIG. 9) is a stirring rod;
Reference numeral 140 (FIGS. 10A and 10B) is a first horizontally oriented syringe;
Reference numeral 142 (FIGS. 10A and 10B) is a housing;
Reference numeral 144 (FIGS. 10A and 10B) is a second horizontally oriented syringe;
Reference numeral 146 (FIGS. 10A and 10B) is an internal stirrer;
Reference numeral 148 (FIGS. 10A and 10B) is a body 148 of a syringe;
Reference numeral 200 (FIG. 7A) is a particle formation unit;
Reference numeral 300 (FIG. 7B) is a particle formation unit;
Reference numeral 302 (FIG. 7B) is a lower compartment;
Reference numeral 304 (FIG. 7B) is a bottom wall;
Reference numeral 306 (FIG. 7B) is a side wall;
Reference numeral 308 (FIG. 7B) is an opening;
Reference numeral 400 (FIG. 9) is a particle formation unit;
Reference numeral 500 (FIGS. 10A and 10B) is an apparatus;
Reference numeral 800 (FIGS. 20A-D) is an exchange unit Reference numeral 801 (FIGS. 20A-D) is a pattern of openings in a filter element;
Reference numeral 802 (FIGS. 21A-E) is an exchange unit;
Reference numeral 803 (FIGS. 21A-E) is a pattern of openings in a filter element;
Reference numeral 804 (FIGS. 22A-E) is an exchange unit;
Reference numeral 805 (FIGS. 22A-E) is a pattern of openings in a filter element;
Reference numeral 806 (FIGS. 23A-D) is an exchange unit;
Reference numeral 807 (FIGS. 24A-D) is a pattern of openings in a filter element;
Reference numeral 808 (FIGS. 24A-D) is an exchange unit;
Reference numeral 809 (FIGS. 25A-D) is a pattern of openings in a filter element;
Reference numeral 810 (FIGS. 25A-D) is an exchange unit;
Reference numeral 811 (FIGS. 25A-D) is a pattern of openings in a filter element;
Reference numeral 812 (FIGS. 26A-D) is an exchange unit;
Reference numeral 813 (FIGS. 26A-D) is a pattern of openings in a filter element;
Reference feature $H_1$ (FIG. 2) is a distance from the dispensing port to the receiving surface;
Reference feature $H_2$ (FIG. 2) is a distance of the conducting plate from the dispensing port;
Reference feature $H_3$ (FIG. 2) is a distance by which the annular groove 62 is recessed from the upper end of the capture element 56;
Reference feature $W_1$ (FIG. 2) is the diameter of the central aperture of the conducting plate;
Reference feature $W_2$ (FIG. 2) is the diameter of the central aperture of the capture element;
Reference feature $D_{IL}$ (FIG. 2) is the internal diameter of the inner dispensing lumen;
Reference feature $D_{OL}$ (FIG. 2) is the internal diameter of the outer dispensing lumen;
Reference feature $D_{TL}$ is the internal diameter of the lumen component of the conditioning chamber;
Arrow A (FIG. 4) is a direction of conditioned particles suspended in a conditioning fluid (e.g., a cross-linking solution);
Arrow B (FIG. 4) is a direction of a subsequent conditioning fluid (e.g., a wash fluid);
Arrow C (FIG. 4) is a direction of a conditioning fluid through the transfer junction 116;
Arrow D (FIG. 4) is a direction of the subsequent conditioning fluid through the transfer junction 116;
Arrow E (FIG. 4) is a direction of some particles (e.g., class 1 particles) through the transfer junction 116;
Arrow F (FIG. 4) is a direction of some particles (e.g., class 2 particles) through the filter element 126; and
References A1 through A61 refer to dimensions.

DETAILED DESCRIPTION

The present disclosure features apparatuses and methods for generating and conditioning particles. According to some embodiments, the present disclosure provides apparatuses and methods for automated generation and conditioning of particles. In some embodiments, the generation of particles includes encapsulating a biological material, (e.g., cells) in the particles.

The apparatuses and methods of the present disclosure enable the manufacture of particle preparations containing large quantities of particles (e.g., cell-containing particles) with more consistent and improved properties relative to preparations manufactured with alternative manual processes.

Abbreviations and Definitions

Throughout the detailed description and examples of the disclosure the following abbreviations will be used.

So that the disclosure may be more readily understood, certain technical and scientific terms used herein are specifically defined below. Unless specifically defined elsewhere in this document, all other technical and scientific terms used herein have the meaning commonly understood by one of ordinary skill in the art to which this disclosure belongs.

As used herein, including the appended claims, the singular forms of words such as "a," "an," and "the," include their corresponding plural references unless the context clearly dictates otherwise.

"About", when used herein to modify a numerically defined attribute or parameter (e.g., a physical description of a particle such as diameter, sphericity, number of cells in a particle, the number of particles in a preparation, a process parameter), means that the attribute or parameter may vary by as much as 20% above or below the stated numerical value for that attribute or parameter. For example, a particle, which is generated as a hydrogel capsule and defined as having a diameter of about 1.5 millimeters (mm) and encapsulating about 5 million (M) cells, may have a diameter of 1.2 to 2.0 mm (e.g., 1.2 to 1.8 mm) and may encapsulate about 4 M to 6 M cells. In some embodiments, the term "about" means that the attribute or parameter may vary by as much as 15%, 10% or 5% above or below the stated numerical value for that attribute or parameter.

"Attribute" or "particle parameter" or "parameter of a particle", may be used interchangeably herein, and each refers to a chemical or physical property of a particle or plurality of particles. Non-limiting examples of physical attributes are particle size (e.g., diameter), shape (e.g., sphericity), surface texture, crosslinking density, number and arrangement of compartments (e.g., outer compartment surrounding an inner compartment, dimensions of each compartment), average size or strength of particles in the plurality. Examples of chemical attributes include, but are not limited to, the chemical composition of the particle or plurality of particles or any of its components, e.g., type, molecular weight and concentration or density of polymer(s) forming the particle and any compounds of molecules attached to the polymer(s), cross-linking agent(s), type and amount of engineered cells, therapeutic agent(s) (e.g., anti-inflammatory compound) or other substances within or encapsulated by the particle, or average amount of therapeutic agent(s)/particle in the plurality of particles.

"Cell", as used herein, refers to an engineered cell or a cell that is not engineered.

"Conditioning", as used herein, refers to performing a process on or with a particle or a plurality of particles (e.g., a plurality of particles dispensed from the particle dispensing unit over a desired period of time) that is capable of (i) altering one or more attributes of a particle or plurality of particles or (ii) adding or removing one or more attributes to the particle or plurality of particles. In an embodiment, conditioning can alter a particle attribute, e.g., degree of crosslinking. In an embodiment, conditioning can alter an attribute of a plurality of particles, e.g., average size, e.g., average diameter, of particles in the plurality. In an embodiment, conditioning may include washing away a specific attribute (e.g., cross-linking ions) from the particle or plurality of particles, or may include adding an attribute (e.g., a buffering agent) to a fluid comprising the particle or plurality of particles. In some embodiments, one attribute is exchanged for another. For example, in some embodiments, barium is exchanged with calcium in a conditioning fluid.

In one embodiment, conditioning comprises exposing a plurality of particles to a separation apparatus that is capable of separating particles meeting the acceptance criteria from particles not meeting the acceptance criteria (e.g., diverting dispensed particles that are too small or too large to the capture element while allowing particles of an acceptable size to contact the first conditioning fluid, or flowing dispensed or conditioned particles over or through a size and/or shape filtering element).

In another embodiment, a conditioned attribute is a modification of an attribute of a particle or plurality of particles (e.g., an unconditioned particle, a partially conditioned or a previously conditioned particle). Such conditioned attributes may include, e.g., a covalent or non-covalent bond formed in a polymeric material of a particle, a covalent or non-covalent bond formed between the particle's exterior surface and a substance in a conditioning fluid (e.g., fluorescent dye, radioactive dye, an immune-modulating substance (e.g., anti-inflammatory drug or monoclonal antibody that inhibits the foreign body response), a change in the composition of any part of the particle, e.g., a change in the density of a substance that is non-covalently associated with the particle. In an embodiment, a conditioned attribute is present in a plurality of particles, e.g., particle size distribution following removal of particles with an undesired size, the chemical composition of a fluid comprising the plurality of particles following an exchange of one conditioning fluid with a subsequent conditioning fluid.

A conditioning process to impart one of such conditioned attributes may comprise exposing the particle or plurality of particles to one or more conditioning agents, e.g., in one or more conditioning fluids. A conditioning process may comprise two or more steps, e.g., exposing a plurality of particles in a first conditioning fluid (e.g., a cross-linking fluid) to produce conditioned particles having a conditioned attribute (e.g., cross-linked polymer molecules) and then exposing such particles to a second conditioning fluid to produce particles having an additional conditioned attribute, and optionally exposing the particles to one or more additional conditioning fluids to produce a final preparation of conditioned particles. Conditioning may include crosslinking a material (e.g., an alginate) in a particle by exposing the particle to a cross-linking agent (e.g., a divalent cation in a first conditioning fluid). Conditioning may include removal of one of more substances from the particle (e.g., washing conditioned particles to remove unbound or loosely bound cross-linking molecules such as divalent cations). Conditioning may include exchanging one conditioning fluid with another conditioning fluid, e.g., exchanging a cross-linking fluid with a washing fluid, or exchanging a washing fluid with a particle storage fluid. In an embodiment, conditioning of a particle to impart a particular conditioned attribute (e.g., cross-linked polymer molecules) occurs continuously when a particle is in contact with a conditioning fluid designed to impart that attribute.

"Conditioning fluid", as that term is used herein, refers to a fluid that is capable of carrying a particle or plurality of particles through a component of an apparatus described herein. In an embodiment, a conditioning fluid comprises one or more substances capable of modifying an attribute of the carried particle(s). In an embodiment, a first conditioning fluid is a fluid comprising a cross-linking agent, e.g., a divalent cation (e.g., barium or calcium). In an embodiment, a second or subsequent conditioning fluid is a wash fluid. In an embodiment, a third or subsequent conditioning fluid is a particle storage fluid. In an embodiment, the conditioning step is a size separation and the conditioning fluid serves as a carrier to place a plurality of particles in contact with a sieve or other sizing element.

"Conditioned particle", as that term is used herein, refers to a particle that, post-dispensation, is in contact with, or which has had contact with, at least one conditioning component of the apparatus, e.g., a conditioning fluid or a size selection element. By way of example a conditioned particle is a particle that has passed through the central aperture of the capture element, or which has exited a conditioning fluid component of the apparatus (e.g., the vessel component or the lumen component of the conditioning chamber, a subsequent conditioning fluid exchange module, the storage fluid exchange module).

"Engineered cell", as used herein, is a cell having a non-naturally occurring alteration, and typically comprises a nucleic acid sequence (e.g., DNA or RNA) or a polypeptide not present (or present at a different level than) in an otherwise similar cell under similar conditions that is not engineered (an exogenous nucleic acid sequence). In an embodiment, an engineered cell comprises an exogenous nucleic acid (e.g., a vector or an altered chromosomal sequence). In an embodiment, an engineered cell comprises an exogenous polypeptide. In an embodiment, an engineered cell comprises an exogenous nucleic acid sequence, e.g., a sequence, e.g., DNA or RNA, not present in a similar cell that is not engineered. In an embodiment, the exogenous nucleic acid sequence is chromosomal, e.g., the exogenous nucleic acid sequence is an exogenous sequence disposed in endogenous chromosomal sequence. In an embodiment, the exogenous nucleic acid sequence is chromosomal or extra chromosomal, e.g., a non-integrated vector. In an embodiment, the exogenous nucleic acid sequence comprises an RNA sequence, e.g., an mRNA. In an embodiment, the exogenous nucleic acid sequence comprises a chromosomal or extra-chromosomal exogenous nucleic acid sequence that comprises a sequence which is expressed as RNA, e.g., mRNA or a regulatory RNA. In an embodiment, the exogenous nucleic acid sequence comprises a chromosomal or extra-chromosomal nucleic acid sequence, which comprises a sequence that encodes a polypeptide, or which is expressed as a polypeptide. In an embodiment, the exogenous nucleic acid sequence comprises a first chromosomal or extra-chromosomal exogenous nucleic acid sequence that modulates the conformation or expression of a second nucleic acid sequence, wherein the second amino acid sequence can be exogenous or endogenous. For example, an engineered cell can comprise an exogenous nucleic acid that controls the expression of an endogenous sequence. In an embodiment, an engineered cell comprises a polypeptide present at a level or distribution which differs from the level found in a similar cell that has not been engineered.

"Fluid", as that term is used herein, refers to a substance, such as a liquid, gas, emulsion, foam, slurry, gel, or plasma, that is capable of flowing under an applied force. In an embodiment, a fluid is a solution or a solvent. In an embodiment, a fluid comprises a suspension of a material in a liquid, e.g., cells suspended in a polymer solution, liposomes suspended in a liquid. In an embodiment, a fluid is a liquid at 20 degrees centigrade and 1 atmosphere of pressure.

A "particle", as that term is used herein, refers to a discrete quanta of material, e.g., a discrete quanta of a liquid, gel, or solid. Exemplary particles include capsules, micelles, liposomes, nanoparticles, microparticles, milliparticles, capsids, hydrogels, crystals, beads, spheres, nanospheres, microspheres, and millispheres. In an embodiment, a particle includes drops of a liquid, drops of a hydrogel-forming polymer (e.g., drops of an alginate solution), fragments of a solid, and aggregations of solid elements. Typical shapes include spheres, spheroids and oblong objects with a major to minor axis ratio of <5. A particle can be of any size, e.g. from 2 nanometers (nm) up to 10 centimeters (cm). In an embodiment, a particle has a largest linear dimension, e.g., diameter, of 1.0 millimeters (mm) to 2.0 mm, 0.75 mm to 1.5 mm, 1.25 mm to 1.75 mm, or 0.1 mm to 0.5 mm. In some embodiments, a particle comprises a plurality of components, e.g., one or a plurality of different polymers and other substances organized into one or more compartments. In some embodiments, a particle also comprises a dispersible material of interest, e.g., a cell, a therapeutic agent (e.g., a protein, peptide, amino acid, oligonucleotide, nucleic acid, small molecule), lipid, virus, or vaccine.

A "particle preparation" as used herein, refers to a composition comprising a particle or plurality of particles that is prepared (e.g., manufactured) using an apparatus or process described herein. In an embodiment, a particle preparation comprises a plurality of particles in a solution, e.g., a storage solution. A particle preparation may be characterized by one or more attributes of the particles in the preparation, e.g, by examining one or more representative aliquots removed from the preparation to determine, e.g., the number of particles in the preparation, the average or mean particle size in the preparation, or the average or mean number of cells/per particle. In an embodiment, a particle preparation is characterized by the nature of other components in the preparation, e.g., type and concentration of buffering agent(s) (e.g., salts) in a storage solution. In an embodiment, a particle preparation made in a single run is at least 100, 1000, 5,000, 10,000, 50,000, 100,000, 200,000, or 500,000 particles, e.g., spheres, in a single run.

A "process parameter", as that term is used herein, refers to: (i) a parameter of the process used to make a conditioned particle or plurality of conditioned particles, e.g., the particle dispensing rate, the rate of particle formation, the rate of conditioned particle formation, the speed at which a conditioned particle traverses an apparatus described herein, a reagent level (e.g., the amount of the first or second particle fluid, the level of first conditioning fluid in the vessel component of the conditioning chamber), a property of the first conditioning fluid (e.g., concentration of a reactive, e.g., cross-linking, moiety in the first conditioning fluid), (ii) a physical parameter of the apparatus, (e.g., the distance between the particle dispensing port and the receiving surface, ratio of target particle diameter to a lumen diameter); and/or (iii) an operating parameter (e.g., the strength of the electric field generated by the voltage source, temperature, relative humidity, pressure applied to the conditioning chamber, ratio of particle diameter to lumen diameter).

A "received particle", as that term is used herein, refers to a particle that, post-dispensation, has impinged upon the surface of a first conditioning fluid, e.g., a cross-linking fluid. In an embodiment the surface is disposed in the lower compartment of the vessel component of the conditioning chamber.

A "receiving surface", as that term is used herein, refers to a surface of a first conditioning fluid upon which a particle dispensed from the particle dispensing unit can impinge upon.

An "RPE cell", as used herein comprises a retinal pigment epithelial cell (RPE) (e.g., a cell that was cultured using or derived from the ARPE-19 cell line (ATCC® CRL-2302™)) or a cell that comprises one or more of the characteristics outlined in WO 2019/067766, which is incorporated herein by reference in its entirety.

"Separated", as that term is used herein in connection with a particle, refers to the status of the particle being removed from a particle flow, e.g., an undesired particle removed from the flow of dispensed particles by the capture element, an undesired particle removed from the flow of conditioned particles in a fluid exchange module.

"Sphere", as that term is used herein to refer to a particle, means the particle has (i) a perfect or classical sphere shape with the same diameter in all directions or (ii) has a surface that roughly forms a sphere, e.g., may have waves and undulations and/or may be an ellipsoid (for its averaged surface) with semi-principal axes within about 10% of each other.

"Spheroid", as that term is used herein to refer to a particle, means the particle has (i) a perfect or classical oblate spheroid or prolate spheroid shape or (ii) to a particle having a surface that roughly forms a spheroid, e.g., may have waves and undulations and/or may be an ellipsoid (for its averaged surface) with semi-principal axes within about 100% of each other.

Description of Exemplary Embodiments of an Apparatus for Manufacturing Conditioned Particles The present disclosure provides an apparatus for manufacturing conditioned particles. The apparatus can be configured to create a single-compartment or multi-compartment particle. In an embodiment, two or more of an apparatus described herein are connected together to create a system for generating particles.

In an embodiment, the apparatus is configured to produce a two-compartment particle having an inner compartment and an outer compartment surrounding the inner compartment. The apparatus includes first and second particle fluid reservoirs with pumps configured to advance first and second particle fluids in a particle dispensing unit configured to create and dispense a two compartment particle (an unconditioned particle) into a conditioning chamber containing a first conditioning fluid (e.g., a cross-linking solution).

In other embodiments, additional particle fluid reservoirs are provided, and the apparatus is configured to dispense multi-compartment particles (e.g., particles with three or more compartments).

The dispensed particles acquire a conditioned attribute (e.g., cross-linked polymer molecules) immediately upon contact with the first conditioning fluid and/or as they flow along with the first conditioning fluid through the conditioning chamber and into a first fluid exchange unit where the concentration of the first conditioning fluid around the particles is reduced and the particles flow into a subsequent conditioning fluid (e.g., a second conditioning fluid, a third conditioning fluid, . . . an $N^{th}$ conditioning fluid, etc.). In an embodiment, the particles acquire another conditioned attribute as they flow along with the first subsequent conditioning fluid through a second fluid exchange unit. In an embodiment, the apparatus imparts additional conditioned attributes to the particles by flowing them through an additional fluid exchange unit into a subsequent conditioning fluid, a process that may be repeated multiple times in which the subsequent conditioning fluid has the same or different composition than the immediately preceding, or any preceding conditioning fluid. In an embodiment, the apparatus imparts an additional conditioned attribute to the plurality of particles by removing undesired particles (e.g. particles having undesired size, undesired shape, undesired density of a chemical component, undesired color, and/or another undesired trait) at one or more locations in the apparatus. After all desired conditioning steps have been performed, the final conditioned particles flow into a particle collection chamber.

FIG. 1 is a schematic view of an exemplary embodiment of an apparatus 10 for making conditioned particles according to the present disclosure. The apparatus 10 includes: a particle dispensing unit 12; a conditioning chamber which includes a vessel component 13 and a lumen component 68 (e.g., a transit lumen); a first subsequent conditioning fluid exchange module 22 that includes at least one fluid exchange unit; a second subsequent conditioning fluid exchange module 23 that includes at least one fluid exchange unit; and a particle collection chamber 24.

The particle dispensing unit 12 includes a first particle fluid reservoir 36 that contains a first particle forming fluid, a first dispensing pump 38, a second particle fluid reservoir 40 that contains a second particle forming fluid, a second dispensing pump 42, and a particle dispensing conduit 30 that includes a radially inner dispensing lumen 32 and a radially outer dispensing lumen 34 that are in fluid communication with a fluid displacement port 18. The first particle fluid reservoir is in fluid communication with the radially inner dispensing lumen 32, and the second particle fluid reservoir 40 is in fluid communication with the radially outer dispensing lumen 34.

Downstream from the particle dispensing unit is the vessel component 13 of the conditioning chamber. The vessel component 13 of the conditioning chamber includes an upper compartment 15, a conducting plate 46, a capture element 56 and a lower compartment 14. The upper compartment 15 includes an aperture 31 configured to receive at least the terminal portion of the particle dispensing conduit 30 and a fluid displacement port 84 configured to allow a displacement fluid to enter or exit the upper compartment. The conducting plate 46 includes a circular aperture 47 through which dispensed particles flow from the upper compartment to the capture element. The capture element 56 is configured to allow dispensed particles of a desirable size range to flow into the lower compartment. The lower compartment includes two conditioning fluid inlet ports 72 and a distal subcomponent 66 connected to the lumen component 68 of the conditioning chamber.

The lumen component 68 connects the vessel component 13 to the first subsequent conditioning fluid exchange module 22. The lumen component 68 of the conditioning chamber includes an elongated lumen that may include one or more coils 100 along its length. In an embodiment, lumen 68 has zero, one, two, three or more coils 100 along its length.

The first fluid exchange module 22 includes at least one fluid exchange unit 106a and a lumen component 130, which includes an elongated lumen that includes one or more coils 132 (e.g., two, three or more coils) along its length. In an embodiment, lumen 130 does not have a coil.

Lumen component 130 is in fluid connection with the second subsequent conditioning fluid exchange module 23, which includes at least one fluid exchange unit 106b and a lumen component 133. In an embodiment, lumen 133 includes one or more coils along its length. In an embodiment, lumen 133 does not have a coil.

Figure 2:
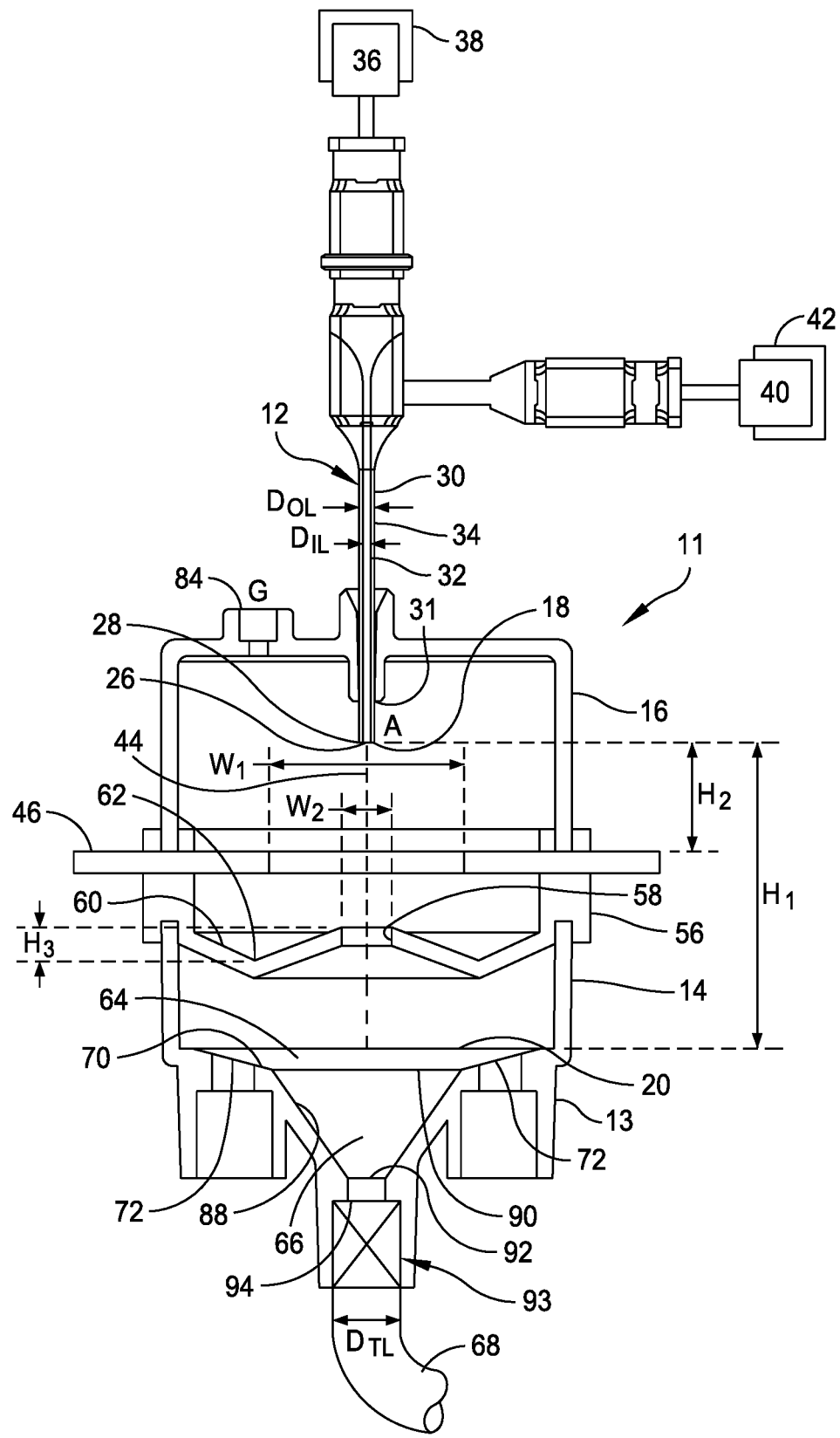
FIG. 2 is an enlarged schematic view of a particle formation unit of the apparatus of FIG. 1.

A particle formation unit 11 of FIG. 2 of the apparatus 10 of FIG. 1 can include the particle dispensing unit 12, the vessel component 13 of the conditioning chamber, the first particle fluid reservoir 36, the second particle fluid reservoir 40, the conducting plate 46, and the capture element 56. Referring now to the general flow of particles, particles are dispensed from the particle dispensing unit 12 into the lower compartment 14 in the vessel component of the conditioning chamber, which contains a first fluid, which may be a first conditioning fluid (e.g., a fluid comprising a cross-linking agent) in some embodiments. The particles and the first fluid are directed to the first fluid exchange module 22. Subsequently, particles are directed to the second exchange module 23. Particles transiting the fluid exchange modules 22, 23 are exposed to one or more fluids in sequence, which may include one or more conditioning fluids. In the first fluid exchange module 22, a first subsequent conditioning fluid reduces the concentration of the first fluid around the particles. Second, in the second fluid exchange module 23, a second subsequent conditioning fluid reduces the concentration of the fluid carrying the particles from the first fluid exchange module. The particles flow from the fluid exchange module 23 through lumen 133 to a particle collection chamber 24, where the particles are collected and may be stored and fluid that had carried the particles through lumen 133 may be discharged, for example, for collection or as waste.

Referring now to flow of particles from the dispensing unit into the vessel component, the housing 16 includes a lower compartment 14 and an upper compartment 15 that together enclose the dispensing port 18 and the receiving surface 20. The housing 16 is configured to maintain sterility of dispensed particles and the conditioning fluid within the housing 16. The particle dispensing unit 12 is configured to dispense particles to the upper compartment 15 from the particle dispensing port 18. As shown in FIG. 2, the particle dispensing port 18 includes a radially inner orifice 26 and a radially outer orifice 28 that are concentric. The radially inner orifice 26 has a circular cross section, and the radially outer orifice 28 has a circular cross section that is greater than the circular cross section of the radially inner orifice.

The radially inner orifice 26 and the radially outer orifice 28 are configured to produce a particle (e.g., a droplet of a polymer solution) comprising an inner compartment and an outer compartment surrounding the inner compartment. For example, the radially inner orifice 26 and the radially outer orifice 28 are configured to produce a particle comprising an inner compartment dispensed from the radially inner orifice 26 and an outer compartment dispensed from the radially outer orifice 28. In FIG. 2, the radially inner orifice 26 and the radially outer orifice 28 terminate along a common plane. In other embodiments, the radially inner orifice 26 and the radially outer orifice 28 may be offset in a vertical direction.

The particle dispensing port 18 is connected to a particle dispensing conduit 30. The particle dispensing conduit 30 includes a radially inner dispensing lumen 32 and a radially outer dispensing lumen 34 that are coaxial.

The radially inner orifice 26 is in fluid communication with the radially inner dispensing lumen 32. The radially inner dispensing lumen 32 extends from the first particle fluid reservoir 36 at a first end of the radially inner dispensing lumen 32 to the radially inner orifice 26 at a second end of the radially inner dispensing lumen 32. In FIG. 1, the first dispensing pump 38 is configured to operate with the first reservoir 36 and is configured to advance a first particle fluid from the first reservoir 36, through the radially inner dispensing lumen 32 to the radially inner orifice 26.

The first particle fluid reservoir 36 is configured for holding one or more particle components and optionally a material, such as a biological material (e.g., cells) to be encapsulated in the inner compartment of dispensed particles. In some embodiments, the first particle fluid comprises a first particle-forming polymer, such as a first hydrogel-forming polymer, e.g., an alginate.

The radially outer orifice 28 is in fluid communication with the radially outer dispensing lumen 34. The radially outer dispensing lumen 34 extends from the second particle fluid reservoir 40 at a first end of the radially outer dispensing lumen 34 to the radially outer orifice 28 at a second end of the radially outer dispensing lumen 34. The second dispensing pump 42 is configured to operate with the second reservoir 40 and is configured to advance a second particle fluid from the second reservoir 40, through the radially outer dispensing lumen 34 to the radially outer orifice 28.

The second reservoir 40 is configured for holding one or more particle components, such and optionally a material, such as an anti-inflammatory drug or other immune-modulating agent, to be encapsulated in the outer compartment of dispensed particles. In some embodiments, the second particle fluid comprises a second particle-forming polymer (e.g., a hydrogel-forming polymer such as an alginate), which may be the same or different than the first particle-forming polymer.

When the first dispensing pump 38 and the second dispensing pump 42 advance fluid from the first reservoir 36 and the second reservoir 40, respectively, a particle begins to form at the particle dispensing port 18. Due to one or more forces, such as an electrical force due to an electric field, the particle is caused to move along a flight path from the dispensing port 18. The ideal flight path 44 of a first-class particle is from the dispensing port 18 towards a desired location in the lower compartment 14 of the conditioning chamber, as discussed in further detail below in relation to FIG. 3. The ideal flight path has a length of $H_1$, which is the distance from the dispensing port 18 to the receiving surface 20.

To create an electric field through which the particles can pass, a voltage plate 46 is positioned along the ideal flight path 44 at a distance $H_2$ from the dispensing port 18. The voltage plate 46 is an annular structure having a central aperture 47 that surrounds the ideal flight path 44. The central aperture 47 of the voltage plate 46 has a diameter $W_1$, which is sufficiently great that particles dispensed from the dispensing port do not impinge on the voltage plate 46. A voltage source 48 has a first lead connected to the voltage plate 46 and a second lead connected to the dispensing port 18. The voltage source 48 provides a voltage potential between the dispensing port 18 and the voltage plate 46 so that a static electric field is created in a direction parallel to the ideal flight path 44.

The voltage of the voltage plate 46 relative to the voltage of the dispensing port 18 may be used to control the velocity of particles that are dispensed from the dispensing port 18 as well as the frequency at which particles are dispensed from the dispensing port 18. The frequency at which particles are dispensed from the dispensing port 18 may be used to control the desired particle size or other particle characteristics. Given a constant flow of particle fluids through the coaxial dispensing conduit 30, the frequency of particle dispensing is related to the size of the particles that are dispensed. A higher frequency of particle dispensing corresponds to a smaller average particle size. The average particle size can be affected by other characteristics of the fluids flowing through the dispensing conduit 30, such as the viscosity of one or both of the first and second particle fluids.

The electric field may be adjusted by sending a command from a controller 50 to the voltage source. Two particle droplet sensor portions 136 are located on opposed sides of the flight path 44 to sense particle droplets falling in a droplet sensing region 53 in the housing 16 between the dispensing port 18 and the receiving surface 20. In some embodiments, the sensor portions 136 may be a transmitter and a receiver, such as a beam transmitter and a beam receiver. In response to a signal from one or more of the sensor portions 136 of the droplet sensor, the controller 50 is configured to send a command to the voltage source 48 to adjust the voltage potential between the voltage plate 46 and the dispensing port 18 to either increase or decrease the frequency of droplet dispensing from the dispensing port 18.

Figure 3:
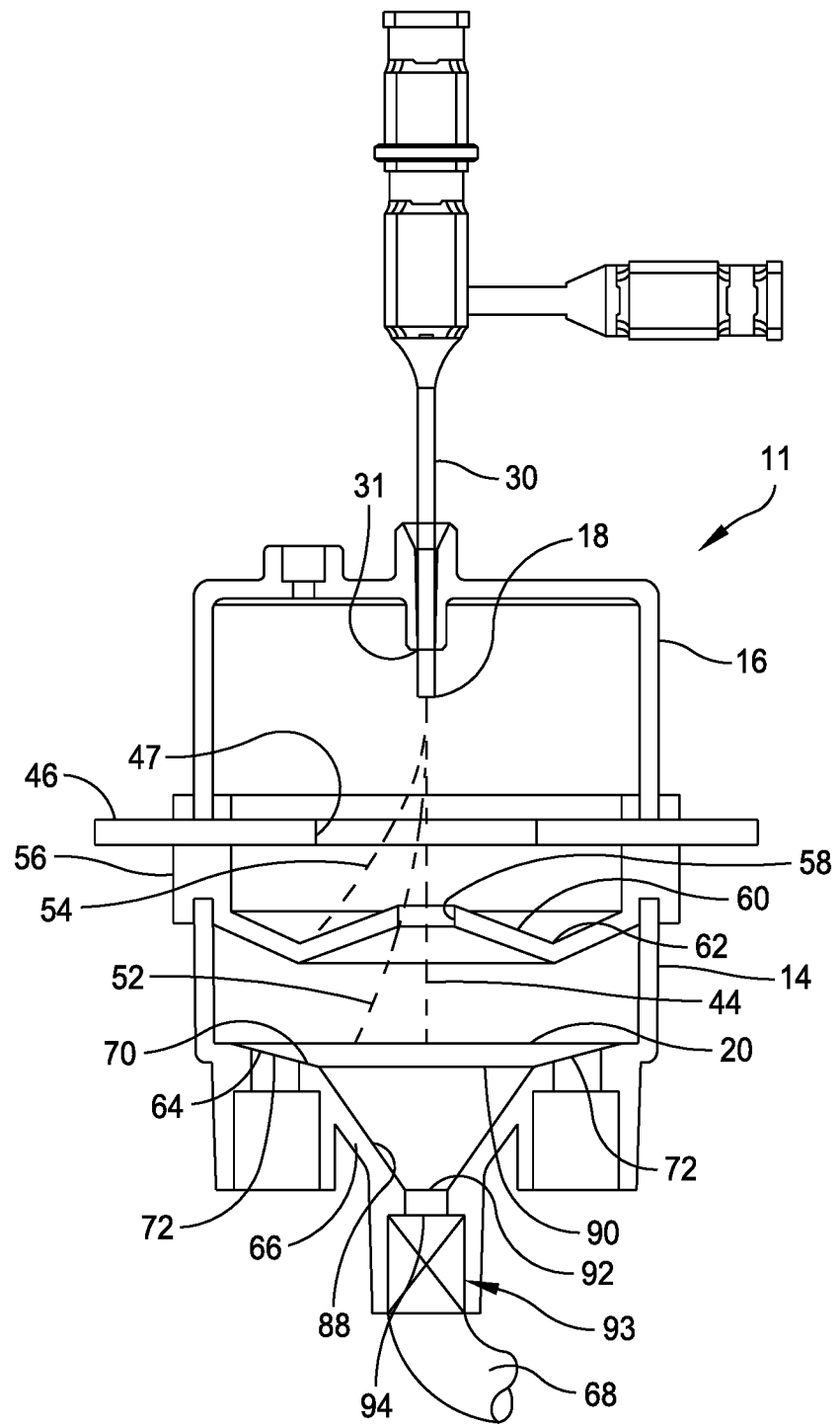
FIG. 3 is another enlarged schematic view of the particle formation unit of the apparatus of FIG. 1.

In addition to affecting the particle dispensing rate, the electric field affects the path of particles from the dispensing port 18 to the receiving surface 20. Because the particles dispensed from the dispensing port 18 have an electric charge, the electrical field between the dispensing port 18 and the voltage plate 46 causes each particle to travel along an actual flight path that may differ from the ideal flight path 44. Smaller particles travel along paths that deviate more from the ideal flight path than the flight paths of larger particles. FIG. 3 shows an example of a flight path 52 of a relatively small particle that is still of an acceptable size and an example of a flight path 54 of a particle that is smaller than a minimum acceptable size.

Not all of the particles dispensed from the dispensing port are desirable, e.g., from a manufacturing perspective. For example, some of the dispensed particles may be too small. A capture element 56 takes advantage of the different flight paths of particles of various sizes. The capture element 56 is positioned along the ideal flight path 44 from the dispensing port 18 to the receiving surface 20 in the vessel component 13 of the conditioning chamber. In FIG. 3, the capture element is an annular structure having a central aperture that surrounds the ideal flight path 44. The central aperture is defined by an inner aperture edge 58. The central aperture has a diameter $W_2$.

The capture element 56 is configured to separate particles belonging to a first class (in terms of particle size) of particles from particles belonging to a second class (in terms of size or another characteristic) of particles after the particles are dispensed from the dispensing port 18 but before the particles impinge on the receiving surface 20 of the conditioning fluid. Other separations by class are contemplated, such as separations based on color, shape, or other characteristics. In FIG. 3, the capture element 56 includes a concave upper surface 60. The concave upper surface 60 includes two adjacent surfaces having different cone angles so that the two adjacent surfaces intersect at an annular groove 62. The annular groove 62 is recessed by a distance $H_3$ in the vertical direction from the upper end capture element 56. The concave upper surface 60 has a first frustoconical portion that is tapered downwardly from the inner aperture edge 58, and a second frustoconical portion that is tapered upwardly from the annular groove 62 towards an outer edge of the capture element 56.

The concave upper surface 60 provides annular coverage of flight paths of second class particles. Second class particles are displaced laterally from the flight path of first class particles, and impinge the concave upper surface 60 of the capture element 56, rather than the receiving surface 20 of the conditioning fluid. For example, the flight path 54 is an example of a flight path of a second class particle.

On the other hand, flight paths of first class particles pass through the central aperture of the capture element 56. For example, the flight paths 44 and 52 are examples of flight paths of first class particles. After the first class particles pass through the central aperture of the capture element 56, they impinge on the receiving surface 20 of the first conditioning fluid in the lower compartment 14 of the conditioning chamber.

In some embodiments, the capture element 56 includes a drainage port that allows particles that impinge the upper surface to drain from the upper surface. In some embodiments, the drainage port is located along the annular groove 62. The drainage port is configured to be connected to a drain conduit that allows the particles to drain from the annular groove, through the drain conduit, and into a waste receptacle.

Although the upper surface of the capture element 56 is shown as having a concave shape when viewed in the cross section of FIG. 2, in some embodiments, the upper surface of the capture element has another cross-sectional shape. For example, the upper surface can be a conical upper surface that is configured to direct particles that impinge the upper surface towards a radially outer edge of the capture element and towards a waste receptacle, so that the impinged particles do not collect on the upper surface and fall into the receiving surface 20.

The lower compartment 14 of the vessel component 13 is configured to receive particles from the dispensing port 18 of the particle dispensing unit. The lower compartment 14 includes a proximal subcomponent 64, a distal subcomponent 66, and a lumen component 68. Particles and conditioning fluid transit from the proximal subcomponent 64 into the distal subcomponent 66 and then into the lumen component 68.

The proximal subcomponent 64 is configured to support a first conditioning fluid so that the receiving surface 20 of the conditioning fluid is positioned to receive particles from the particle dispensing unit 12. A location on the receiving surface 20 is at an end of the ideal flight path 44 of a particle from the dispensing port 18.

In FIG. 2, the proximal subcomponent 64 is a tapered component with an inwardly tapered surface 70. The inwardly tapered surface 70 of the proximal subcomponent 64 helps guide particles toward the distal subcomponent 66.

Because some conditioning fluid flows with particles out of compartment 14 into the lumen 68, the inwardly tapered surface 70 includes two inlet ports 72 for replenishing the volume of conditioning fluid in the proximal subcomponent. The two inlet ports 72 are connected to a first conditioning fluid reservoir 74 that contains a first conditioning fluid, such as a cross-linking fluid. A pump 76 advances the first conditioning fluid from the first conditioning fluid reservoir 74 to the ports 72. This ensures that a fresh supply of first conditioning fluid is continually provided to the lower compartment 14, thereby maintaining the concentration of the conditioning agent(s) (e.g., cross-linking agent) in the fluid in this compartment and in the fluid carrying the particles through the lumen component 68 of the conditioning chamber.

The apparatus is configured to maintain the height of the receiving surface 20 of the first conditioning fluid in the proximal subcomponent 64 within a range that is appropriate to receive and begin conditioning (e.g., cross-linking) of first class particles. Over time, the height of the first conditioning fluid in the proximal subcomponent 64 can vary due to the exit of conditioning fluid from the apparatus at various locations, e.g., discharge segments 124 of the fluid exchange modules 22 and 23. To increase this height, in an embodiment first conditioning fluid is pumped into the proximal subcomponent from the fluid reservoir 74 in response to a signal from a gas pressure sensor 87 in communication with housing 16. Alternatively, or in addition to adding conditioning fluid to the proximal subcomponent 64, the height of the receiving surface 20 can be controlled by adjusting the pressure of a displacement fluid (e.g. air or a gas) in the volume enclosed by the housing 16 and the vessel component 13. In an embodiment, in response to a signal from a level sensor 78 that is configured to detect a height of the receiving surface 20, the controller 50 is configured to cause an actuator 80 to pump a displacement fluid from a source 82 to the housing 16 through a displacement fluid port 84, or to cause a vacuum source 86 to remove displacement fluid from the housing through the displacement fluid port 84. In an embodiment, the controller 50 may be configured to cause the actuator 80 to pump a displacement fluid from the source 82 or to remove displacement fluid to the vacuum source 86 in response to a signal from a pressure sensor 87 in communication with the housing 16.

The controller 50 may be further configured to control a temperature of the first fluid chamber in order to maintain a consistent particle formation and conditioning environment over time, to control particle properties that may be influenced by temperature, e.g. size, shape, or distribution of core contents within the particle, or to influence viability or other properties of encapsulated cells. The controller 50 may actuate a heater or a chiller to adjust the temperature of the first fluid chamber responsive to one or more temperature sensors configured to detect the temperature of the first fluid chamber.

Downstream from the proximal subcomponent 64 is the distal subcomponent 66. The distal subcomponent 66 is a funnel-shaped subcomponent with an inwardly tapered surface 88, so the proximal end 90 of the distal subcomponent 66 has a diameter that is greater than a diameter of the distal end 92 of the distal subcomponent 66. The inwardly tapered surface 88 of the distal subcomponent 66 has a smaller cone angle than the cone angle of the tapered surface 70 of the proximal subcomponent 64. The inwardly tapered surface 88 of the distal subcomponent 66 helps guide particles toward a lower port of the distal subcomponent 66, which is connected to the lumen component 68. In particular, the inwardly tapered surface 88 of the distal subcomponent helps cause first-in-first-out transit of particles through the distal subcomponent 66 and minimizes swirling of particles in the distal subcomponent 66. This first-in-first-out transit of particles helps to ensure a substantially consistent residence time of particles within the distal subcomponent 66.

The distal end 92 of the distal subcomponent 66 includes a valve 93 that can be opened and closed. When the valve 93 is open, fluid and particles can flow out of the distal subcomponent 66 to downstream components.

Downstream from the distal subcomponent 66 is the lumen component 68, which is in the form of an elongated transit lumen that extends from a lumen inlet to a lumen outlet. The lumen inlet 94 is connected to the distal end 92 of the distal subcomponent 66, and the lumen outlet 96 is connected to a fluid exchange module inlet 98, so the transit lumen 68 allows particles and fluid to move from the distal subcomponent 66 of the conditioning chamber to the first fluid exchange module 22.

The internal diameter $D_{TL}$ of the transit lumen 68 may be between about 1.2 to about 10 times the average diameter of a particle that is intended to pass through the transit lumen.

The length of the transit lumen may be selected to provide a desired residence time of particles in the transit lumen. The transit lumen may include at least one coil 100 along its length to minimize the footprint of the transit lumen in a particle manufacturing environment, such as a cleanroom. The coil 100 may take many forms and shapes, for example, helical or spiral coils that are organized into a circular, rectangular, or triangular shape. The path of the coil 100 may also be zigzagged or any other desirable shape. In an embodiment, transit lumen is not made of tubing, but comprises a channel of the desired length and shape which is cut out of a flat plate that is sealed with a second flat plate or injection molded or 3-D printed component. In some embodiments, the length of the transit lumen is at least X times the transit lumen diameter, wherein X is selected from at least 500, 1000, 2,500, 5,000, 10,000, or 25,000.

In FIG. 1, the apparatus includes a diverter lumen 95 in fluid communication with the distal subcomponent, which allows an aliquot of particles from a production run to be diverted for collection (e.g. to a chamber or another receptacle for various purposes such as sampling, collection, or disposal) rather than directed to the first fluid exchange module 22. When a valve 97 is open, fluid and particles from the distal subcomponent flow through the diverter lumen 95 rather than flowing to the lumen outlet 96. The valve 97 may be manually operated. In some embodiments, the valve 97 may be include an actuator that is connected to the controller 50 via a wired or wireless connection, the actuator being configured to open and close the valve in response to a signal from the controller 50. The controller 50 may provide the signal based on one or more sensors or other control components.

In FIG. 1, a second conditioning fluid reservoir 77 and pump 75 are configured to supply a second conditioning fluid to the lumen 68, downstream of the valve 97. The pump 75 is connected to the controller 50 and can be operated to selectively advance fluid through the conditioning fluid supply lumen 73 and into the lumen 68 downstream of the valve 97. The second conditioning fluid may have the same or different composition as the first conditioning fluid. In an embodiment, the second conditioning fluid has a different composition than the first conditioning fluid, and may comprise one or more conditioning agents to modify, add or remove one or more attributes. In an embodiment, the controller directs addition of second conditioning fluid in response to a signal from fluid pressure sensor 99 or user input, e.g., based on sampling results.

Downstream from the lumen 68 is the first subsequent conditioning fluid exchange module 22 followed by the second subsequent conditioning fluid exchange module 23. The first fluid exchange module 22 includes a first subsequent conditioning fluid reservoir 102 (e.g., to hold a particle wash fluid), a first subsequent conditioning fluid pump 104 in fluid communication with the first subsequent conditioning fluid reservoir 102 and a first exchange unit 106a. The second fluid exchange module 23 includes a second subsequent conditioning fluid reservoir 108 (e.g., to hold a particle storage fluid) and a second subsequent conditioning fluid pump 110 in fluid communication a second exchange unit 106b.

Figure 4:
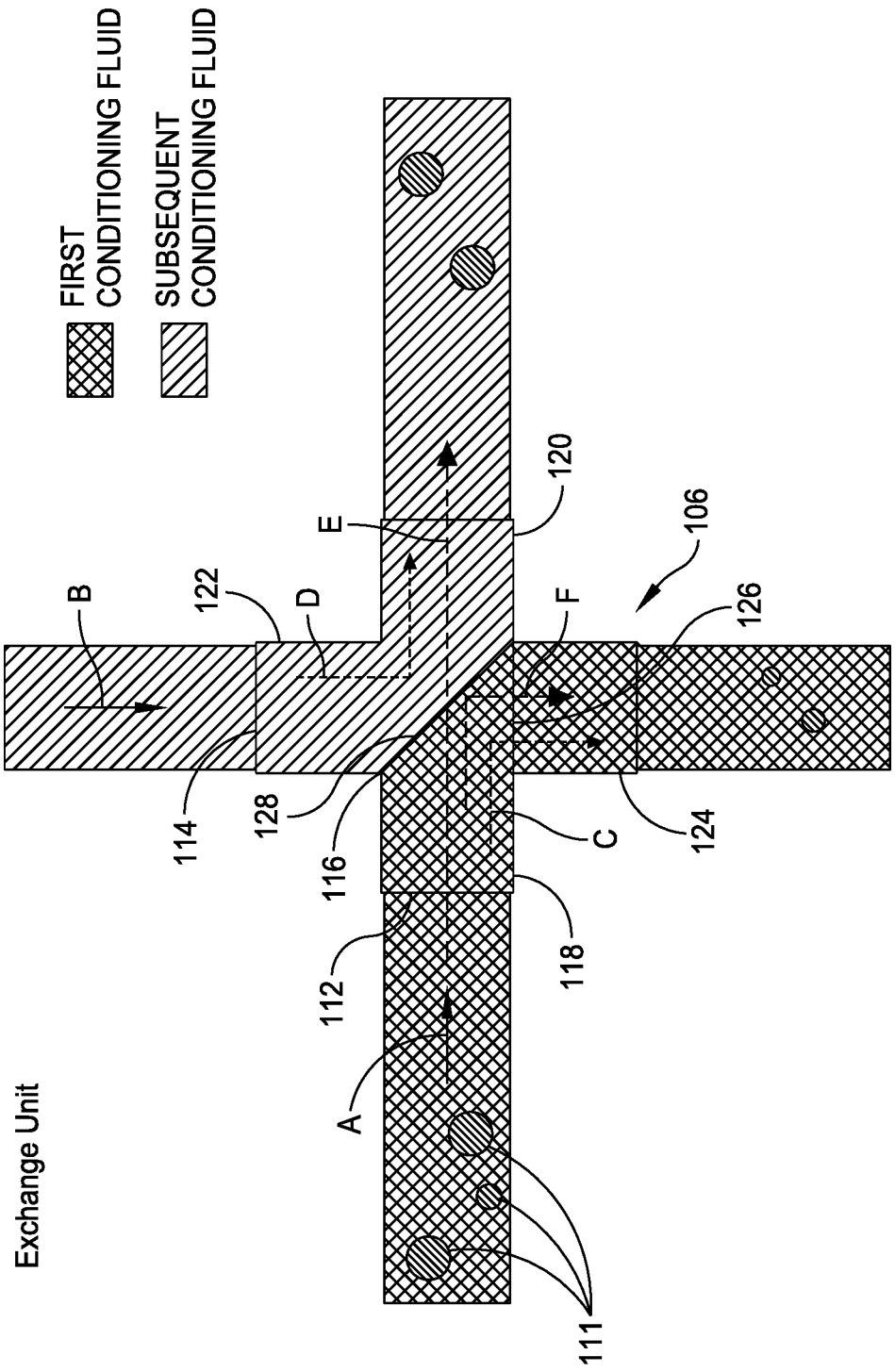
FIG. 4 is an exemplary embodiment of a fluid exchange unit, such as the fluid exchange units included in the apparatus of FIG. 1.

The first exchange unit 106a and the second exchange unit 106b are examples of exchange units 106 according to the present disclosure and are connected in series. While only two exchange units 106a, 106b are shown in FIG. 1, it is within the scope of the present disclosure to provide any number of exchange units 106a and 106b. The structure of the exchange unit 106 according to the present disclosure is shown in FIG. 4.

Each exchange unit 106 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124.

A filter element (e.g. sieve) 126 within the transfer junction 116 covers an inlet of the discharge lumen segment 124. The filter element 126 has one or more filter element apertures. Each filter element aperture has a greatest dimension that is less than a pre-determined or target outer dimension of a conditioned particle to allow removal of particles that are smaller than a desired size. In some embodiments, a filter element can filter particles based on other characteristics, such as density, magnetism, or other characteristics of the particles.

The exchange unit 106 is configured such that when a first fluid entering the inlet particle lumen segment 112 along Arrow A and a second fluid (e.g., a first conditioning fluid) entering the fluid supply segment 122 along Arrow B are selected such that the fluids form an interface 128. Depending on the fluids that meet at the interface 128, the interface 128 may be either a meniscus or a region where some mixing of the fluids occurs. Due to this interface 128, the exchange unit allows for efficient exchange of the first fluid in favor of the second fluid. When the properties of the first fluid and the second fluid (e.g., a cross-linking solution and a first wash solution) are properly selected, a significant portion, e.g., substantially all, of the first fluid will travel through the exchange unit along Arrow C, and a significant portion, e.g., substantially all of the second fluid, will travel through the exchange unit along Arrow D. When the filter element is configured to filter particles 111 based on size, particles that are too large to fit through the filter unit, travel through the exchange unit along Arrow E, while particles that are sufficiently small to fit through the filter unit are carried by the first fluid along Arrow F. In this way, the exchange unit is useful for exchanging a first fluid for a second fluid (e.g., exchanging cross-linking solution with a first wash solution, or exchanging a first wash solution with a second wash solution), as well as separating particles of different sizes or other particle characteristic(s) for which the filter element is configured to filter.

The exchange units 106a, 106b of FIG. 1 are connected in series by a lumen 130 having at least one coil 132. In an embodiment, this connecting lumen has zero, one, two, three or more coils. The configuration of lumen 130 (e.g., total length and number of coils) may be selected to provide a desired residence time of particles in the first subsequent conditioning fluid and optionally to minimize the footprint of the apparatus in a particle manufacturing environment.

In the first exchange unit, the conditioning fluid carrying the particles from lumen 68 (which in an embodiment may include a mixture of first and second conditioning fluids) is exchanged for a first subsequent conditioning fluid, e.g., a particle wash fluid. By removing the first conditioning fluid (e.g., cross-linking fluid), the particle conditioning provided by that fluid is stopped or at least substantially stopped. The fluid supply lumen of the first exchange unit 106a is connected to the first subsequent conditioning fluid reservoir 102. The first exchange unit 106a removes a sufficient amount of the first conditioning fluid (e.g., cross-linking fluid) (and second conditioning fluid if present) from the particles passing through the first exchange unit 106a, or blends the first and any second conditioning fluid with the first subsequent conditioning fluid to a desired ratio or an arbitrary ratio. In some embodiments, additional exchange units 106a may be connected in series, each with their respective fluid supply lumen connected to the first subsequent conditioning fluid reservoir 102, in order to remove a sufficient or desired amount of the first conditioning fluid from the particles, e.g., achieve a target maximum concentration of unincorporated cross-linking agent in a aliquot of the particles.

The discharge lumen of the first exchange unit 106a is in fluid communication with a pump 134, which pumps away fluid and particles with characteristic(s) (e.g., sufficiently small in size) that allowed them to flow through the filter of the first exchange unit 106a. The pump 134 may pump the fluid and particles into a container (not shown). This discharge lumen can be used to output particles and fluid to be disposed of as waste, to be collected for sampling, to be collected for subsequent use, or for another purpose.

Although not shown, a plurality of first exchange units 106a may be connected in series, so that the outlet particle lumen segment of an exchange unit in the series is connected to an inlet particle lumen segment of the subsequent exchange unit in the series. One or more of the connections between exchange units may be a lumen 130 with or without at least one coil 132. At the end of the series of first exchange units 106a, the outlet particle lumen segment would be connected to the inlet lumen segment of the first exchange unit 106b in the second subsequent conditioning fluid exchange module.

In an embodiment, the first subsequent fluid exchange module 22 includes a series of two or more of the exchange unit 106a-lumen 130 combination (e.g., two, three, four, five, six, seven, eight, nine or ten or more), with each fluid supply segment 122 (FIG. 4) of the exchange units 106a in fluid connection with a single first subsequent conditioning fluid reservoir 102.

In an embodiment, the second subsequent fluid exchange module 23 includes a series of two or more of the exchange unit 106b-lumen 133 combination (e.g., two, three, four, five, six, seven, eight, nine or ten or more), with each fluid supply segment 122 (FIG. 4) of the exchange units 106b in fluid connection with a single fluid reservoir 108.

In an embodiment, at least one of the subsequent conditioning fluid exchange modules has two or more exchange units 106 connected in series without a lumen component in between each exchange unit, e.g., the particle outlet segment 120 (FIG. 4) of each upstream exchange unit 106 is directly fused with the particle inlet segment 118 of each downstream exchange unit 106.

In an embodiment, the first and second subsequent fluid exchange modules are configured as described in any of the Examples below.

In FIG. 1, the outlet particle lumen segment of the first exchange unit 106a is connected to the inlet particle lumen segment of the second exchange unit 106b, so that particles transit from the first exchange unit 106a to the second exchange unit 106b.

In the second exchange unit 106b, the first subsequent conditioning fluid is exchanged for a second subsequent conditioning fluid, e.g., a particle storage fluid configured to extend the shelf life of the particles. The fluid supply lumen of the second exchange unit 106b is connected to the storage fluid reservoir 108. Particles and second subsequent conditioning fluid exit the outlet particle lumen segment of the second exchange unit 106b, which is in fluid communication with the particle collection chamber 24.

Figure 5:
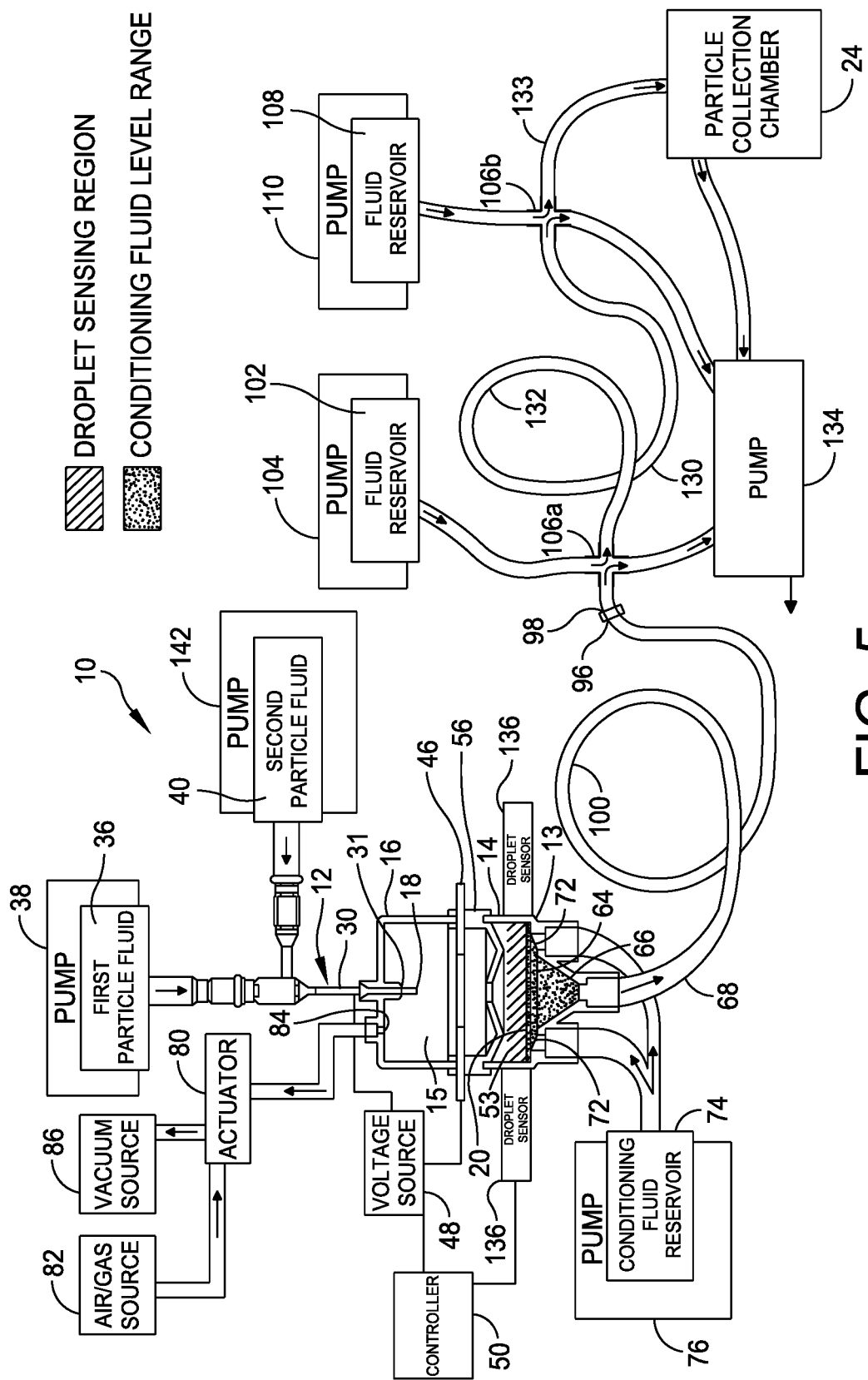
FIG. 5 is a schematic view of another embodiment of an apparatus according to the present disclosure.
Figure 6:
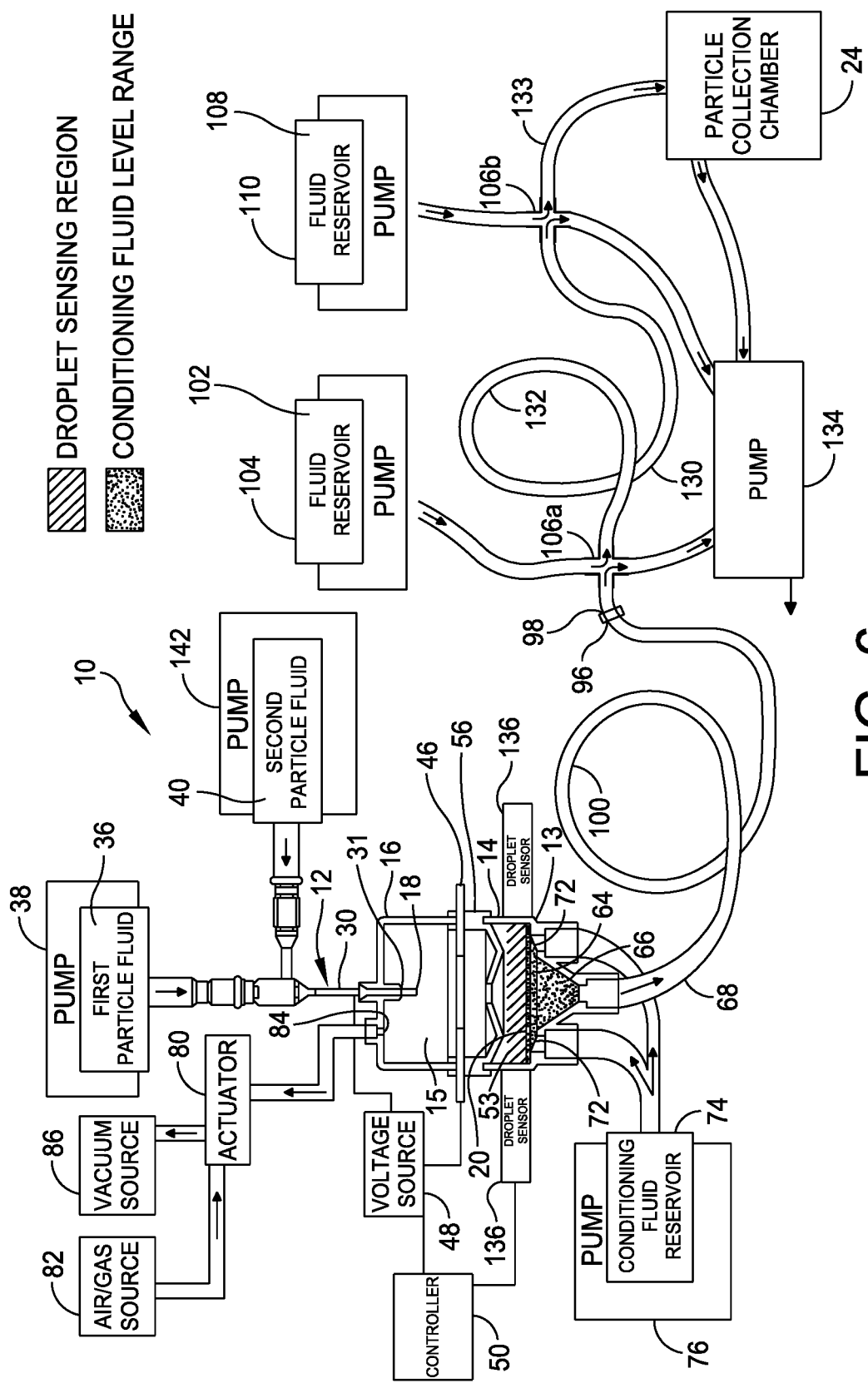
FIG. 6 is a schematic view of another embodiment of an apparatus according to the present disclosure.

The discharge lumen of the second exchange unit 106b is in fluid communication with the pump 134, which pumps away fluid and particles with characteristic(s) (e.g., sufficiently small in size) that allowed them to flow through the filter of the second exchange unit 106b. The pump 134 may pump this fluid and particles into a disposal container (not shown) or to be collected for sampling, to be collected for subsequent use, or for another purpose. FIGS. 5 and 6 show alternative configurations of the apparatus of FIG. 1, which lack some of the components described above for FIG. 1. The apparatus of FIG. 6 is identical to the apparatus of FIG. 5, except that the orientation of the pumps and fluid reservoirs in the fluid exchange modules are reversed.

Figure 7A:
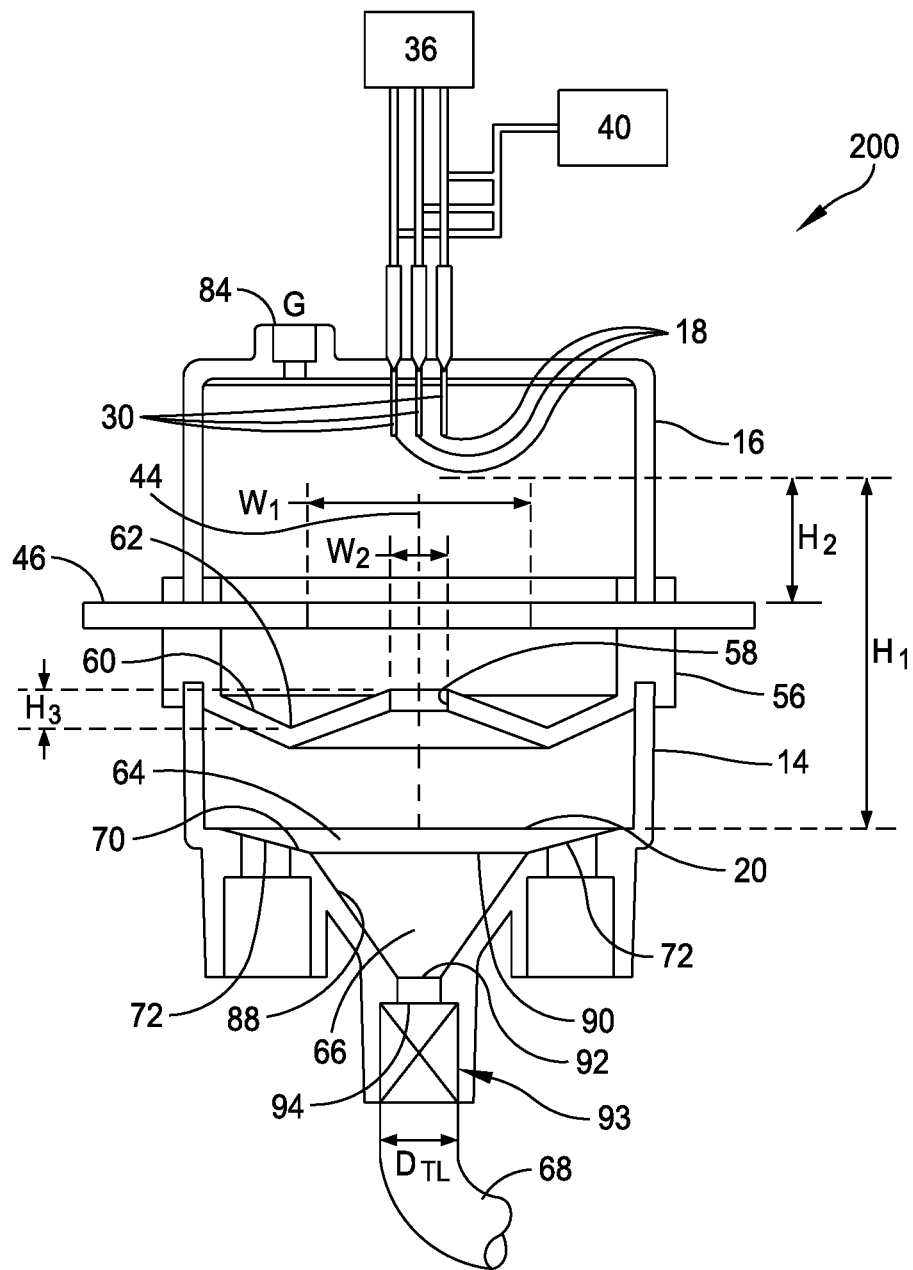
FIG. 7A is a cross sectional view of another embodiment of a particle formation unit according to the present disclosure.

In some embodiments, a particle formation unit includes a plurality of dispensing ports. The plurality of dispensing ports can be configured to dispense particle simultaneously, alternately, sequentially, or in another manner. FIG. 7A shows an example of a particle formation unit, generally indicated at 200, that includes a plurality of dispensing ports 18. The particle formation unit 200 of FIG. 7A is generally identical to the particle formation unit 11 of FIG. 2, except it includes three dispensing ports 18 positioned over a single capture element 56 and a single lower compartment 14. In other embodiments, two or more dispensing ports 18 are included. The particle formation unit 200 of FIG. 7A can be used in an apparatus according to the present disclosure, such as in the apparatus 10 of FIG. 1.

In FIG. 7A, each of the dispensing ports 18 is configured as a coaxial needle that is configured to be connected to the first particle fluid reservoir 36 and the second particle fluid reservoir 40, in a similar manner as the dispensing port 18 of FIG. 2.

Figure 7B:
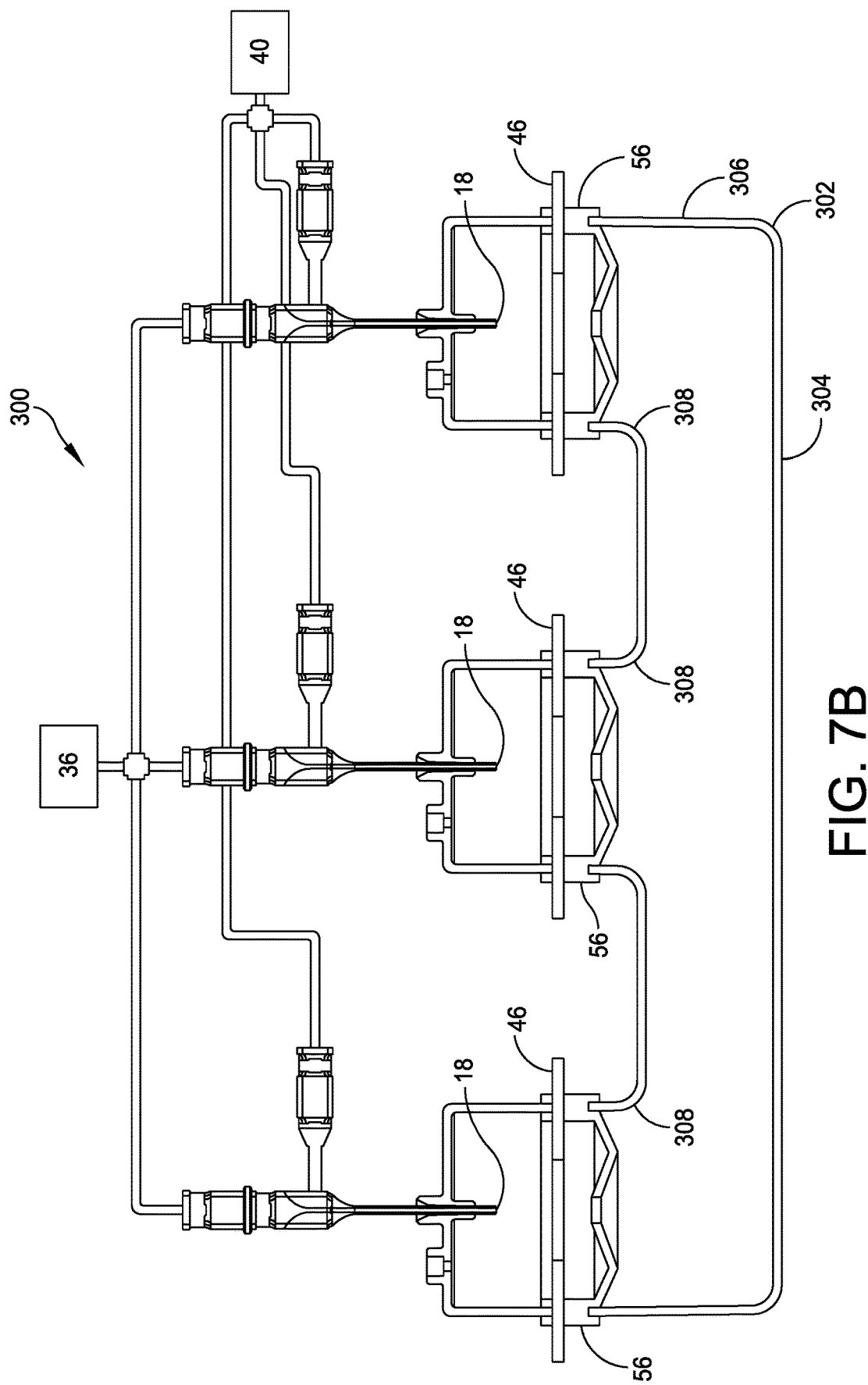
FIG. 7B is a cross sectional view of another embodiment of a particle formation unit according to the present disclosure.

In some embodiments, a particle formation unit includes a plurality of dispensing ports each positioned over a respective capture element. FIG. 7B shows a particle formation unit, generally indicated at 300, that includes similar features as the particle formation unit of FIG. 2, except it includes three dispensing ports 18, each positioned over a respective capture element 56. Each dispensing port 18 is configured to dispense particles into a conditioning fluid contained in a single lower compartment 302 of a conditioning chamber. The lower compartment 302 is shown as having a bottom wall 304, a side wall 306, and three openings 308 at the top. Each opening 308 is configured to support a respective capture element 56 so that particles passing through the respective capture element 56 fall into a fluid, such as a conditioning fluid, contained in the lower compartment. In the embodiment of FIG. 7B, the lower compartment 302 is configured for batch processing in which particles that are dispensed from the dispensing ports 18 and that fall into the lower compartment 302 are retained in the lower compartment 302 until they are collected from the lower compartment 302.

The particles that are formed in a batch procedure using the particle formation units 200, 300 of FIG. 7A or FIG. 7B can be subsequently directed into a wash solution, such as by pouring the particles into a wash solution together, collecting the particles via pipette and transferring them into a container for washing, or using a bag to collect the particles and then lowering or emptying the bag into a wash solution.

In some embodiments, a plurality of particle formation units is connected in series to increase the capacity of the apparatus (e.g., to increase the rate of particle formation).

As an example of a system for connecting particle formation units in series, a first batch of particles from a first particle dispensing unit enter a crosslinking fluid, and then a wash fluid. As the first batch of particles moves through the system, a second batch of particles is introduced into the system from a second particle dispensing unit. For example, when the first batch of particles are in the wash fluid, the second batch of particles is introduced into the crosslinking fluid.

In some embodiments, a plurality of particle formation units according to FIG. 2 is connected in series. In some such embodiments, each particle formation unit is a particle formation unit 11 according to FIG. 2.

Figure 8A:
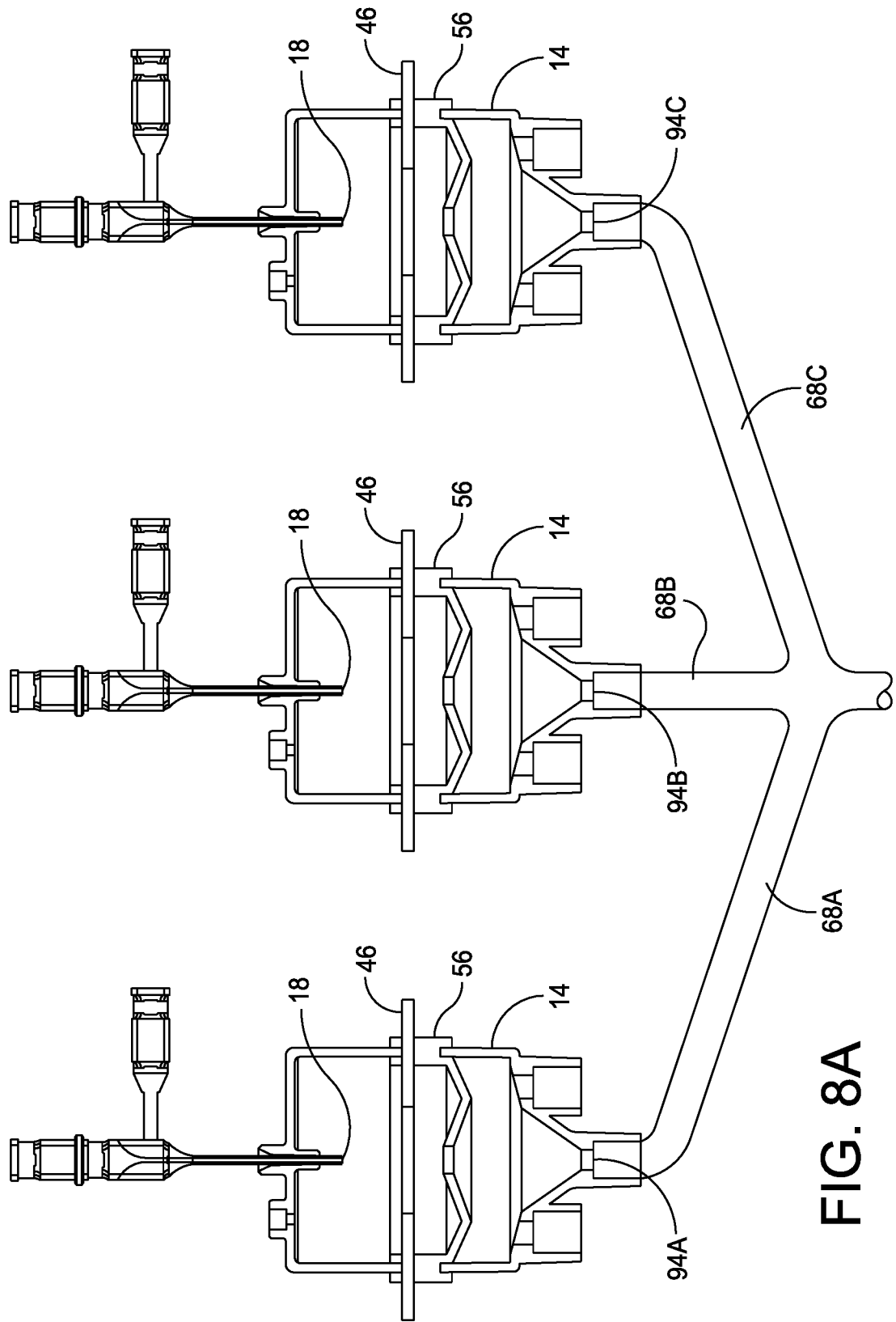
FIG. 8A is a cross sectional view of a plurality of particle formation units of FIG. 2 connected in series.

FIGS. 8A and 8B show different configurations for dispensing particles from multiple particle formation units into a single chamber, such as a single wash chamber or a single conditioning chamber.

FIG. 8A shows a plurality of particle formation units according to FIG. 2 connected in parallel. The plurality of particle formation units of FIG. 8A can be used in place of the single particle formation unit shown in FIG. 1 to increase production volume in a time period relative to the single particle formation unit of FIG. 1. Each particle formation unit of the plurality of particle formation units is connected to a respective lumen segment 68A, 68B, 68C that meet at a junction having an outlet connected to a lumen 68D. The lumen 68D can be directed to a single conditioning chamber, which is configured to contain a fluid, such as a first wash solution. Thus, for a batch process, particles exiting each conditioning chamber enter the single washing chamber at the same time.

In some embodiments, a plurality of particle formation units is connected in parallel increase the capacity of the apparatus (e.g., to increase the rate of particle formation) or to alter the incubation time of the particles with a conditioning fluid. In some embodiments, a plurality of particle formation units according to FIG. 2 are connected in parallel. In some such embodiments, each particle formation unit is a particle formation unit 11 according to FIG. 2.

FIG. 8B shows three particle formation units according to FIG. 2 connected in series. Each particle formation unit of FIG. 8B is identical to the particle formation unit of FIG. 2, with like feature numbers indicating like features. The plurality of particle formation units of FIG. 8B can be used in place of the single particle formation unit shown in FIG. 1.

The radially inner dispensing lumen and the radially outer dispensing lumen of the dispensing port of each of the three particle formation units of FIG. 8B are in communication with the first particle fluid reservoir and the second particle fluid reservoir, respectively. For example, the first fluid reservoir and the second fluid reservoir can be connected to supply lines that are each split to feed into each particle formation unit. In some embodiments, each particle formation unit could be supplied by its own set of first and second fluid reservoirs.

The distal end 92 of the lower compartment 14 of each particle formation unit is connected to an inlet 94A, 94B, 94C of a respective lumen segment 68A, 68B, 68C. The three lumen segments 68A, 68B, and 68C connect to a lumen 68D. The lumen 68D is connected to the same downstream components as in FIG. 1.

Figure 9:
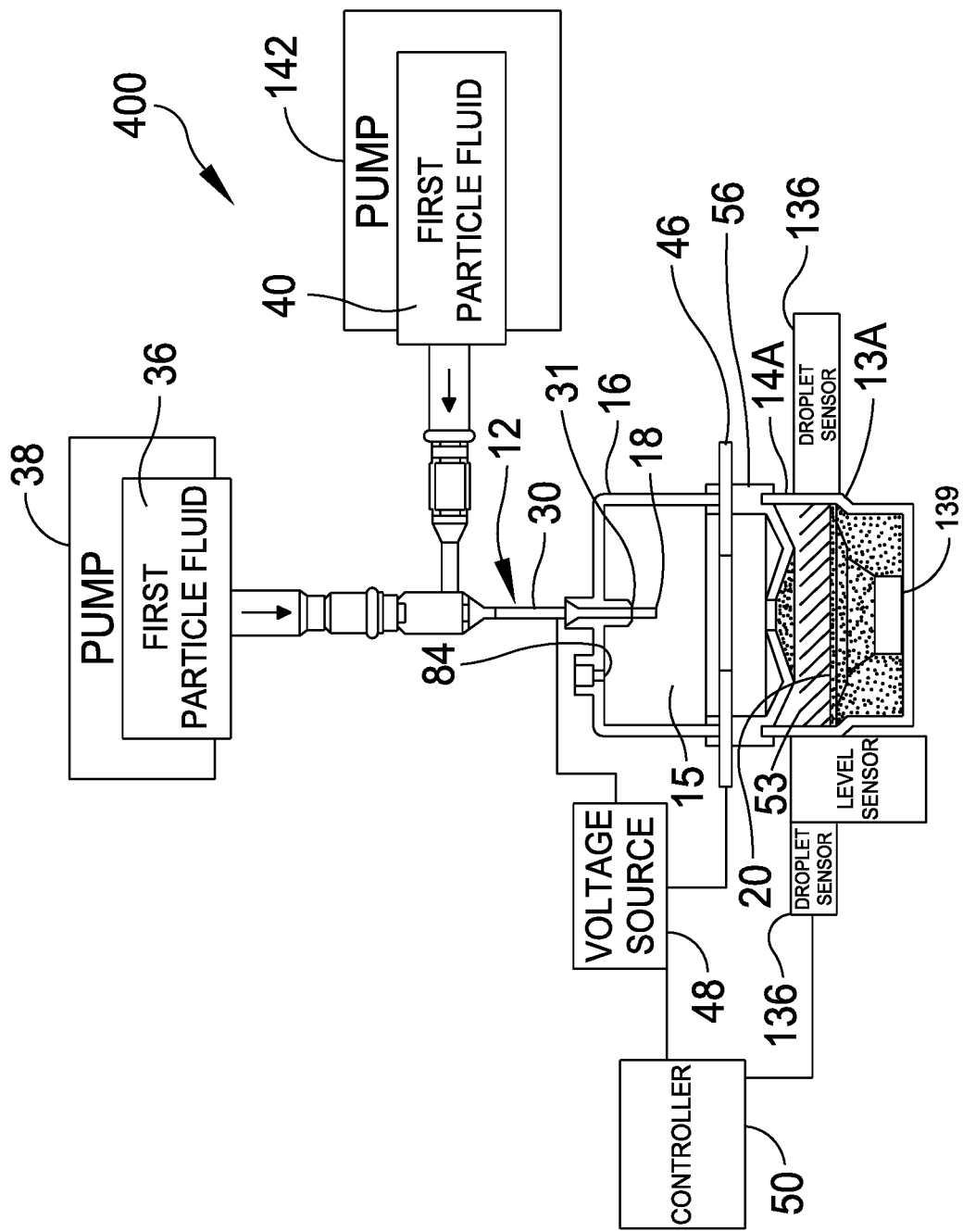
FIG. 9 is a schematic view of another embodiment of an apparatus according to the present disclosure.

Batch processing can be performed with the particle formation unit of FIG. 2 or another particle formation unit of the present disclosure (e.g., as shown in FIG. 9).

To use the particle formation unit of FIG. 2 for batch processing, it is possible to close the valve 93 at the distal end 92 of the lower compartment 14. Methods of batch processing of capsules can alternatively use one or more other particle formation units instead of a particle formation unit of FIG. 2.

FIG. 9 is a schematic view of an exemplary embodiment of a particle formation unit, generally indicated at 400, that is configured for using batch processing to make conditioned particles according to the present disclosure. The particle formation unit 400 of FIG. 9 includes: a particle dispensing unit 12 and a conditioning chamber which includes a vessel component 13A. The particle formation unit of the apparatus of FIG. 9 includes some of the same features as FIG. 2, with like numerals indicating like features in FIG. 9, except for the structure of the lower compartment of FIG. 2. In the particle formation unit of FIG. 9, the lower compartment is not connected to an inlet of a lumen at the lower end of the particle formation unit.

In FIG. 9, the particle dispensing unit 12 includes a first particle fluid reservoir 36 that contains a first particle forming fluid, a first dispensing pump 38, a second particle fluid reservoir 40 that contains a second particle forming fluid, a second dispensing pump 42, and a particle dispensing conduit 30 that includes a radially inner dispensing lumen 32 and a radially outer dispensing lumen 34 that are in fluid communication with a fluid displacement port 18. The first particle fluid reservoir is in fluid communication with the radially inner dispensing lumen 32, and the second particle fluid reservoir 40 is in fluid communication with the radially outer dispensing lumen 34.

Downstream from the particle dispensing unit is the vessel component 13A of the conditioning chamber. The vessel component 13A of the conditioning chamber includes an upper compartment 15, a conducting plate 46, a capture element 56 and a lower compartment 14A. The conducting plate 46 includes a circular aperture 47 through which dispensed particles flow from the upper compartment to the capture element. The capture element 56 is configured to allow dispensed particles of a desirable size range to flow into the lower compartment. The lower compartment forms a closed distal end of the vessel component.

Referring now to a flow of particles from the dispensing unit into the vessel component, the housing 16 includes the lower compartment 14A and the upper compartment 15 that together enclose the dispensing port 18 and the receiving surface 20. The housing 16 is configured to maintain sterility of dispensed particles and the conditioning fluid within the housing 16. The particle dispensing unit 12 is configured to dispense particles to the upper compartment 15 from the particle dispensing port 18. Similar to the particle dispensing port of FIG. 2, the particle dispensing port 18 of FIG. 9 includes a radially inner orifice 26 and a radially outer orifice 28 that are concentric. The radially inner orifice 26 has a circular cross section, and the radially outer orifice 28 has a circular cross section that is greater than the circular cross section of the radially inner orifice.

The radially inner orifice 26 and the radially outer orifice 28 are configured to produce a particle (e.g., a droplet of a polymer solution) comprising an inner compartment and an outer compartment surrounding the inner compartment. For example, the radially inner orifice 26 and the radially outer orifice 28 are configured to produce a particle comprising an inner compartment dispensed from the radially inner orifice 26 and an outer compartment dispensed from the radially outer orifice 28. In FIG. 9, the radially inner orifice 26 and the radially outer orifice 28 terminate along a common plane. In other embodiments, the radially inner orifice 26 and the radially outer orifice 28 may be offset in a vertical direction.

As mentioned above, the lower compartment 14A is not connected to a lumen for directing the particles out of the solution in the lower compartment 14A. Instead the lower compartment 14A has a closed lower wall. The particle formation unit of FIG. 9 is configured for batch production of particles (e.g., alginate hydrogel particles with inner and outer compartments).

In some embodiments, the particle formation unit includes a stirring rod 139 positioned on an upper surface of the closed lower wall of the lower compartment 14A, as shown in FIG. 9. In some embodiments, the stirring rod 139 is a magnetic stirring rod that is magnetically driven. To drive the magnetic stirring rod, the particle formation unit can be placed on a magnetic driver that is configured to rotate the stirring rod 139.

To collect the particles that are formed within the lower compartment 14A, the lower compartment 14A is removable from the upper compartment 16. The particles can then be transferred from the lower compartment 14A to another container, such as a bag, within which the particles can be contained while being further conditioned, e.g., washed to remove excess cross-linking agent.

Figure 10A:
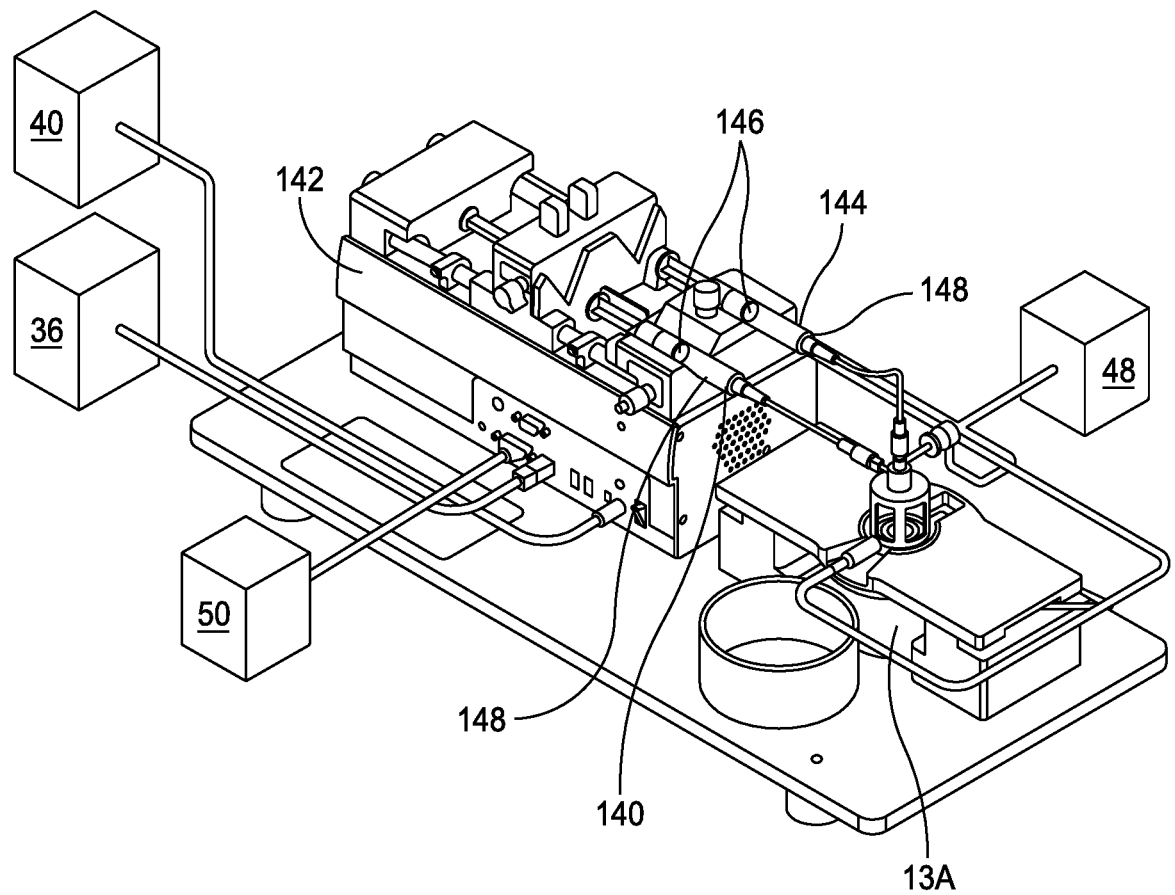
FIG. 10A is a perspective view of an apparatus according to the present disclosure.
Figure 10B:
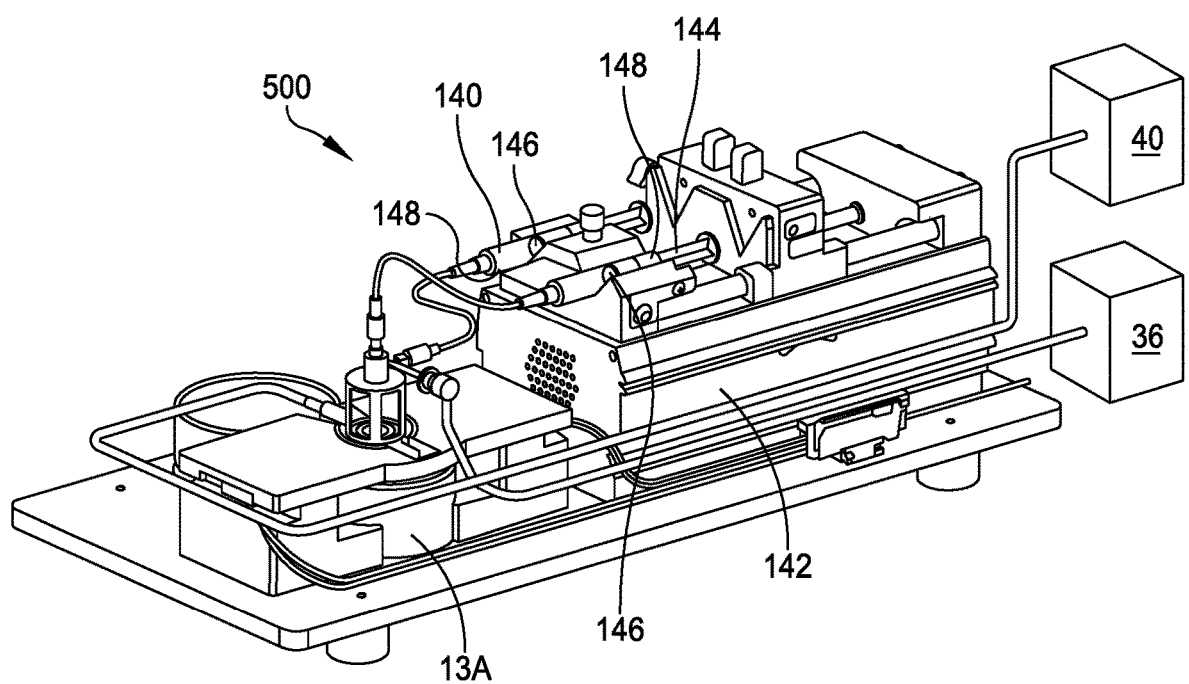
FIG. 10B is another perspective view of the apparatus of FIG. 10A.

FIGS. 10A and 10B are perspective views of an embodiment of an apparatus, generally indicated at 500, including another particle formation unit that is configured for batch processing, according to the schematic of FIG. 9. The apparatus 500 includes a first particle fluid source 36, a second particle fluid source 40, a voltage source 48, a controller 50, and a particle formation unit for batch processing of particle conditioning.

In the apparatus 500 of FIGS. 10A and 10B, the first particle fluid source 36 is connected to a first horizontally oriented syringe 140 secured to a housing 142 and the second particle fluid source 40 is connected to a second horizontally oriented syringe 144 secured to the housing 142. During operation, a longitudinal axis of each syringe 140, 144 is parallel to the surface on which the housing 142 is supported, such as the ground, a lab bench, or another surface. To prevent cells from settling in the fluid in each syringe 140, 144 and/or to help maintain a constant concentration or at least substantially constant concentration of cells in either or both of the respective first and second solutions when either or both of the first and second fluids are being dispensed, the apparatus may be configured to stir the solution in each syringe 140, 144. In the embodiment of FIGS. 10A and 10B, each syringe is stationary and the fluid in each syringe 140, 144 can be stirred by an internal stirrer 146 within a body 148 of the respective syringe 140. In some embodiments, the internal stirrer 146 is a magnetically driven stirrer that is configured to be rotated by a rotating magnet supported on the housing 140. In some embodiments, a speed of rotation of the internal stirrer 14146 in each syringe 140, 144 is adjustable. The horizontally mounted syringes 140, 144 may be selected from commercially available syringe stirring systems, such as a neMIX stirring system available from Cetoni or a neMIX50 stirring system available from Cetoni.

In some embodiments, the syringes 140, 144 can be stirred by rotating the body 148 of the respective syringe 140, 144 about the longitudinal axis of the syringe 140, 144. In some embodiments, the apparatus further comprises a stirring mechanism. In some embodiments, the apparatus does not comprise a stirring mechanism (e.g., a rotatable internal stirrer).

In some embodiments, the syringe 140 connected to the first particle fluid source 36 and the syringe 144 connected to the second fluid particle source 40, and each syringe has a volume in the range of 2.5 to 50 milliliter (mL). In some embodiments, each syringe has a volume in the range of less than 1 mL.

During operation, the controller is configured to cause each syringe 140, 144 to advance a first particle fluid from the first syringe 140 and a second particle fluid from the second syringe 140 to a dispensing port in the particle formation unit.

Particle Dispensing Unit

Particle dispensing units of the present disclosure are useful for dispensing particles that are to be conditioned in a conditioning fluid. In various embodiments, a particle dispensing unit may be useful for dispensing particles that have a single compartment or layers or that include multiple compartments or layers. For example, a particle dispensing unit may be configured to dispense a particle that has two compartments including an inner compartment and an outer compartment surrounding the inner compartment. As another example, a particle dispensing unit may be configured to dispense a particle that has three compartments: including an inner compartment, an intermediate compartment surrounding the inner compartment and an outer compartment surrounding the intermediate compartment. In an embodiment, an intermediate or outer compartment is a thin layer of a material, e.g., a polymeric material, surrounding the inner or intermediate compartment, respectively.

The particle dispensing unit may include, or is attached to, one or more particle fluid reservoirs, each connected by a fluid conduit to a respective orifice. The orifice(s) are located at a port from which particles are dispensed. In some embodiments, the orifices are concentric. In some embodiments, the fluid conduits are coaxial. The number of compartments that the particle dispensing unit produces is dependent on the number of orifices from which the particles are dispensed. In an embodiment, an exemplary particle dispensing unit is exemplified by feature 12, wherein feature 12 includes the inner and outer lumens 32 and 34.

The frequency at which the particle dispensing unit dispenses particles may be controlled in response to adjusting the electrical potential between the needle and the voltage plate.

Particle dispensing units may be selected from or adapted from particle dispensing units that are known in the art. One example of a particle dispensing unit is shown in WO 2014/153126. Other examples of commercially available multi-port dispensing units include coaxial, triaxial, and quadaxial needles, as well as multi-channel spinnerets (e.g., Island-in-the-sea spinneret) marketed by ramd-hart instrument co., Succasunna, NJ USA. It is also contemplated that a particle dispensing unit may include multiplexed coaxial needles, e.g, by incorporating Yflow® Coaxial Electrospinning & Electrosprapying Tech offered by Yflow® S.D., Milaga, Spain or by adapting mechanisms used in bioprinting and inkjet applications, such as thermal, piezoelectric, and laser-assisted mechanisms, e.g., as described in Gungor-Ozkerim et al., Biomater. Sci., 6, 915-946.

Particles

The present disclosure contemplates that a variety of particles may be produced by an apparatus described herein. The particle may be spherical (e.g., a hydrogel capsule) or any other shape. Exemplary particles include capsules, micelles, liposomes, nanoparticles, microparticles, milliparticles, capsids, hydrogels, crystals, beads, spheres, nanospheres, microspheres, and millispheres. In an embodiment, a particle includes drops of a liquid, drops of a gel (e.g., an alginate hydrogel), fragments of a solid, and aggregations of solid elements. The particle may comprise (e.g., formed from) materials such as metals, metallic alloys, ceramics, polymers, solvents, fibers, inert materials, and combinations thereof. A particle may be completely made up of one type of material or a mixture of two or more different materials. In an embodiment, a particle comprises a hydrogel, which may be formed from a polymer fluid comprising a single polymer or a mixture of different polymers.

In an embodiment, a particle comprises a single compartment. In an embodiment, a particle comprises a plurality of compartments, for example, a first compartment (inner) and a second compartment (outer). In some embodiments, for a particle comprising a first compartment and a second compartment, the second compartment completely surrounds the first compartment, and the inner boundary of the second compartment forms an interface with the outer boundary of the first compartment. In such embodiments, the thickness of the second compartment means the average distance between the outer boundary of the second compartment and the interface between the two compartments. In some embodiments, the thickness of the outer compartment is greater than about 10 nanometers (nm), preferably 100 nm or greater and can be as large as 1 mm. For example, the thickness of the outer compartment in a particle described herein may be: (a) any of 10 nm, 100 nm, or 500 nm to 1 millimeter (mm), (b) 1 micrometer ($\mu$m) to any of 1 mm, 500 $\mu$m, or 250 $\mu$m, (c) 5 $\mu$m to 500 $\mu$m or 250 $\mu$m, or (d) 10 $\mu$m to any of 1 mm, 500 $\mu$m, or 250 $\mu$m. In some embodiments, the thickness of the outer compartment is between: (a) 100 nm and 1 mm, (b) 1 $\mu$m and 1 mm, (c) 1 $\mu$m and 500 $\mu$m or (d) 5 $\mu$m and 1 mm.

In some embodiments, both the first compartment and the second compartment comprise (e.g., are formed from) the same material, e.g., the same polymer. In some embodiments, the first compartment and the second compartment comprise different materials, e.g., different polymers. In some embodiments, one or both of the first and second compartments comprises a hydrogel-forming polymer, e.g., an alginate. In some embodiments, only the first or the second compartment comprises a hydrogel-forming polymer. In some embodiments, the hydrogel-forming polymer in the first compartment is different than the hydrogel-forming polymer in the second compartment. In some embodiments, the first compartment comprises an alginate and the second compartment comprises a different polymer (e.g., a polysaccharide, e.g., hyaluronate or chitosan). In some embodiments, the second compartment comprises an alginate and the first compartment comprises a different polymer (e.g., a polysaccharide, e.g., hyaluronate or chitosan).

Both the first compartment and the second compartment may include a single material (e.g., one type of polymer) or more than one material (e.g., a blend of different polymers). In some embodiments, the first compartment comprises only alginate (e.g., chemically modified alginate, or a blend of an unmodified alginate and a chemically modified alginate). In some embodiments, the second compartment comprises only alginate (e.g., chemically modified alginate or a blend of an unmodified alginate and a chemically modified alginate). In some embodiments, both the first and the second compartment independently comprise only alginate (e.g., chemically modified alginate or blend of an unmodified alginate and a chemically modified alginate).

In some embodiments, the polymer in one or both of the first and second compartments is (i) a low-molecular weight alginate, e.g., has an approximate MW<75 kDa and G:M ratio ≥1.5 ii) a medium molecular weight alginate, e.g., has approximate molecular weight of 75-150 kDa and G:M ratio ≥1.5. (iii) a high molecular weight alginate. e.g., has an approximate MW of 150 kDa-250 kDa and G:M ratio ≥1.5, (iv) or a blend of two or more of these alginates. In an embodiment, the polymer in the first (inner) compartment is an unmodified, high molecular weight (UM-HMW) alginate or an unmodified, medium molecular weight (UJM-MMW) alginate and the polymer in the second (outer) compartment is a blend of a chemically-modified alginate (CM) and an unmodified alginate, e g, the 70:30 CM-LMW-Alg-101:U-HMW-Alg as described in the Examples herein.

In some embodiments, a particle is a sphere and has a largest linear dimension (LLD), mean diameter or size that is: (i) 10 centimeters (cm) or smaller, preferably 10 cm, 9 cm, 8 cm, 7 cm, 6 cm, 5 cm, 4 cm, 3 cm, 2 cm, 1 cm, or smaller; or (ii) within a range of (a) 0.5 mm or 1 mm up to 10 cm, (b) 1 mm to any of 1.5 cm, 2 cm, 3 cm, 4 cm, 5 cm, 6 cm or 8 cm, or (c) 2 mm to any of 3 cm, 4 cm, 5 cm, 6 cm, 7 cm or 8 cm. In some embodiments, the particle has an LLD, mean diameter or size between: (a) 0.5 mm and 5 cm, (c) 0.5 mm and 2.5 cm or (d) 0.5 mm and 1 cm.

In some embodiments, a particle is a sphere and has a LLD, mean diameter or size that is: (i) 10 millimeters (mm) or smaller, preferably 10 mm, 9 mm, 8 mm, 7 mm, 6 mm, 5 mm, 4 mm, 3 mm, 2 mm, 1 mm or smaller, or (ii) within a range of (a) 0.5 mm to any of 5 mm, 4 mm, 3 mm, 2 mm or 1 mm, (b) 1 mm to any of 10 mm, 8 mm, 6 mm, 5 mm, 4 mm, 3 mm, 2 mm, or 1.5 mm, or (c) 1.5 mm to any of 8 mm, 6 mm, 5 mm, 4 mm, 3 mm, or 2 mm. In some embodiments, the particle has a LLD, mean diameter or size between 0.75 mm and 2 mm or between 0.75 mm and 1.5 mm.

In some embodiments, a particle is a sphere and has a LLD, mean diameter or size that is 1 millimeter (mm) or smaller or is within a range of any of 0.3 mm, 0.4 mm, 0.5 mm, 0.6 mm, 0.7 mm, 0.8 mm or 0.9 mm to 1 mm.

In some embodiments, a particle comprises at least one pore or opening, e.g., to allow for flow of desired materials in and out of the particle, e.g., nutrients for encapsulated cells to flow in and therapeutic protein produced by the cells to flow out. In some embodiments, the mean size of pores in the particle (the "mean pore size") is about 1 nm to about 10 nm, about 10 nm to about 0.1 $\mu$m, 0.01 $\mu$m to about 100 $\mu$m, 0.1 $\mu$m to about 10 $\mu$m or is between: (a) 0.1 $\mu$m and any of 10 $\mu$m, 5 $\mu$m, 2 $\mu$m, or 1 $\mu$m, (b) 0.15 $\mu$m and any of 10 $\mu$m, 5 $\mu$m, or 2 $\mu$m, (c) any of 0.2 $\mu$m, 0.25 $\mu$m or 0.5 $\mu$m and 10 $\mu$m, (d) 0.25 $\mu$m and 5 $\mu$m, (e) any of 0.5 $\mu$m, 0.75 $\mu$m or 1.0 $\mu$m and 10 $\mu$m, (e) 1 $\mu$m and either 5 $\mu$m or 2 $\mu$m, (f) 2 $\mu$m and either 10 $\mu$m or 5 $\mu$m, or (f) 5 $\mu$m and 10 $\mu$m. In some embodiments, the mean pore size of the first compartment and the second compartment of the particle is substantially the same. In some embodiments, the mean pore size of the first compartment and the second compartment of the particle differ by about 1.5%, 2%, 5%, 7.5%, 10%, 15%, 20%, 25%, 30%, 35%, 40%, 45%, 50%, 55%, 60%, 65%, 70%, 75%, or more. In some embodiments, the mean pore size of the particle (e.g., mean pore size of the first compartment and/or mean pore size of the second compartment) is dependent on a number of factors, such as the material(s) within each compartment and the presence and density of a chemical modification on the particle surface.

In some embodiments, a particle described herein comprises (e.g., encapsulates) a cell (meaning a single cell or a plurality of cells of a single cell type). In some embodiments, the cell is engineered to produce a therapeutic agent (e.g., a protein or polypeptide, e.g., an antibody, protein, enzyme, or growth factor). In some embodiments, the particle comprises more than one compartment and a cell. In some embodiments, in a particle with a first compartment and a second compartment, the cell is disposed with the first (inner) compartment. In some embodiments, in a particle with a first compartment and a second compartment, the cell is disposed with the second (outer) compartment. In some embodiments, the cell is disposed in the first compartment and the second compartment does not comprise a cell.

In some embodiments, a particle is capable of preventing materials over a certain size from passing through a pore or opening. In some embodiments, a particle is capable of preventing materials greater than 50 kD, 75 kD, 100 kD, 125 kD, 150 kD, 175 kD, 200 kD, 250 kD, 300 kD, 400 kD, 500 kD, 750 kD, or 1,000 kD from passing through.

The particle may be configured to release one or more exogenous substances, e.g., a therapeutic agent and/or immune-modulating agent described herein. The release of an exogenous agent may be at a controlled rate over time. In some embodiments, the therapeutic agent is a biological material. In some embodiments, the therapeutic agent is a nucleic acid (e.g., an RNA or DNA), protein (e.g., a hormone, enzyme, antibody, antibody fragment, antigen, or epitope), small molecule, lipid, drug, vaccine, or any derivative thereof, e.g., as described herein. In some embodiments, the particle is configured to release an anti-inflammatory drug as described in U.S. Pat. No. 10,278,922. For example, an anti-inflammatory drug or other immune-modulating agent that is capable of reducing the foreign body response may be covalently or non-covalently bound to the external surface of the particle, dispersed within the outer compartment of the particle, or bound to polymeric particles dispersed within the outer compartment.

An apparatus described herein can be used to produce particle preparations in which the mean mechanical strength of particles in the preparation is more consistent and/or higher than in particle preparations produced using a prior art batch method. In an embodiment, a desired mechanical strength refers to the ability of the particle to maintain its shape and/or remain intact when subjected to any one or more of the following stressors: (i) compression (e.g., at a constant rate); (ii) during administration (e.g., implantation) to a subject; and (iii) after a desired implantation period. The mechanical strength of a particle may be measured prior to implantation of the particle in a subject and/or after retrieval of the implanted particle (e.g., after 1 day, 2 days, 3 days, 4 days, 5 days, 6 days, 1 week, 2 weeks, 3 weeks, 4 weeks, 6 weeks, 8 weeks, 12 weeks, or longer after implant). In an embodiment, the desired mechanical strength of a particle is the ability to remain intact at a desired timepoint after implantation in a subject, e.g., both the outer and inner compartments of a hydrogel capsule removed from a subject are visibly intact after retrieval from an immune competent mouse when observed by optical microscopy, e.g., by bright-field imaging. In an embodiment, the desired mechanical strength of a particle (e.g., a hydrogel capsule) determined after manufacture but before implantation is determined by performing a fracture test using a texture analyzer as described herein.

The present disclosure also provides a particle preparation manufactured as a single batch by an apparatus described herein. In an embodiment, the particle preparation is intended for implantation or administration to a subject. In some embodiments, at least 80%, 85%, 90%, 95%, 96%, 97%, 98%, 99% or 100% of the particles in the particle preparation share in common at least one, two or all of the characteristics as described herein, e.g., cell number, mechanical strength, mean diameter or mean pore size.

In some embodiments, the particle or particle preparation is not a particle or particle preparation disclosed in any of WO2012/112982, WO2012/167223, WO2014/153126, WO2016/019391, WO2016/187225, US2012-0213708, US 2016-0030359, and US 2016-0030360.

Particle Fluid

The particle fluid in the first and any additional particle fluid reservoirs may be any fluid that may provide a material suitable for forming a particle (or at least one compartment of a multi-compartment particle), and in some embodiments for encapsulating a cell. In some embodiments, a particle fluid may be any fluid that may be solidified sufficiently to encapsulate cells or fine solids.

In some embodiments, a particle fluid comprises a polymer (or polymer components, e.g., monomeric subunits). A polymer in a particle fluid may be a linear, branched, or cross-linked polymer, or a polymer of selected molecular weight ranges, degree of polymerization, viscosity or melt flow rate. Branched polymers can include one or more of the following types: star polymers, comb polymers, brush polymers, dendronized polymers, ladders, and dendrimers. A polymer may be a thermoresponsive polymer, e.g., gel (e.g., becomes a solid or liquid upon exposure to heat or a certain temperature) or a photo- or thermally-crosslinkable polymer. The polymer may be a biodegradable polymer. The amount of the polymer in the particle fluid (e.g., by % weight or % volume of the fluid, relative to actual weight of the polymer) can be at least 0.5%, e.g., at least 0.5%, 1%, 1.5%, 2%, 2.5%, 3%, 4%, 5%, 6%, 7%, 8%, 9%, 10%, 12.5%, 15%, 20%, 25%, 30%, 35%, 40%, 45%, 50%, or more, e.g., w/w; less than 50%, e.g., less than 40%, 30%, 25%, 20%, 15%, 10%, 5%, or less.

Exemplary polymers include polystyrene, polyethylene, polypropylene, polyacetylene, poly(vinyl chloride) (PVC), glycosides, polyolefin copolymers, poly(urethane)s, polyacrylates and polymethacrylates, polyacrylamides and polymethacrylamides, poly(methyl methacrylate), poly(2-hydroxyethyl methacrylate), polyesters, polysiloxanes, polydimethylsiloxane (PDMS), polyethers, poly(orthoester)s (POE), poly(carbonates), poly(hydroxyalkanoate)s, polyfluorocarbons, polyether ether ketone (PEEK), polytetrafluoroethylene (PTFE), silicones, epoxy resins, poly-para-phenylene terephthalamide, polyethylene terephthalate (PET), polyethylene glycol (PEG), nylon, polyalkenes, phenolic resins, natural and synthetic elastomers, adhesives and sealants, polyolefins, polysulfones, polyacrylonitrile, biopolymers such as polysaccharides and natural latex, collagen, hydrolyzed collagen, cellulosic polymers (e.g., alkyl celluloses, etc.), and 2-hydroxyethyl methacrylate (HEMA), polysaccharides, poly(glycolic acid), poly(L-lactic acid) (PLLA), poly(lactic glycolic acid) (PLGA), polydioxanone (PDA), or racemic poly(lactic acid), polycarbonates, (e.g., polyamides (e.g., nylon)), poly(N-isopropylacrylamide-co-acrylic acid)-poly(L-lactic acid) (NAL): poly(N-isopropyl acrylamide) (PNIPAM) grafted to other polymers such as carboxymethylcellulose (CMC) copolymers or polymers including block copolymers and end-functionalized polymers, composites or copolymers containing thermo-sensitive poly(2-ethoxyethyl vinyl ether) and/or poly(hydroxyethyl vinyl ether), fluoroplastics, carbon fiber, agarose, alginate, chitosan, and modified (e.g., derivatized or otherwise altered) versions, blends, or copolymers thereof.

In some embodiments, the particle fluid may comprise poly (alpha-hydroxy acids), polyglycolide (PG), PEG conjugates of poly (alpha-hydroxy acids), polyaspirins, polyphosphagenes, gelatin, hydrolyzed gelatin, fractions of hydrolyzed gelatin, elastin, starch, pre-gelatinized starch, saccharose, sorbitol, mannanes, jaluronic acid, polyamino acids, polyalcohols, polyglycols, talc, magnesiurmstearate, glyceryl behenate, stearic acid, titanic dioxide, hyaluronic acid, albumin, fibrin, vitamin E analogs, such as alpha tocopheryl acetate, d-alpha tocopheryl succinate, D,L-lactide, or L-lactide, caprolactone, dextrans, vinylpyrrolidone, polyvinyl alcohol (PVA), PVA modified with polyvinyl alcohol (PVA), PVA modified with hydrophilic co-monomers, e.g., AMPS, PVA modified with fast crosslinking groups, e.g., NAAADA, PVA modified with polyvinylpyrroline (PVP), carboxymethyleellulose, poly(vinyl ether), co-polymers of VA and PEG, polypropylene glycol (PPG), co-polymers of PEG and PPG, co-polymers of PVA or PPG, polyacrylonitrile, hydrocolloids, e.g. agar, alginates, collagen, elastin, chitin, chitosan, gelatin, sugar, mannitol, or the likePVA-g-PLGA, PEGT-PBT copolymier (polyactive), methacrylates. PEO-PPO-PAA copolymers, PLGA-PEO-PLGA, PEG-PLG, PLG, PLA-PLGA, poloxamer 407, PEG-PLGA-PEG triblock copolymers, SAIB (sucrose acetate isobutyrate), polydioxanone, methylmethacrylate (MMA), MMA and N-vinylpyyrolidone, polyamide, oxycellulose, copolymer of glycolic acid and trimethylene carbonate, polyesteramides, polymethylmethacrylate, silicone, or combinations thereof.

In some embodiments, a polymer in the particle fluid may comprise polyurethane, polyurea, polyether(amide), PEBA, thermoplastic elastomeric olefin, copolyester, and styrenic thermoplastic elastomeor, PEO-PPO-PEO (poloxamers) or combinations thereof.

In an embodiment, the polymer is a cellulose. e.g., carboxymethyl cellulose. In an embodiment, the polymer is a polylactide, a polyglycoside or a polycaprolactone. In an embodiment, the polymer is a hyaluronate, e.g. sodium hyaluronate. In an embodiment, the polymer is a polyurethane, a PVP, or a PEG. In an embodiment, the polymer is a collagen, elastin or gelatin.

In some embodiments, the polymer comprises a polyethylene. Exemplary polyethylenes include ultra-low-density polyethylene (ULDPE) (e.g., with polymers with densities ranging from 0.890 to 0.905 g/cm$^3$, containing comonomer); very-low-density polyethylene (VLDPE) (e.g., with polymers with densities ranging from 0.905 to 0.915 g/cm$^3$, containing comonomer); linear low-density polyethylene (LLDPE) (e.g., with polymers with densities ranging from 0.915 to 0.935 g/cm$^3$, contains comonomer); low-density polyethylene (LDPE) (e.g., with polymers with densities ranging from about 0.915 to 0.935 g/m$^3$); medium density polyethylene (MDPE) (e.g., with polymers with densities ranging from 0.926 to 0.940 g/cm$^3$, may or may not contain comonomer); high-density polyethylene (HDPE) (e.g., with polymers with densities ranging from 0.940 to 0.970 g/cm$^3$, may or may not contain comonomer).

In some embodiments, the polymer comprises a polypropylene. Exemplary polypropylenes include homopolymers, random copolymers (homophasic copolymers), and impact copolymers (heterophasic copolymers), e.g., as described in McKeen, *Handbook of Polymer Applications in Medicine and Medical Devices,* 3—Plastics Used in Medical Devices, (2014):21-53, which is incorporated herein by reference in its entirety.

In some embodiments, the polymer comprises a polystyrene. Exemplary polystyrenes include general purpose or crystal (PS or GPPS), high impact (HIPS), and syndiotactic (SPS) polystyrene.

In some embodiments, the polymer comprises a thermoplastic elastomer (TPE). Exemplary TPEs include (i) TPA-polyamide TPE, comprising a block copolymer of alternating hard and soft segments with amide chemical linkages in the hard blocks and ether and/or ester linkages in the soft blocks; (ii) TPC-co-polyester TPE, consisting of a block copolymer of alternating hard segments and soft segments, the chemical linkages in the main chain being ester and/or ether; (iii) TPO-olefinic TPE, consisting of a blend of a polyolefin and a conventional rubber, the rubber phase in the blend having little or no cross-linking; (iv) TPS-styrenic TPE, consisting of at least a triblock copolymer of styrene and a specific diene, where the two end blocks (hard blocks) are polystyrene and the internal block (soft block or blocks) is a polydiene or hydrogenated polydiene; (v) TPU-urethane TPE, consisting of a block copolymer of alternating hard and soft segments with urethane chemical linkages in the hard blocks and ether, ester or carbonate linkages or mixtures of them in the soft blocks; (vi) TPV-thermoplastic rubber vulcanizate consisting of a blend of a thermoplastic material and a conventional rubber in which the rubber has been cross-linked by the process of dynamic vulcanization during the blending and mixing step; and (vii) TPZ-unclassified TPE comprising any composition or structure other than those grouped in TPA, TPC, TPO, TPS, TPU, and TPV.

In some embodiments, the polymer in a particle fluid comprises a polysaccharide, and the polysaccharide is an alginate. Alginate is a polysaccharide made up of β-D-mannuronic acid (M) and α-L-guluronic acid (G). In some embodiments, the alginate is a high guluronic acid (G) alginate, and comprises greater than about 50%, 55%, 60%, 65%, 70%, 75%, 80%, 85%, 90%, or more guluronic acid (G). In some embodiments, the alginate is a high mannuronic acid (M) alginate, and comprises greater than about 50%, 55%, 60%, 65%, 70%, 75%, 80%, 85%, 90%, or more mannuronic acid (M). In some embodiments, the ratio of M:G is about 1. In some embodiments, the ratio of M:G is less than 1. In some embodiments, the ratio of M:G is greater than 1. In some embodiments, the alginate has an approximate molecular weight of <75 kDa, and optionally a G:M ratio of ≥1.5. In some embodiments, the alginate has an approximate molecular weight of 75 kDa to 150 kDa and optionally a G:M ratio of ≥1.5. In some embodiments, the alginate has an approximate molecular weight of 150 to 250 kDa and optionally a G:M ratio of ≥1.5. In alginate-containing particle fluid, the amount of alginate (e.g by % weight or % volume of the fluid, relative to actual weight of the alginate) can be 0.5%, e.g., at least 0.5%, 1%, 1.5%, 2%, 2.5%, 3%, 4%, 5%, 6%, 7%, 8%, 9%, 10%, 12.5%, 15%, 20%, 25%, 30%, 35%, 40%, 45%, 50%, or more, e.g., w/w; less than 50%, e.g., less than 40%, 30%, 25%, 20%, 15%, 10%, 5%, or less.

In one embodiment, the particle fluid comprises a single type of polymer. In another embodiment, the particle fluid comprises more than one type of polymer, e.g., two types of polymer or three types of polymer. In some embodiments, the particle fluid comprises an alginate. In some embodiments, the particle fluid comprises alginate and a second type of polymer (e.g., a polysaccharide, e.g., hyaluronate or chitosan).

A polymer in the particle fluid may be chemically modified, for example, with a small molecule, peptide, or protein. In an embodiment, a polymer in the particle fluid (e.g., alginate) is modified with a compound comprising an amide, carboxyl, ester, amine, aryl ring, heteroaryl ring, cycloalkyl ring, a heterocyclyl ring, or a polyethylene glycol moiety. In an embodiment, a polymer in the particle fluid (e.g., alginate) is modified with a compound described in any one of WO2012/112982, WO2017/075630, WO2017/075631, WO2017/218507, or WO2018/067615. In an embodiment, the compound is a small molecule compound having the following structure:

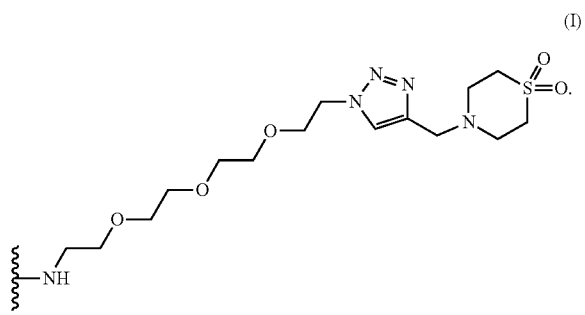 [SMILES: *NCCOCCOCCOCCn1cc(CN2CCS(=O)(=O)CC2)nn1]

Cells

The particles produced by an apparatus of the present disclosure may comprise (e.g., encapsulate) a wide variety of different prokaryotic and eukaryotic cell types, including epithelial cells, endothelial cells, fibroblast cells, mesenchymal stem cells, keratinocyte cells, islet cells. Exemplary cell types include the cell types recited in WO 2017/075631, WO 2018/067617 or WO 2019/067766. In an embodiment, the particles comprise mammalian cells, which may be from the same or different mammalian species than an intended recipient for the particles. In an embodiment, the cells may be from the intended recipient for the particles. In an embodiment, the cells are derived from human cells, e.g., derived from human RPE cells. In an embodiment, the cells are differentiated from induced pluripotent stem cells (iPSC) into a desired cell type (e.g., beta cells). In an embodiment, the particles described herein comprise a plurality of cells of a single type. In an embodiment, the particles comprise a mixture of cells of two different types, e.g., a first plurality of cells expressing one exogenous substance (e.g., a therapeutic agent) and a second plurality of cells expressing a different exogenous substance. In an embodiment, the particles comprise a mixture of pancreatic cell types differentiated from an iPSC cell line. In an embodiment, the plurality of cells is in the form of a cell suspension prior to being encapsulated within a particle described herein. The cells in the suspension may take the form of single cells (e.g., from a monolayer cell culture), or provided in another form, e.g., disposed on a microcarrier (e.g., a bead or matrix) or as a three-dimensional aggregate of cells (e.g., a cell cluster or spheroid). The cell suspension can comprise multiple cell clusters (e.g., as spheroids) or microcarriers.

In some embodiments, the cells have been engineered to produce a therapeutic agent for the prevention or treatment of a disease, disorder, or condition described, e.g., in WO 2017/075631, WO 2018/067617 or WO 2019/067766. The therapeutic agent may be any biological substance, such as a nucleic acid (e.g., a nucleotide, DNA, or RNA), a polypeptide, a lipid, a sugar (e.g., a monosaccharide, disaccharide, oligosaccharide, or polysaccharide), or a small molecule. Exemplary therapeutic agents include the agents listed in WO 2017/075631, WO 2018/067617 or WO 2019/067766.

In some embodiments, the therapeutic agent is a peptide or polypeptide (e.g., a protein), such as a hormone (e.g., insulin, parathyroid hormone), enzyme (e.g., alpha-galactosidase A, alpha-L-iduronidase, N-acetyl-alpha-d-glucosaminidase, N-acetylglucosamine 4-sulphatase, urate oxidase, phenyalanine hydroxylase, phenylalanine ammonia lyase), cytokine (e.g., interleukin 2), cytokine receptor, growth factor, blood clotting or coagulation factor (e.g., factor VIII, factor IX, factor VII, von Willebrand factor), lipoprotein, antibody (including e.g., monoclonal antibody, antigen binding fragments) (e.g., anti-VEGF antibody), chimeric protein or a fusion protein (e.g., Factor IX-albumin fusion). A peptide or polypeptide produced by an engineered cell can comprise a naturally occurring human or non-human amino acid sequence, or may contain a variant of the naturally occurring sequence. The variant can be a naturally occurring or non-naturally occurring amino acid substitution, polymorphism mutation, deletion or addition relative to the reference naturally occurring sequence.

The cells described herein may produce a single therapeutic agent or a plurality of therapeutic agents. The plurality of therapeutic agents may be related or may form a complex. In some embodiments, the therapeutic agent secreted or released from a particle comprising a cell is in an active form. In some embodiments, the therapeutic agent is secreted or released from a particle comprising a cell an inactive form, e.g., as a prodrug. In the latter instance, the therapeutic agent may be activated by a downstream agent, such as an enzyme.

Conditioning Fluid

The conditioning fluid in the first conditioning fluid reservoir may be any fluid that is useful for forming a particle or conditioning a particle. In an embodiment, the conditioning fluid alters a particle attribute, e.g., the degree of cross-linking between two elements of a particle, e.g., between two polymer molecules. For example, a conditioning fluid may be a fluid that forms a covalent bond in a material of a particle. In some embodiments, a conditioning fluid is a fluid that forms a crosslink element or a crosslink surface element. In some embodiments the conditioning fluid may impart two or more characteristics to the particle.

In some embodiments, the particle (e.g., dispensed particle droplet) comprises a particular hydrogel-forming polymer or mixture of particular hydrogel-forming polymers and the first conditioning fluid comprises a cross-linking agent that is capable of cross-linking (covalently or non-covalently) molecules of that particular hydrogel-forming polymer or mixture. Various hydrogel-forming polymers and cross-linking method combinations are well-known in the art, any of which may be readily employed by the skilled artisan in an apparatus described herein. For example, particle droplets comprising an ionic polymer (such as alginate, chitosan) can be non-covalently cross-linked using a conditioning fluid comprising di- or trivalent counterions, particle droplets comprising a polymer with carboxyl groups (such as carboxymethyl cellulose) can be cross-linked (by hydrogen bonds) using a conditioning fluid with a lower pH than the pH of the particle fluid(s), particle droplets comprising polyvinyl alcohol or carboxymethyl cellulose can be covalently cross-linked using a conditioning fluid comprising a chemical cross-linking agent such as glutaraldehyde, epichlorohydrin or 1,3-diaminopropane and particle droplets comprising a starch or polyvinyl alcohol can be cross-linked by a grafting polymerization method, e.g., using a conditioning fluid comprising a chemical reagent that activates the polymer chains.

Exemplary chemical crosslinking agents include mono- and dialdehydes, including glutaraldehyde and formaldehyde; polyepoxy compounds such as glycerol polyglycidyl ethers, polyethylene glycol diglycidyl ethers and other polyepoxy and diepoxy glycidyl ethers; tanning agents including polyvalent metallic oxides such as titanium dioxide, chromium dioxide, aluminum dioxide, zirconium salt, as well as organic tannins and other phenolic oxides derived from plants; chemicals for esterification or carboxyl groups followed by reaction with hydrazide to form activated acyl azide functionalities in the collagen; dicyclohexyl carbodiimide and its derivatives as well as other heterobifunctional crosslinking agents; hexamethylene diisocynate; and/or sugars, including glucose.

In some embodiments, the particle comprises one or more alginates and the conditioning fluid comprises divalent cations, such as barium, calcium, strontium or magnesium. In some embodiments, the conditioning fluid comprises one or more of the following cross-linking agents: barium chloride, calcium chloride and strontium chloride.

The first and/or second conditioning fluid can be used to attach one or more layers of material to an outer surface of a particle. For example, layer-by-layer (LBL) deposition may be used to coat a particle by exposing the particle to a series of conditioning fluids that contain coating components that alternate in ionic charge. The alternating LBL conditioning stages may be separated by wash stages to remove excess ionic coating material between coating steps. In another embodiment, the surface of a particle may be coated by exposing it to a conditioning fluid that contains a molecule that is attracted to the particle through hydrophobic interactions (eg, an amphipathic polymer or small molecule). Excess coating molecule may be removed by exposing the particle to suitable wash solutions in subsequent stages.

Subsequent Conditioning Fluids

A subsequent conditioning fluid is a conditioning fluid that is typically introduced or contacted with a particle or plurality of particles after contact with a previous conditioning fluid. For example, particles may be contacted with a first subsequent conditioning fluid following conditioning in the first and any second conditioning fluid, particles may be contacted with a second subsequent conditioning fluid following conditioning in the first subsequent conditioning fluid, particles may be contacted with a third subsequent conditioning fluid following conditioning in the second subsequent conditioning fluid, etc. Typically, a subsequent conditioning fluid is introduced, or put in contact with a particle, at a point in the conditioning process after the particle has contacted a previous conditioning fluid, or at a point in the apparatus downstream from the point in the apparatus where the particle first came into contact with the previous conditioning fluid, e.g., any first subsequent conditioning fluid is introduced via a first subsequent fluid exchange module, any second subsequent conditioning fluid is introduced via the second subsequent fluid exchange module, any third subsequent conditioning fluid is introduced via the second subsequent fluid exchange module, etc.

In an embodiment, a subsequent conditioning fluid is used to wash away a component, e.g., the first conditioning fluid (e.g., cross-linking agent) and any second conditioning fluid from particles. A subsequent conditioning fluid may be a fluid that results in substantially less conditioning than the previous conditioning fluid(s). In an embodiment, a subsequent conditioning fluid results in less than 10, 5, 1, 0.1, or 0.01 of the amount of conditioning given by the previous conditioning fluid under otherwise similar conditions. A subsequent conditioning fluid may not react with the particles, or reacts to a lesser extent than the previous conditioning fluid(s). In an embodiment, the first subsequent conditioning fluid contains a substantially lower concentration of a conditioning reagent, for example, a cross-linking reagent, than the previous conditioning fluids. In an embodiment, the concentration of the conditioning reagent (e.g., cross-linking agent) in the first subsequent conditioning fluid is 10-, 5-, 1-, 0.1- or 0.01-fold lower than in the previous conditioning fluid(s). In an embodiment, a subsequent conditioning fluid completely lacks one or more conditioning reagents present in the previous conditioning fluid(s). In an embodiment, a subsequent conditioning fluid does not modify an attribute of the particles, but modifies the composition of the fluid carrying the particles, e.g., to increase the stability or shelf-life of the particles, e.g., adding a buffering agent, one or more salts and the like.

Conditioning Chamber

The conditioning chamber includes an enclosed vessel component that supports a fluid, such as a conditioning fluid. The vessel can optionally be sterile, temperature controlled, contain a specific gaseous environment, etc.

A fixed electrostatic field is provided above a receiving surface of fluid in the vessel component of the conditioning chamber. The electrostatic field promotes particle formation and affects particle motion as the particles travel towards the receiving surface.

Particle Separators

Particle separators are structures that are useful for separating particles of a first class from particles of one or more other classes. An apparatus of the present disclosure may include various particle separators, which are capable of separating particles based on size, weight, density, surface charge, hydrophobicity, capacitance, conductivity, opacity (e.g. UV, visible, or IR absorbance), magnetism, specific molecular affinity (e.g, antibody or biotin-streptavidin binding) or other particle features using methods/mechanisms known in the art. Such mechanisms may include vacuum, magnets or other forces that can guide particle paths depending on the composition of the particles.

A first example of a particle separator is a capture element that is positioned between the particle dispensing unit and a receiving surface of a conditioning fluid so that the capture element allows first class particles to impinge the fluid receiving surface, but intersects a flight path of particles other than first class particles (e.g. second class particles) so that they impinge a surface of the capture element rather than the fluid receiving surface.

A second example of a particle separator is a filter in a fluid exchange unit. An exchange unit includes two intersecting lumens that allow for the exchange of fluids flowing through the lumens. The two intersecting lumens meet at a transfer junction. The transfer junction includes a filter element, such as a sieve, extending over the cross section of a port from the transfer junction to one of the lumens. The filter element prevents particles that have sufficiently large dimensions from passing through the port at which the filter element is located.

Rate of Particle Dispensing

In some embodiments, the apparatus is configured to allow modulation of the rate at which particles are dispensed from the particle dispensing unit. In some embodiments, the rate of dispensing particles is adjusted by a controller that is in communication with a sensor. In some embodiments, the sensor is operably linked to the particle dispensing unit for providing the signal. Examples of sensors and feedback control of the droplet rate based on the sensors is described further below.

In some embodiments, the particle dispensing unit is configured to receive a signal related to a particle parameter and, responsive to that signal, modulate the rate of dispensing particles.

Flight Path

Each particle follows a flight path from the particle dispensing unit toward a receiving surface of the conditioning fluid. An ideal flight path is the shortest direct line from the dispensing orifice of the dispensing unit to the receiving surface of the conditioning fluid. The flight path distance should be kept within a range such that the droplets do not break or form irregular particles upon striking the conditioning solution. The flight path distance should be kept long enough such that the impinging droplet can break the surface tension of the conditioning solution.

In an embodiment, not every particle will follow the ideal flight path. Due to the electrostatic field through which the particles travel between the dispensing port and the receiving surface, and due to the charge of a particle, a particle may follow a slightly curved path between the dispensing port and the receiving surface.

Pumps

The apparatus may include pumps to advance various fluids. The pumps may be selected from a variety of pumps. Examples of pumps include positive displacement pumps (e.g., peristaltic pumps, linear peristaltic pumps, syringe pumps, gear pumps, piston pumps, screw extruders, diaphragm pumps) and velocity pumps (e.g., centrifugal pumps). Fluids may also be advanced by applying external pressure, e.g, by applying a pressurized gas to the headspace of a container containing fluid and a conduit for egress for the fluid, or by applying external pressure to a flexible container of fluid that has a conduit of egress for the fluid.

Pulse Dampeners

A pulse dampener allows for reducing instantaneous deviations of the flow rate between two different fluids as they flow through a cross-piece. A pulse dampener may consist of a chamber containing a gas (e.g., sterile air) that expands or contracts as fluid pulses into the chamber, thereby enabling fluid to exit the chamber at a more consistent rate. A pulse dampener may also consist of a chamber with a flexible membrane separating a compressible gas from a fluid under flow. In an embodiment, a pulse dampener is located between each pump and each entrance and exit portal of one or more of the cross-pieces in the conditioning lumens.

When fluid is being pumped in and pumped out of a cross-piece, an alternative to a pulse dampener may be used, e.g., have two peristaltic pumps operate in sync (to minimize instantaneous deviations in flow rates between the two fluids), or to have tubing for the in and out flows go through the same peristaltic pump, or use non-peristaltic pumps.

In other embodiments, one or more of the pulse dampening-pump combinations is replaced with a single pump through which the in and/or out fluid flow is controlled.

Diverter

A diverter allows for diversion of the particles as they are processed. Process analysis can be considered to be in-line (e.g., a probe in a vessel measuring the bulk of a batch), on-line (e.g., diversion of a stream that represents a portion of the batch), or at-line (e.g., a sample is physically removed for analysis). All three methods could be considered for different purposes when monitoring or operating an apparatus disclosed herein.

Diverters to provide particle or fluid diversion flow paths may be placed within or after the lumen component of the conditioning chamber, within or between any of the exchange units or exchange module, and upstream of the collection chamber. Particles and fluid may also be withdrawn from the particle collection chamber during or after production. The outlet of a diversion may flow to a collection container for further analysis or retain, to waste, or back to the process stream. Diversion flow paths may flow continuously or may be turned off and on.

Residence Time

The degree of conditioning of a particle that passes through an apparatus of the present disclosure can be dependent on the residence time of that particle in the conditioning fluid. If a particle spends an insufficient amount of time in the conditioning fluid, the particle may not achieve a desired property. The desired property may be, for example, the strength of the particle. If the particle spends too much time in the conditioning fluid, then the conditioning fluid can cause an undesirable effect. For example, if the particle spends too much time in the conditioning fluid, the conditioning fluid may kill an undesirable number of cells in the particles or may result in premature diffusion of a drug or medicament out of the particles.

In contrast with batch processing, an apparatus of the present disclosure is configured to provide first-in-first-out transit of particles through any chamber or transit lumen containing a conditioning fluid. The residence time for particles that are produced in a manufacturing run can be controlled to be at least substantially constant from particle to particle. Thus, the present disclosure provides a method that yields particles having consistent attributes from particle to particle.

The average particle residence time is greater than the average conditioning fluid volume element residence time. Due to friction between the particles and the wall of a transit lumen (e.g., lumen 68, lumen 130, lumen 133 of FIG. 1), among other reasons, the particles do not flow through the transit lumen as quickly as the conditioning fluid does. The average conditioning fluid volume element residence time is approximately equal to the lumen volume divided by the inlet fluid flowrate. The interior volume of the transit lumen is approximated to be a cylinder, which may not always be the actual interior shape of the transit lumen. The calculation ignores changes in local fluid densities, temperatures, and other variables that may change during the particle manufacturing run, because these changes are assumed to be negligible.

Figure 11:
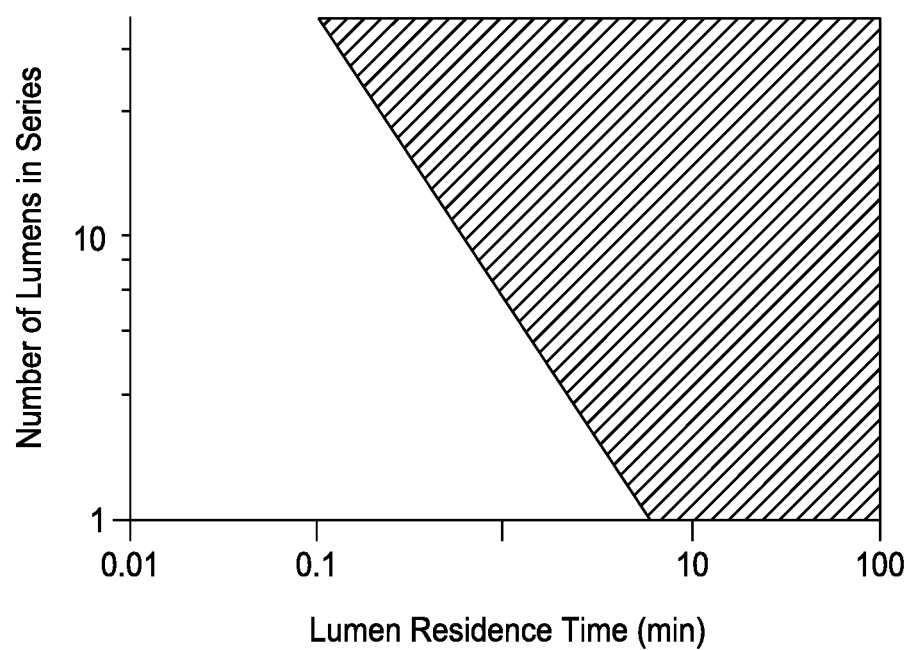
FIG. 11 is a graph of the number of wash lumens in series versus lumen residence time for a particular apparatus described herein.

The total particle residence time in a conditioning fluid, e.g., cross-linking solution, can be reduced by increasing the number of exchange modules in series, e.g., more exchanges with wash fluid, e.g., as illustrated in FIG. 11.

Exchange Units

An exchange unit allows for the reduction of concentration of one or more fluid components (e.g., a cross-linking agent, a dye, a detergent, a buffer, a salt) surrounding a particle or particles. In some embodiments, an exchange unit allows for a concentration of a fluid component surrounding a particle to be reduced by at least 50%, 75%, 80%, 85%. 90%, 95%, 99% or greater. In some embodiments, an exchange unit allows for a fluid surrounding a particle to be at least substantially entirely replaced with another fluid.

In some embodiments, an exchange unit includes a first lumen through which particles carried by a fluid pass through the exchange unit, and a second lumen that intersects the first lumen at a transfer junction. A filter across the second lumen at the transfer junction prevents particles having a particular attribute (e.g., size, shape, weight, charge or other characteristic) from being carried into the first lumen. In some embodiments, a first conditioning fluid carries particles through an inlet segment of the first lumen towards the transfer junction, and a different conditioning fluid flows through an inlet segment of the second lumen towards the transfer junction, and reduces the concentration of one or more components of the first conditioning fluid in the outlet segment of the first lumen.

In some embodiments, the mixing of the two conditioning fluids at the transfer junction is minimized and an interface forms between the two fluids, thereby allowing a substantially complete transfer of particles from one fluid to another fluid as the particles are carried through the first lumen of the exchange unit to the next downstream processing component of the apparatus.

According to an aspect of the present disclosure, one or more exchange units are provided separately from an apparatus for making conditioned particles. Although FIG. 1 shows exchange units 106a and 106b as part of an apparatus for making conditioned particles, the exchange units could be provided separately. In some embodiments, the exchange units may be used, for example, as replacement parts for an apparatus for making conditioned particles. In some embodiments, the exchange units may be used in a different apparatus.

Effect of Wash Stages on Particle Strength

More than one exchange unit connected in series may be used to reduce the concentration of cross-linking component(s) (e.g., divalent cations) in a first conditioning fluid that carries the particles. In some embodiments, the exchange unit(s) may remove all or substantially all of excess cross-linking agent (i.e., unincorporated and/or loosely bound cross-linking reagent) from the particles traveling through an apparatus according to the present disclosure. However, each subsequent exchange unit in the series is likely to remove less excess cross-linking components from the particles than the previous exchange unit. The skilled person can readily determine how many conditioning fluid exchanges are optimal to remove substantially all of the excess cross-linking components while preserving strong cross-linking ions and thus desired fracture strength. For example, alginate hydrogel spheres prepared in an apparatus as described in the Examples below possessed high strength and removal of substantially all of the excess barium cross-linking ions after passing through ten exchange units supplied with the wash fluid and two storage exchange units supplied with storage fluid, in which the particle residence time in each lumen was about two minutes. It is also contemplated that additional particle strength can be achieved by exposing the washed particles to a second cross-linking agent in a subsequent conditioning fluid.

The use of fluid exchange units in apparatuses of the present disclosure allows more efficient washing of particles than a manual batch method, which can require as many as 15 washing steps to achieve the same level of reduction of cross-linking agents in the particle preparation.

Feedback Control Features

One or more controllers are provided to automate various aspects of an apparatus or method according to the present disclosure. For example, the controller may be configured to control a frequency at which particles are dispensed from the particle dispensing unit, an average residence time of particles in a conditioning fluid, or other parameters in response to signals that the controller receives from various sensors.

In some embodiments, one or more controllers are provided to control flow through the apparatus by adjusting settings on various pumps in the apparatus. The flows could be monitored by flow sensors at various points in the apparatus, such as in one or more portions of lumens of the apparatus.

Sensors

Gas levels (e.g., gaseous or dissolved oxygen) may be monitored anywhere in the apparatus: in cell-free or cell-loaded particle fluids or their fluid reservoirs, in the volume enclosed by the housing above the receiving surface of conditioning fluid in the vessel component of the conditioning chamber or in the conditioning fluid in any part of the conditioning chamber, in incoming or exhausted conditioning fluids, in the particle flow path, in a particle or fluid diversion flow path, in the particle storage fluid or headspace in the particle collection chamber, or in vented gas or overflow fluid streams.

Probes that measure temperature, viscosity, dissolved ions (e.g., pH, $Ba^{+2}$, $Ca^{+2}$), other dissolved species, spectroscopic, or refractive properties may be placed in cell-free or cell-loaded particle fluids or in their fluid reservoirs, in the first and any second conditioning fluid, in incoming or exhausted subsequent conditioning fluids, along the particle flow path, in a particle diversion flow path, in the storage fluid or excess fluid exiting the storage container.

Imaging of particles (e.g., spheres) or other methods to measure particle transit speed or uniformity of one or more desired or target particle attributes (e.g., size, shape, cell density, etc.) may take place anywhere along particle flow paths: in the volume enclosed by the housing above the receiving surface of the first conditioning fluid or in the conditioning fluid chamber, anywhere along a particle transit lumen, in a particle or fluid diversion flow path, in any waste stream, in the particle collection chamber, or from a sample drawn from the particle collection chamber.

Sampling ports for withdrawing aliquots of particles (e.g., spheres) and/or fluids for off-line analysis may be placed anywhere along the wetted parts of the apparatus, e.g., in cell-free or cell-loaded particle fluids, in the first conditioning fluid, in any incoming or exhausted conditioning or subsequent conditioning fluids, in the particle flow path, in a particle or fluid diversion flow path, in the particle storage fluid in the collection chamber or in the excess fluid exiting the collection chamber.

Ports or devices for measuring process fluid or gas pressure or differential pressures may be installed in the volume enclosed by the housing above the receiving surface or in the vessel component of the conditioning chamber, in incoming or exhausted conditioning fluids, anywhere along the particle flow path, in a particle or fluid diversion flow path, in the particle storage fluid or headspace, in the fluid stream exiting the product container, or in vented gas.

Ports or devices for measuring process flow rates or monitoring flows for clogging may be installed in cell-free or cell-loaded particle transit lumens, in any incoming or exhausted conditioning fluid, anywhere along the particle flow path, in a particle or fluid diversion flow path, or in overflow fluid streams.

Methods to monitor fluid level in the conditioning chamber, any fluid reservoir or particle collection chamber may be visual, involve imaging, lasers, floats, differential pressure transmitters, load cells, magnetic level gauges, capacitance devices, or other methods.

Various sensors could serve as alarms to detect trending process conditions so that problems can be addressed before they become deviations. In some embodiments, signals from sensors could be used to control set points for pump flow rates. For example, if pump tubing is changing over time, the sensors could detect the change in actual flow rate and adjust the pump to correct it.

In an embodiment, an apparatus further includes software. Exemplary software includes software that controls the apparatus and/or provides a user interface for analysis of data.

Particle Collection Chamber

The particle collection chamber can be closed or open. In some embodiments, e.g., when the particles encapsulate a biological material such as cells, the chamber may be configured to maintain the particles in a single layer or may be configured to agitate the collected particles.

Materials

An apparatus according to the present disclosure can be manufactured from a variety of biocompatible materials. Materials may be selected consistent with Current Good Manufacturing Practices (CGMP) where necessary for medicinal or biological products. Non GMP materials may be used when particles are being manufactured for non-medical uses.

The dispensing port (e.g., as described herein) may be assembled from metals, polymers, or ceramic parts or combinations thereof. Metallic components may consist of, but are not limited to, elemental metals and alloys. Needles may be laminated, e.g. a metal needle with a metallic or polymeric coating, or a polymeric needle with a conductive coating.

Any part of an apparatus described herein that will come in contact with a fluid is preferably constructed of a material suitable for contact with fluids. Fluid-contacting parts may be provided as sterile, single-use parts, or as multi-use parts that are suitable for sterilization as needed. Fluid-contacting parts may be rigid or flexible and different parts may differ in composition and rigidity (e.g., the cap for the particle collection chamber may be rigid with a flexible seal). Each may be uniform in composition or may be coated, lined, or made of a composite or filled material. Each part may be made of polymer, glass, ceramic, metal or combinations thereof. Polymeric components may consist of polymers, copolymers, block copolymers, polymer blends, crosslinked polymers, or modified polymers. Polymeric material components may contain plasticizers, fillers, antioxidants or other additives.

Polymeric materials may include, but are not limited to: polyurethanes (PU's) polyvinylidene chlorides (PVC's), fluoropolymers (e.g., FEP, PFA, PTFE), polyesters (e.g., polyethylene terephthalates (PET) and modified PET's (e.g., polyethylene terephthalate glycol, (PETG)), polycarbonates (PC), polyethylene vinyl acetates (EVA), polyketones and polyalkylketones (e.g., PEEK), polystyrene, polyaryletherulfones (e.g., polyether sulfone (PES)), polyimide, polyamides (e.g., nylons), silicones, polyolefins (e.g., polyethylenes, polypropylenes) and polyolefin elastomers, polyisoprenes (e.g., latex), and/or thermoplastic elastomers.

Connections

Any apparatus of the present disclosure may include modular parts that are connected together. Connections between parts that must maintain a seal against leakage may be mechanical (e.g., threaded or barbed), chemical (e.g., adhesive) or physicochemical (e.g., thermally, sonically, or solvent welded).

Particle Analysis

Particle preparations manufactured using an apparatus of the disclosure may be analyzed for various properties in vitro or at various times after implant into a subject, e.g. a test animal or a human patient.

For example, the mechanical strength of a particle (e.g., a hydrogel capsule) may be determined after manufacture but before implantation by performing a fracture test using a texture analyzer. In an embodiment, mechanical testing of hydrogel capsules is performed on a TA.XT plus Texture Analyzer (Stable Micro Systems, Surrey, United Kingdom) using a 5 mm probe attached to a 5 kg load cell. Individual capsules are placed on a platform and are compressed from above by the probe at a fixed rate of 0.5 mm/sec. Contact between the probe and capsule is detected when a repulsive force of 1 g is measured. The probe continues to travel 90% of the distance between the contact height of the probe and the platform, compressing the capsule to the point of bursting. The resistance to the compressive force of the probe is measured and can be plotted as a function of probe travel (force v. displacement curve). Typically, before a capsule bursts completely, it will fracture slightly and the force exerted against the probe will decrease a small amount. An analysis macro can be programmed to detect the first time a decrease of 0.25-0.5 g occurs in the force v. displacement curve. The force applied by the probe when this occurs is termed the initial fracture force. In an embodiment, the fracture force for a capsule preparation manufactured using an apparatus described herein is the average of the initial fracture force for at least 10, 20, 30 or 40 capsules.

Particles containing a cross-linked hydrogel can be analyzed for the amount of cross-linking agent. When the cross-linking agent includes barium ions, the amount of barium per particle in a particle preparation may be estimated by determining the average amount of barium per particle in an aliquot of particles from the population using any analytical technique known in the art. For example, for a population of alginate hydrogel capsules cross-linked with barium, a known quantity of capsules, e.g., about 20 capsules, is incubated with about 5 milliliters of nitric acid for 2 hours at 106° C. to digest the hydrogel and then ultrapure water is added to bring the volume up to 25 milliliters and a sample of the diluted digestion mixture is assayed for barium concentration (micrograms barium/sample volume) using inductively coupled mass spectrometry. The concentration is multiplied by the total volume of the diluted digestion mixture and then divided by the number of capsules to obtain the average barium concentration per capsule in the preparation.

The average particle size in a particle preparation can be estimated by determining the average particle size in an aliquot using any analytical technique known in the art. In an embodiment, a desired number of particles (e.g., at least 10, 20 or 30) are removed from the preparation and examined by optical microscopy, e.g., by brightfield imaging.

ENUMERATED EMBODIMENTS

1. An apparatus (e.g. an apparatus exemplified by FIG. 1) for making conditioned particles comprising:

a) a particle dispensing unit comprising an orifice from which particles, e.g. droplets comprising a polymer fluid, e.g., particles comprising a plurality of cells, e.g., suspended in the polymer fluid, are dispensed;

b) a conditioning chamber configured to hold a first fluid, e.g., a conditioning fluid, to present a receiving surface of the first fluid, and to receive particles from the particle dispensing unit; and c) a property selected from i) to x):

i) the apparatus is configured to separate particles from one another based on an attribute of the particles, e.g., to separate a particle of a first class (a first class particle) from a particle of a second class (a second class particle), i.a) the apparatus is configured to separate a particle of a first class from a particle of a second class after particle dispensation but prior to the dispensed particle impinging on the receiving surface of the first fluid, e.g., conditioning fluid, disposed in the conditioning chamber, and comprises a capture element disposed between the orifice and receiving surface and configured and to hinder, e.g., by capture, a second class particle from impinging on the receiving surface of the first fluid; or i.b) the apparatus comprises a filter element, e.g., a sieve, for fractionation, e.g., size fractionation, of conditioned particles, disposed, e.g., in an exchange unit;

ii) a component of the apparatus, e.g., the particle dispensing unit, is configured to receive a signal, e.g., a signal related to a particle parameter or a process parameter, and responsive to that signal modulate the process parameter or the particle parameter;

ii.a) the apparatus is configured such that responsive to a signal, e.g., a signal which is a function of a particle parameter, e.g., size or shape, a field through which the particle passes, is modulated;

ii.b) the apparatus is configured to sense a distance from the orifice to the receiving surface of the first fluid in the conditioning chamber (e.g. the sensor (such as a non-contact sensor or a contact sensor) may sense a height of the orifice of the dispensing unit or a height of the receiving surface in the conditioning chamber) and to change that distance, e.g., to match a reference, e.g., a desired distance (e.g. the apparatus is configured to change a pressure or a partial pressure of a displacement entity, such as a gas, in the conditioning chamber);

iii) the apparatus includes one or more sensors for sensing a parameter, such as an attribute of one or more particles or a parameter of a fluid;

iv) the orifice and the receiving surface are disposed within a housing wherein the housing comprises a port in connection with a source of displacement entity, e.g., a gas, e.g., a pressurized gas, e.g., pressurized air, $O_2$, $N_2$, or a mixture thereof, or a liquid, and the housing is configured such that the distance between a receiving surface of the first fluid and the orifice is capable of being modulated by modulating the volume of displacement entity within the chamber;

v) the conditioning chamber comprises, in fluid connection, a portion configured to present the receiving surface and an exit portal, configured such that a received particle, e.g., wherein a fluid comprising a received particle, flows through the conditioning chamber and through the exit portal;

vi) the apparatus comprises a source of the first fluid, e.g., a first-fluid reservoir, in fluid connection with a first-fluid inlet port on the conditioning chamber and the apparatus is configured so as to allow introduction of the first fluid, e.g., fresh first fluid, through the first-fluid inlet port into the first-fluid chamber;

vii) a portion, or all, of the conditioning chamber beneath the receiving surface is configured to provide a substantially linear path for conditioned particles transiting it, e.g., such that the residence time of conditioned particles in the conditioning chamber are substantially similar;

viii) the apparatus comprises an exchange unit in fluid connection with the exit portal of the conditioning chamber in which conditioned particles are separated from the first fluid (e.g. by introduction of a second fluid, optionally with one or more exchange units such as 106a and/or 106b);

ix) the apparatus comprises a plurality of exchange units selectively connectable to other elements of the apparatus to allow an exchange unit of the plurality to be in-line or off-line, e.g., the apparatus can be configured to take an exchange unit off-line or on-line responsive to an attribute of the particle or plurality of particles; and x) the apparatus is configured such that the orifice, the receiving surface of the first fluid, and optionally a voltage potential through which the dispensed particles pass, are disposed within a housing that can maintain sterility.

2. The apparatus of embodiment 1, wherein the first fluid comprises conditioning fluid (e.g. from feature 74) and the second fluid comprises a subsequent conditioning fluid (e.g. from features 102, 108).

3. The apparatus of embodiment 1, comprising a), b), and iia), wherein responsive to a signal related to size from a sensor which is distal to the orifice, e.g., distal to the capture element and proximal to the receiving surface, a parameter, e.g., voltage, of the field is modulated (e.g. via feature 46 and 48).

4. The apparatus of embodiment 1, comprising a), b), iia), wherein responsive to a signal related to particle size or particle droplet rate, a parameter, e.g. voltage, of the field is modulated to cause a change in a dispensing parameter, e.g. dispensed droplet size, rate at which droplets are dispensed, flight path of the particles after being dispensed (e.g., the voltage (e.g. via features 46 and 48) of the orifice of the particle dispensing unit).

5. The apparatus of embodiment 1, comprising a), b), and iib), wherein the desired distance may be selected to allow the apparatus to separate at least one class of particles from at least one other class of particles as the particles move from the orifice (e.g. feature 18) towards the receiving surface 20.

6. The apparatus of embodiment 1, comprising: a), b), and iii), wherein the parameter or attribute may be a number of particles or a frequency of particles passing a point, and the sensor may include a sensor that counts particles passing the point, e.g., a location within the apparatus (e.g. a location along a flight path (e.g. feature 44) between the orifice (e.g. feature 18) and the receiving surface 20, a location in the lumen (e.g. feature 68) of the conditioning chamber, a location in a wash module, or another location).

7. The apparatus of embodiment 1, comprising: a), b), and iii), wherein a particle residence time may be determined based on a first and second particle sensor that sense, e.g., count, particles at a first and second point, e.g., the first and second part;

8. The apparatus of embodiment 1, comprising: a), b), and iii), wherein the attribute is a dimension parameter, such as particle size or shape.

9. The apparatus of embodiment 1, comprising: a), b), and iii), wherein the parameter is a temperature, pressure, or another parameter of the collection chamber (e.g. feature 24).

10. The apparatus of embodiment 1, comprising: a), b), and iii), wherein the parameter relates to a concentration of the first fluid (e.g., first conditioning fluid) or an element in the first fluid, e.g. a concentration of barium or calcium in the first fluid.

11. The apparatus of embodiment 10, wherein the attribute is a dimension parameter, such as particle size or shape.

12. The apparatus of embodiment 10, wherein the parameter is a temperature, pressure, or another parameter of the collection chamber (e.g. feature 24).

13. The apparatus of embodiment 10, wherein the parameter relates to a concentration of the first fluid or an element in the first fluid, e.g. a concentration of barium or calcium in the first fluid.

14. The apparatus of embodiment 1, comprising a), b), and iv), wherein the displacement entity comprises a pressurized gas (e.g. from feature 82), having negative or positive pressure in relation to the pressure in the housing (e.g. feature 16).

15. The apparatus of embodiment 14, wherein: positive pressure increases the distance between the receiving surface (e.g. feature 20) and the orifice (e.g. feature 18); and/or negative pressure (vacuum) decreases the distance between the receiving surface and the orifice.

16. The apparatus of embodiment 1 comprising: a), b), and i).

17. The apparatus of embodiment 1 comprising: a), b), and ia).

18. The apparatus of embodiment 1 comprising: a), b), and ib).

19. The apparatus of embodiment 1, comprising: a), b), and ii).

20. The apparatus of embodiment 1, comprising: a), b), and iia).

21. The apparatus of embodiment 1, comprising: a), b), and iib).

22. The apparatus of embodiment 1, comprising: a), b), and iii).

23. The apparatus of embodiment 1, comprising: a), b), and iv).

24. The apparatus of embodiment 1, comprising: a), b), and v).

25. The apparatus of embodiment 1, comprising: a), b), and vi).

26. The apparatus of embodiment 1, comprising: a), b), and vii).

27. The apparatus of embodiment 1, comprising: a), b), and viii).

28. The apparatus of embodiment 1, comprising: a), b), and ix).

29. The apparatus of embodiment 1, comprising: a), b), and x).

30. The apparatus of embodiment 1 comprising: a), b), and i)-x).

31. The apparatus of any of embodiments 1 through 30, comprising an exchange unit (e.g. feature 106a) in fluid connection with the exit portal (e.g. at the end of lumen 68) of the conditioning chamber in which particles are separated from conditioning fluid.

32. The apparatus of any of embodiment 1 through 31, comprising a collection chamber (e.g. feature 24) in fluid connection with the exchange unit and configured to receive particles that have passed through the exchange unit (e.g. feature 106a or 106b).

33. The apparatus of any of embodiments 1 through 32, wherein the inner diameter of the orifice (e.g. feature 18) is 0.08 mm to 10 mm, 0.15 mm to 5 mm, or 0.3 mm to 2.5 mm.

34. The apparatus of any of embodiments 1 through 33, comprising a fluid reservoir for holding a particle component, e.g., a first polymer, and a cell, in fluid connection with the orifice (e.g. feature 18).

35. The apparatus of any of embodiments 1 through 34, wherein the particle dispensing unit comprises a second orifice (e.g. feature 26 and feature 28 being a first and second orifice).

36. The apparatus of any of embodiments 1 through 35, wherein the orifice and the second orifice are disposed co-axially (e.g. feature 26 and feature 28 being a first and second orifice).

37. The apparatus of any of embodiments 1 through 36, wherein the orifice and the second orifice are configured to produce a particle comprising a first compartment (e.g., a core) and a second compartment (e.g., layer) surrounding the first compartment (e.g., core), e.g., a particle comprising a core dispensed from the orifice and an outer layer dispensed from the second orifice (e.g. feature 26 and feature 28 being a first and second orifice).

38. The apparatus of any of embodiments 1 through 37, wherein the particle dispensing unit comprises a second orifice and a third orifice.

39. The apparatus of embodiment 38, wherein the orifice, the second orifice, and the third orifice are disposed co-axially.

40. The apparatus of any one of embodiments 38 or 39, wherein the orifice, the second orifice, and the third orifice are configured to produce a multicompartment particle, e.g., a particle comprising a first compartment core dispensed from the orifice, an intermediate layer dispensed from the second orifice, and an outer layer dispensed from the third orifice, the first orifice, the second orifice, and the third orifice being one of adjacent and concentric.

41. The apparatus of any of embodiments 1 through 40, wherein the fluid reservoir comprises a sensor configured to detect a parameter of the contents in any reservoir or chamber, e.g., oxygen, pH, turbidity, cell concentration, fluorescence emission, or spectroscopic absorption.

42. The apparatus of embodiment 41, wherein the sensor is configured to transmit a signal to an actuator, and in response to that signal, the apparatus is configured to enhance mixing, e.g., in the conditioning chamber, the particle collection chamber, or a fluid reservoir.

43. The apparatus of any of embodiments 1 through 42, comprising a second particle fluid reservoir (e.g. feature 40) for holding a second particle component, e.g., a second polymer, in fluid connection with the second orifice.

44. The apparatus of any of embodiments 1 through 43, wherein the second particle fluid reservoir comprises a sensor configured to detect a parameter of the contents of the second particle fluid reservoir, e.g., oxygen, pH, turbidity, cell concentration, fluorescence emission, or spectroscopic absorption.

45. The apparatus of any of embodiments 1 through 44, configured to allow modulation of the rate of particle dispensation.

46. The apparatus of any of embodiments 1 through 45, wherein the particle dispensing unit configured to receive a signal related to a particle attribute and responsive to that signal modulate a particle attribute or process parameter, e.g., the rate of particle dispensation.

47. The apparatus of any of embodiments 1 through 46, wherein the particle dispensing unit configured to receive a signal related to a particle attribute or process parameter and responsive to that signal modulate a particle attribute or process parameter, e.g., the rate of particle dispensation.

48. The apparatus of any of embodiments 1 through 47, comprising a sensor for the detection of a particle attribute or process parameter operably linked to the particle dispensing unit for providing the signal.

49. The apparatus of embodiment 48, wherein the conditioning chamber comprises a plurality of subcomponents (e.g. features 64, 66).

50. The apparatus of any one of embodiments 48 or 49, wherein conditioning chamber comprises, in the direction of fluid flow through the apparatus, at least one of (i) a proximal subcomponent (e.g. feature 64) and (ii) a distal subcomponent (e.g. feature 66).

51. The apparatus of embodiment 50, wherein conditioning chamber comprises, components (i) and (ii).

52. The apparatus of any one of embodiments 50 through 51, wherein the proximal subcomponent is configured to contain the receiving surface (e.g. feature 20) of the first fluid (e.g., first conditioning fluid).

53. The apparatus of any one of embodiments 50 through 52, wherein the distal subcomponent comprises a proximal cross-sectional area (pcsa) and a distal cross-sectional area (dcsa) wherein the pcsa is greater than the dcsa.

54. The apparatus of any one of embodiments 50 through 53, wherein the distal subcomponent comprises a proximal diameter and a distal diameter, wherein the proximal diameter is greater than the distal diameter.

55. The apparatus of any one of embodiments 50 through 54, wherein the distal subcomponent comprises a frusto-conical member.

56. The apparatus of any one of embodiments 48 through 55, wherein the conditioning chamber (e.g., a conditioning chamber) comprises a funnel element (e.g., feature 66) disposed after the receiving surface.

57. The apparatus of embodiment 56, wherein the cross-sectional area of the end of the funnel element nearest the receiving surface is larger than the cross-sectional area of the end of the funnel element farthest from the receiving surface.

58. The apparatus of embodiment 56, wherein the ratio of cross-sectional area of the end of the funnel element nearest the orifice to the cross-sectional area of the end of the funnel element farthest from the orifice is 1.1 to 2, 2 to 5, or 5 to 20.

59. The apparatus of embodiment 56, wherein the angle between the wall of the funnel element to an axis passing through the center of the conditioning chamber is a ratio of the cross-sectional area of the end of the funnel element nearest the receiving surface to the 0 to 10, 10 to 45, or 45 to 90.

60. The apparatus of any one of embodiments 1 through 55, wherein the conditioning chamber comprises a funnel element (e.g., feature 66) that tapers from a first end to a second end.

61. The apparatus of any one of embodiments 1 through 55, wherein the conditioning chamber comprises a funnel element (e.g., feature 66) that has an inner surface that is configured to minimize swirling of particles within the funnel element.

62. The apparatus of any one of embodiments 1 through 55, wherein the conditioning chamber comprises a funnel element (e.g., feature 66) that is configured to cause first-in-first-out transit of particles through the funnel element, e.g., at least 70%, 80%, 90%, 95% of the particles transit the funnel element on a first in first out basis.

63. The apparatus of any one of embodiments 1 through 55, wherein the conditioning chamber comprises a funnel element (e.g., feature 66) that is configured to limit the residence time of particles within the funnel element to a predetermined residence time.

64. The apparatus of any one of embodiments 1 through 55, wherein the conditioning chamber comprises a funnel element (e.g., feature 66) that is configured to cause particles to transit the funnel element along an at least substantially straight path through the funnel element, e.g., at least 70%, 80%, 90%, 95% of the particles transit the funnel element on a substantially straight path.

65. The apparatus of any one of embodiments 1 through 55, wherein the conditioning chamber comprises a funnel element (e.g., feature 66) that is configured to cause particles to transit the funnel element substantially along a predetermined path through the funnel element.

66. The apparatus of any one of embodiments 1 through 55, wherein the conditioning chamber comprises a funnel element (e.g., feature 66) that is configured to cause particles to transit the funnel element substantially along a predetermined path through the funnel element at a predetermined rate.

67. The apparatus of any one of embodiments 50 through 66, wherein the conditioning chamber comprises a lumen component (e.g. feature 68), which comprises an elongated transit lumen, e.g., wherein the length of the transit lumen in the direction of fluid flow is at least X times the average diameter of the transit lumen, e.g., wherein X is 500, 1000, 2500, 5,000, 10,000, or 25,000.

68. The apparatus of embodiment 67, wherein X is 20.

69. The apparatus of any one of embodiments 50 through 68, wherein the transit lumen is configured such that its length along the axis parallel to the flow of conditioning fluid comprising particles (the transit lumen length) is greater than the transit lumen diameter.

70. The apparatus of any one of embodiments 50 through 69, wherein the transit lumen length is at least X times the transit lumen diameter, wherein X is selected from 10, 100, 1000.

71. The apparatus of any one of embodiments 50 through 70, wherein the transit lumen length is at least 5 cm, 10 cm, 15 cm, 25 cm, or 50 cm in length.

72. The apparatus of any one of embodiments 50 through 71, wherein the transit lumen diameter (e.g. $D_{TL}$) is at least 2, 4, 10 times the average longest dimension, e.g., average diameter, of a particle of the first class.

73. The apparatus of any one of embodiments 50 through 72, wherein the transit lumen diameter is at no more than 2, 5, 10 or 20 times the average longest dimension, e.g., average diameter, of a particle.

74. The apparatus of any one of embodiments 50 through 73, wherein the transit lumen comprises a diameter of 1.2 to 10 times the average diameter of a particle.

75. The apparatus of any one of embodiments 50 through 74, wherein the transit lumen comprises a coiled conduit.

76. The apparatus of any one of embodiments 50 through 75, wherein the conditioning chamber comprises a first fluid outlet port configured to allow the removal of first fluid, e.g., used first conditioning fluid, from the conditioning chamber.

77. The apparatus of embodiment 76, wherein the apparatus is configured such that responsive to a signal, first fluid (e.g., first conditioning fluid) can be supplied through the first fluid inlet port(s) (e.g., feature 72).

78. The apparatus of any one of embodiments 50 through 77, comprising a first fluid reservoir (e.g. feature 74) in fluid connection with the conditioning chamber.

79. The apparatus of embodiment 78, comprising a pump for moving first fluid from the first-fluid reservoir to the conditioning chamber.

80. The apparatus of any one of embodiments 50 through 79, configured such that particles dispensed from the particle dispensing unit enter the conditioning chamber through the receiving portal.

81. The apparatus of any one of embodiments 50 through 80, wherein the apparatus is configured such that first fluid can flow into the conditioning chamber through the receiving portal.

82. The apparatus of any one of embodiments 38 through 68, wherein the conditioning chamber comprises at least one first fluid inlet port (e.g., feature 72) configured such that first fluid can flow into the conditioning chamber through the first fluid inlet port.

83. The apparatus of any one of embodiments 50 through 82, wherein the first fluid inlet port is in fluid connection with a first fluid reservoir (e.g. feature 74).

84. The apparatus of any one of embodiments 50 through 83, wherein the conditioning chamber is configured to contain the receiving surface of the first fluid.

85. The apparatus of any one of embodiments 50 through 84, wherein the greatest diameter, or greatest cross-sectional dimension of a receiving reservoir perpendicular to the length of conditioning chamber, is greater than that of the greatest diameter, or greatest cross-sectional dimension of the transit lumen perpendicular to the length of conditioning chamber.

86. The apparatus of any one of embodiments 50 through 85, wherein the conditioning chamber comprises a sensor which transmits a signal proportional to the amount or condition of first fluid in the conditioning chamber.

87. The apparatus of any one of embodiments 1 through 86, wherein the conditioning chamber comprises a sensor which monitors the condition of the first fluid and transmits a signal related to the condition of the first fluid, and a controller optionally responds to the signal, e.g. the controller controls the pressure inside the chamber and/or a height of the receiving fluid.

88. The apparatus of any one of embodiments 1 through 87, wherein, in response to the signal related to the condition of the first fluid, a pressure of a displacement entity is increased or decreased to alter a level of the first fluid in the conditioning chamber (e.g. via feature 82).

89. The apparatus of any one of embodiments 1 through 88, wherein, in response to the signal related to the condition of the first fluid, a flow rate of first fluid from the first fluid reservoir to the conditioning chamber is altered.

90. The apparatus of any one of embodiments 1 through 89, wherein the orifice and the surface of the receiving surface are disposed within a housing (e.g. feature 16) wherein the housing comprises a port in gaseous connection with a source of gas, e.g., pressurized air, $O_2$, $N_2$, or a mixture thereof, and the housing is configured such that the distance between the receiving surface and the orifice can be modulated by increasing or decreasing the pressure within the housing (e.g. feature 82).

91. The apparatus of any one of embodiments 1 through 90, wherein the distance between the orifice and the receiving surface of the conditioning fluid is adjustable.

92. The apparatus of any one of embodiments 1 through 91, wherein the apparatus is configured to allow adjustment of the distance between the orifice and the receiving surface by altering the pressure at the surface of the conditioning chamber.

93. The apparatus of any one of embodiments 1 through 92, wherein the apparatus is configured to modulate distance between the orifice and the receiving surface by altering amount of conditioning fluid in the conditioning chamber.

94. The apparatus of any one of embodiments 1 through 93, wherein the apparatus is configured to modulate distance between the orifice and the receiving surface by altering the position of the orifice relative to the housing.

95. The apparatus of any one of embodiments 1 through 94, comprising a sensor configured to monitor the pressure at a point above the receiving surface.

96. The apparatus of any one of embodiments 1 through 95, wherein the apparatus is configured such that responsive to the pressure, adjusting the distance between the orifice and the receiving surface, conditioning fluid can be added or removed from the conditioning chamber. (e.g., through the opening of a valve).

97. The apparatus of any one of embodiments 1 through 96, wherein the exchange unit (e.g. feature 106a or 106b) comprises:

(i) an exchange unit inlet portal (e.g. at the first inlet 112) configured to receive inlet flow of a fluid comprising first fluid and conditioned particles;

(ii) an exchange unit exit portal (e.g. at particle outlet segment 120) configured to allow fluid comprising a second fluid, e.g., subsequent conditioning fluid, and conditioned particles and having a reduced level of first fluid or a component thereof (compared with the inlet flow), to exit the exchange unit;

(iii) a first fluid exit portal (e.g. at discharge segment 124) configured to allow exit from the exchange unit of first fluid in which the concentration of conditioned particles has been reduced; and (iv) a second fluid supply portal (e.g. at second inlet 114) configured to allow a second fluid to enter the exchange unit;

wherein the exchange unit is configured to allow:

a flow of fluid comprising first fluid and conditioned particles to flow into the exchange unit through the exchange unit inlet portal and to impinge on a flow of second fluid, e.g., subsequent conditioning fluid, flowing into the exchange unit through the a second fluid supply portal and produce a post-impingement flow comprising a second fluid and conditioned particles and having reduced level of first fluid or a component thereof to flow through the exchange unit exit portal.

98. The apparatus of any one of embodiments 1 through 97, wherein the exchange unit is configured such that an interface, e.g. a meniscus or a mixing region, is formed between first fluid, e.g., conditioning fluid, flowing through the exchange unit the fluid and second fluid, e.g., subsequent conditioning fluid, flowing through the exchange unit.

99. The apparatus of embodiment 98, wherein, the conditioned particles pass through the interface from the first fluid into the second fluid.

100. The apparatus of any one of embodiments 1 through 99, wherein the exchange unit comprises:

an exchange unit inlet portal configured to receive fluid comprising conditioning fluid and particles; and an exchange unit exit portal configured to allow fluid comprising subsequent conditioning fluid and particles and having a reduced level of conditioning fluid (compared with the inlet flow) to exit the exchange unit.

101. The apparatus of any one of embodiments 1 through 100, wherein the exchange unit comprises:

a conditioning fluid exit portal configured to allow exit from the exchange unit of conditioning fluid in which the concentration of particles has been reduced; and a subsequent conditioning fluid supply portal configured to allow subsequent conditioning fluid to enter the exchange unit.

102. The apparatus of any one of embodiments 1 through 101, wherein the exchange unit comprises a filter element which hinders the passage of particles through the conditioning fluid exit portal.

103. The apparatus of embodiment 102, wherein the filter element comprises a sieve.

104. The apparatus of any one of embodiments 102 or 103, wherein conditioned particles of first size pass through the filter element and passage of conditioned particles of a second size is hindered by the filter element.

105. The apparatus of any one of embodiments 1 through 104, configured such that the flow of fluid comprising conditioning fluid and particles through the exchange unit inlet portal impinges on the flow of subsequent conditioning fluid through the subsequent conditioning fluid supply portal.

106. The apparatus of any one of embodiments 1 through 105, wherein the angle between the flow through the exchange unit inlet portal and the flow through the subsequent conditioning fluid supply portal is between 80 and 100 degrees (e.g. between 85 and 95 degrees, and in some embodiments about 90 degrees).

107. The apparatus of any one of embodiments 1 through 105, wherein the angle between the flow through the exchange unit inlet portal and the flow through the subsequent conditioning fluid supply portal is 90 degrees+/−10, 5, or 1 degrees.

108. The apparatus of any one of embodiments 1 through 107, wherein the exchange unit is configured to allow:
a flow of fluid comprising conditioning fluid and particles to flow into the exchange unit through the exchange unit inlet portal and to impinge on a flow of subsequent conditioning fluid flowing into the exchange unit through the subsequent conditioning fluid supply portal and produce a post-impingement flow comprising subsequent conditioning fluid and particles and having reduced level of conditioning fluid to flow through the exchange unit exit portal.

109. The apparatus of any one of embodiments 1 through 108, wherein:
the exchange unit inlet portal has a diameter of:
at least 2, 4, 8, or 16 times the average longest dimension, e.g., average diameter, of a particle.

110. The apparatus of any one of embodiments 1 through 109, wherein:
the exchange unit exit portal has a diameter of:
at least 1, 100, or 1000 times the average longest dimension, e.g., average diameter, of a particle.

111. The apparatus of any one of embodiments 1 through 110, wherein:
the conditioning fluid exit portal has a diameter of:
at least 1, 100, or 1000 times the average longest dimension, e.g., average diameter, of a particle.

112. The apparatus of any one of embodiments 1 through 111, wherein:
the subsequent conditioning fluid supply portal has a diameter of:
at least 1, 100, or 1000 times the average longest dimension, e.g., average diameter, of a particle.

113. The apparatus of any one of embodiments 1 through 112, wherein the diameter of the diameter of the exchange unit inlet portal and exchange unit exit portal are within 20× of each other.

114. The apparatus of any one of embodiments 1 through 113, wherein apparatus is configured such that one of:
the rate of flow through the inlet is the same as the rate of flow through the outlet so the capsules are exposed to a constant flow rate; and
the rate of flow through the inlet is different from the rate of flow through the outlet, e.g. to affect a different residence time, to minimize clogging, or to improve convection.

115. The apparatus of any one of embodiments 1 through 114, further comprising a second exchange unit configured to receive, through its exchange unit inlet portal, flow from the exchange unit exit portal from the exchange unit.

116. The apparatus of any one of embodiments 1 through 115, further comprising an $N^{th}$ exchange unit configured to receive, through its exchange unit inlet portal, flow from the exchange unit exit portal from the $N-1^{th}$ exchange unit, wherein N is 3, 4, 5, 6, 7, 8, 9, or 10.

117. The apparatus of any one of embodiments 1 through 116, comprising a plurality of exchange units wherein a first exchange unit of the plurality comprises a first filter element and a second exchange unit of the plurality comprises a second filter element, wherein the first and second filter elements have different pore sizes.

118. The apparatus of any one of embodiments 1 through 117, wherein the collection chamber comprises
an inlet port and a fluid runoff port toward an upper end of the collection chamber, and a lower end configured to retain conditioned particles; and, optionally, at least one of:
the collection chamber is configured to receive particles and hold them in enough fluid to allow for suspension, e.g. to minimize drying of the particles,
the collection chamber is sterile and free from leaks,
the collection chamber is configured to be maintained sealed from atmospheric pressure or vented to atmosphere through a sterile filter; and
the collection chamber includes sensors or probes to monitor divalent cation concentration, pH, pressure, or temperature.

119. The apparatus of any one of embodiments 1 through 118, configured to allow the flow of conditioning fluid comprising particles through the conditioning chamber into the exchange unit.

120. The apparatus of embodiment 119, comprising a pump configured to mediate the flow of conditioning fluid comprising particles through the conditioning chamber into the exchange unit.

121. The apparatus of embodiment 119, configured to allow for controlling the speed of flow of conditioning fluid comprising particles through the conditioning chamber into the exchange unit.

122. The apparatus of embodiment 119, comprising a pump configured to mediate controlling the speed of flow of conditioning fluid comprising particles through the conditioning chamber into the exchange unit.

123. The apparatus of any one of embodiments 1 through 122, configured such that particles are dispensed at a distance from the receiving surface of the conditioning fluid and after dispensation, transit the distance between the point of particle dispensation and the receiving surface of the receiving fluid (the flight path).

124. The apparatus of any one of embodiments 1 through 123, configured such that gravity, an applied force, e.g., a puff of air or liquid, a vacuum a vibration, an applied field, e.g, a voltage potential, or a combination thereof, mediate the transit of a particle from the orifice to the receiving surface of the conditioning fluid.

125. The apparatus of any one of embodiments 1 through 124, configured such that the flight path passes through a voltage potential.

126. The apparatus of any one of embodiments 1 through 125, comprising a first and a second electrode configured so as to form a voltage potential through which the flight path passes.

127. The apparatus of any one of embodiments 1 through 126, comprising a first and a second electrode configured so as to form a voltage potential which encompasses a portion of the flight path.

128. The apparatus of any one of embodiments 1 through 127, comprising a first and a second electrode configured so as to form a voltage potential which encompasses the entire flight path.

129. The apparatus of any one of embodiments 1 through 128, wherein the distance between the first electrode and the receiving surface of the first fluid is greater than, the same as, or less than, the distance between the orifice of the particle dispensing unit and the receiving surface of the condition fluid.

130. The apparatus of any one of embodiments 1 through 129, wherein the distance between the second electrode and the orifice of the particle dispensing unit is greater than, the same as, or less than, the distance between the and the receiving surface of the condition fluid and the orifice of the particle dispensing unit.

131. The apparatus of any one of embodiments 1 through 130, wherein the second electrode comprises the receiving surface of the conditioning fluid.

132. The apparatus of any one of embodiments 1 through 131, wherein the first electrode comprises a ring-shaped member.

133. The apparatus of any one of embodiments 1 through 132, wherein the second electrode comprises a ring-shaped member.

134. The apparatus of any one of embodiments 1 through 133, wherein both the first electrode and the second electrode comprise a ring-shaped member.

135. The apparatus of any one of embodiments 1 through 134, configured to separate a first particle of a first class of particle from a second particle of a second class of particle after dispensation but prior to impinging on the receiving surface of the conditioning fluid.

136. The apparatus of any one of embodiments 1 through 135, wherein the first class of particle differs from the second class of particle by size, e.g., average largest dimension or diameter.

137. The apparatus of any one of embodiments 1 through 138, wherein the voltage potential is configured such that it separates a first class of particle from a second class of particle.

138. The apparatus of any one of embodiments 1 through 137, wherein the force applied, e.g., voltage potential, to mediate the transit of particles from the orifice to the receiving surface of the conditioning fluid, mediates the separation from the first class of particle from the second class of particle.

139. The apparatus of any one of embodiments 1 through 138, wherein separation comprises altering the path of a second class particle relative to the path of a first class particle.

140. The apparatus of any one of embodiments 1 through 139, configured such that second class particles are displaced laterally from the flight path of first class particles.

141. The apparatus of any one of embodiments 1 through 140, comprising a capture element (e.g. feature 56) configured such that a second class particle impinges on the capture element and does not impinge on the receiving surface of the conditioning fluid.

142. The apparatus of embodiment 141, wherein the capture element is disposed between the orifice and the surface of the conditioning fluid.

143. The apparatus of any one of embodiments 141, wherein the capture element comprises a conical member.

144. The apparatus of any one of embodiments 141 through 143, wherein the capture element comprises a trough (e.g. feature 62) configured to collect second class particles.

145. The apparatus of any one of embodiments 141 through 144, wherein the capture element provides annular coverage of a flight path of second class particles.

146. The apparatus of any one of embodiments 141 through 145, wherein the capture element is a single element.

147. The apparatus of any one of embodiments 141 through 146, wherein the capture element is multiple elements.

148. The apparatus of any one of embodiments 141 through 147, wherein the capture element is multiple elements that are joined together.

149. The apparatus of any one of embodiments 141 through 148, wherein the capture element has a concave upper surface.

150. The apparatus of any one of embodiments 141 through 149, wherein the capture element has an inner aperture edge that defines an aperture in the capture element, and the capture element has a frustoconical portion that has an upper surface that is tapered downwardly from the inner aperture edge.

151. The apparatus of any one of embodiments 141 through 150, wherein the capture element has a recessed upper surface.

152. The apparatus of any one of embodiments 141 through 151, wherein the capture element extends radially/laterally beyond flight paths of first class particles.

153. The apparatus of any one of embodiments 1 through 152, further comprising a diverter located along the conditioning chamber. 154. The apparatus of any one of embodiments 1 through 153, further comprising a diverter located along the conditioning chamber, the diverter having a diverter lumen in selective fluid communication (e.g. by way of a valve) with the conditioning chamber, so that a fluid flows from the conditioning chamber to the diverter lumen rather than to the exchange unit when the diverter lumen is in fluid communication with the conditioning chamber.

155. The apparatus of any one of embodiments 1 through 154, further comprising a diverter located in the exchange unit.

156. The apparatus of any one of embodiments 1 through 155, wherein the diverter lumen is selected to be in fluid communication with the conditioning chamber in response to a signal (e.g. a signal related to a particle parameter) from a sensor (e.g. a sensor in the conditioning chamber, in the exchange unit, or elsewhere).

157. The method of any one of embodiments 1 through 156, further comprising diverting a non-conforming portion of a product run (e.g. a first portion of a product run, or a portion of a product run in which a parameter of one or more particles does not conform to a desired particle parameter).

158. The apparatus of any one of embodiments 1 through 157, wherein the apparatus comprises a housing configured to allow a differential to be maintained between the pressure at the surface of conditioning fluid disposed in the conditioning chamber and ambient pressure, e.g., pressure outside the housing.

159. The apparatus of any one of embodiments 1 through 160, wherein the apparatus comprises a housing configured to allow a differential to be maintained between the pressure at the flight path and ambient pressure, e.g., pressure outside the housing.

160. The apparatus of any one of embodiments 1 through 159, wherein the orifice, the flight path, and the receiving surface of the conditioning fluid disposed in the conditioning chamber are disposed within the housing.

161. The apparatus of any one of embodiments 1 through 160, comprising a pressure sensor configured to sense the pressure in the housing and to transmit a signal, which may optionally be transmitted to a controller where it may be used for monitoring, for comparing to pressure elsewhere in the apparatus to detect leaks or clogs, or it may be used to adjust the pressure in the chamber by applying pressure or vacuum (e.g., by adjust a syringe pump of sterile air attached to the chamber).

162. The apparatus of any one of embodiments 1 through 161, wherein the orifice and the surface of the conditioning fluid are disposed within the housing.

163. The apparatus of any one of embodiments 1 through 162, comprising a heating/cooling unit.

164. The apparatus of embodiment 163 wherein the heating/cooling unit is configured to control the temperature of one or more of: the particle dispensing unit, the interior of the housing, the conditioning chamber, the transit lumen, the exchange unit, and the collection chamber.

165. The apparatus of any one of embodiments 163 or 164, comprising a second heating/cooling unit.

166. The apparatus of embodiment 165, wherein the second heating/cooling unit is configured to control the temperature of one or more of: the particle dispensing unit, the interior of the housing, the conditioning chamber, the transit lumen, the exchange unit, and the collection chamber.

167. The apparatus of any one of embodiments 1 through 166, comprising a sensor for detecting of particles.

168. The apparatus of embodiment 167, wherein the sensor is disposed between the particle dispensing unit and the receiving surface of the conditioning fluid.

169. The apparatus of embodiment 167, wherein the sensor is configured to allow detecting the dispensation, or rate of dispensation, or a parameter of a particle, e.g., diameter, of particles.

170. The apparatus of embodiment 166, wherein the sensor is disposed at a point after which particles of the second class have impinged on the capture element but before particles of the first class impinge on the receiving surface of the conditioning fluid.

171. The apparatus of embodiment 166, wherein the sensor is configured to allow detecting the dispensation, or rate of dispensation, or a parameter of a particle, e.g., diameter, sphericity, or aspect ratio, of particles.

172. The apparatus of embodiment 166, wherein the sensor is disposed at a point after which particles emerged from the conditioning chamber.

173. The apparatus of embodiment 166, wherein the sensor is configured to allow detecting the dispensation, or rate of dispensation, or a parameter of a particle, e.g., diameter, of particles.

174. The apparatus of embodiment 166, wherein the sensor is disposed at a point after which particles emerged from the exchange unit.

175. The apparatus of embodiment 166, wherein the sensor is configured to allow detecting the dispensation, or rate of dispensation, or a parameter of a particle, e.g., diameter, of particles.

176. The apparatus of any one of embodiments 166 through 175, wherein the sensor comprises a camera.

177. The apparatus of any one of embodiments 166 through 175 comprising a pressure sensor configured so as sense the pressure in interior of the housing.

178. The apparatus of any one of embodiments 1 through 177, comprising a temperature sensor.

179. The apparatus of embodiment 178, wherein the temperature sensor is configured to detect the temperature of one or more of: the particle dispensing unit, the interior of the housing, the conditioning chamber, the transit lumen, the exchange unit, and the collection chamber.

180. The apparatus of any one of embodiments 178 or 179, comprising a second temperature sensor.

181. The apparatus of embodiment 180, wherein the second temperature sensor is configured to detect the temperature of one or more of: the particle dispensing unit, the interior of the housing, the conditioning chamber, the transit lumen, the exchange unit, and the collection chamber.

182. The apparatus of any one of embodiments 1 through 181, comprising a sensor for detecting a property of the conditioning fluid.

183. The apparatus of embodiment 182, wherein the sensor is configured to detect a property of the conditioning fluid in the conditioning chamber, the transit lumen, the exchange unit, the collection chamber.

184. The apparatus of embodiment 182, wherein the sensor is configured to detect a property of the conditioning fluid in ta conduit linking two of the conditioning chamber, the transit lumen, the exchange unit, the collection chamber.

185. The apparatus of embodiment 182, wherein the property comprises conductivity, temperature, pH, or osmolarity.

186. The apparatus of any one of embodiments 1 through 185, comprising a processing unit configured to receive an input from a sensor and transmit an output signal to another component of the apparatus.

187. The apparatus of embodiment 186, wherein the sensor comprises a sensor which monitors at least one of pressure, temperature, voltage, or another process parameter.

188. The apparatus of embodiment 186, wherein responsive to a sensor input, a process parameter is adjusted (e.g. by a controller).

189. The apparatus of any one of embodiments 1 through 188, wherein the conditioning chamber is configured to provide a residence time in the conditioning chamber of X % or more, wherein X is 40, 50, 60, 70, 80, 90, 95, or 99 of the particles of a plurality or preparation differ from one another by no more than Y %, wherein Y is 1, 5, 10, 20, 25, 30, 40, or 50, wherein the residence time is determined by the amount of time a particle takes to transit the lumen component of the conditioning chamber.

190. The apparatus of any of embodiments 1 through 189, wherein the residence time in the conditioning chamber is X % or more, wherein X is 40, 50, 60, 70, 80, 90, 95, or 99 of the particles of a plurality or preparation differ from one another by no more than Y %, wherein Y is 1, 5, 10, 20, 25, 30, 40, or 50, wherein the residence time is determined by the amount of time a particle takes to transit the vessel component and the lumen component of the conditioning chamber.

191. The apparatus of any one of embodiments 1 through 190, wherein the dispensed particles comprise alginate droplets, the conditioning fluid comprises a cross-linking agent and the conditioning chamber is configured to provide a degree of cross linking which is X % or more, wherein X is 40, 50, 60, 70, 80, 90, 95, or 99 of the particles of a plurality or preparation differ from one another by no more than Y %, wherein Y is 1, 5, 10, 20, 25, 30, 40, or 50, wherein the degree of cross linking is determined by initial fracture.

192. The apparatus of any one of embodiments 1 through 191, wherein a parameter of the particles is X % or more, wherein X is 40, 50, 60, 70, 80, 90, 95, or 99 of the particles of a plurality or preparation differ from one another by no more than Y %, wherein Y is 1, 5, 10, 20, 25, 30, 40, or 50.

193. The apparatus of any one of embodiments 1 through 192, wherein the exchange unit is configured such that a flow of conditioning fluid comprising particles impinges on and is deflected by, a flow of subsequent conditioning fluid, and at the point of deflection the particles are transferred into the subsequent conditioning fluid flow.

194. An exchange unit comprising:
(i) an exchange unit inlet portal configured to receive inlet flow of a fluid comprising first fluid and particles;
(ii) an exchange unit exit portal configured to allow fluid comprising a second fluid, e.g., subsequent conditioning fluid, and conditioned particles and having a reduced level of first fluid or a component thereof (compared with the inlet flow), to exit the exchange unit;
(iii) a first fluid exit portal configured to allow exit from the exchange unit of first fluid in which the concentration of conditioned particles has been reduced; and
(iv) a second fluid supply portal configured to allow a second fluid to enter the exchange unit;
wherein the exchange unit is configured to allow:
a flow of fluid comprising first fluid and conditioned particles to flow into the exchange unit through the exchange unit inlet portal and to impinge on a flow of second fluid, e.g., subsequent conditioning fluid, flowing into the exchange unit through the a second fluid supply portal and produce a post-impingement flow comprising a second fluid and conditioned particles and having reduced level of first fluid or a component thereof to flow through the exchange unit exit portal.

195. A fluid exchange module comprising
an exchange unit comprising:
a first exchange lumen that intersects a second exchange lumen at a transfer junction, the first exchange lumen including a first particle lumen segment having a first lumen inlet portal and a first lumen exit portal and a second particle lumen segment having a second lumen inlet portal and a second lumen exit portal, the second exchange lumen including a wash supply lumen segment and a discharge lumen segment; and
a filter unit (e.g. a sieve) within the transfer junction covering an inlet of the discharge lumen segment, the filter unit having one or more filter unit apertures, each filter unit aperture having a greatest dimension that is less than a pre-determined or target outer dimension of a conditioned particle.

196. The fluid exchange module of embodiment 195, wherein the first exchange lumen has a maximum cross-sectional dimension in the range of between 1 mm$^2$ and 50 mm$^2$.

197. The fluid exchange module of embodiment 195, wherein the second exchange lumen has a maximum cross-sectional dimension in the range of between 1 mm$^2$ and 50 mm$^2$.

198. The fluid exchange module of embodiment 197, wherein the first exchange lumen has a maximum cross-sectional dimension in the range of between 1 mm$^2$ and 50 mm$^2$.

199. The fluid exchange module of embodiment 198, wherein the filter unit aperture has a dimension in the range of between 1 mm$^2$ and 50 mm$^2$.

200. The fluid exchange module of embodiment 195, wherein the filter unit aperture has a dimension in the range of between 1 mm$^2$ and 50 mm$^2$.

201. The fluid exchange module of embodiment 195, wherein each wash supply lumen segment is connected to the subsequent conditioning fluid pump.

202. The fluid exchange module of embodiment 195, wherein each discharge lumen segment is connected to a wash collection chamber.

203. The fluid exchange module of embodiment 195, further comprising a plurality of exchange units, each of the plurality of exchange units being selectively connectable to be in-line or off-line, the exchange units that are in-line being connected in series with each other so that a washed particle lumen segment of a first particle exchange unit is connected to a conditioned particle lumen segment of an adjacent second particle exchange unit, the washed particle lumen of the last particle exchange unit in the series being connected to the exchange outlet.

204. The fluid exchange module of embodiment 195, further comprising a plurality of exchange units.

205. The fluid exchange module of embodiment 204, wherein the plurality of exchange units are selectively connectable.

206. The fluid exchange module of embodiment 204, wherein at least two exchange units of the plurality of exchange units are connected in series.

207. The fluid exchange module of embodiment 206, further comprising a diverter between a pair of exchange units of at least two exchange units.

208. The fluid exchange module of embodiment 207, wherein all of the exchange units are connected in series.

209. A method of making a plurality of particles comprising:
pumping at least two particle forming fluids to a dispensing port;
causing each particle to move from the dispensing port towards a receiving surface of a first conditioning fluid in a first fluid chamber;
at least one of: i) separating particles from one another based on a property of the particles, e.g., to separate a particle of a first class (a first class particle) from a particle of a second class (a second class particle), e.g.,
i.a) separating a particle of a first class from a particle of a second class after particle dispensation but prior to the dispensed particle impinging on the receiving surface of the first fluid, e.g., conditioning fluid, disposed in the conditioning chamber, and comprises a capture element disposed between the orifice and receiving surface and configured and to hinder, e.g., by capture, a second class particle from impinging on the receiving surface of the first fluid; or
i.b) filtering conditioned particles, e.g. by a filter element, e.g., a sieve, for fractionation, e.g., size fractionation, of conditioned particles, disposed, e.g., in an exchange unit;
ii) receiving a signal, e.g., a signal related to a particle parameter or a process parameter, and responsive to that signal modulating a process parameter or a particle parameter, e.g.,
ii.a) responsive to a signal, e.g., a signal which is a function of a particle parameter, e.g., size or shape, modulating a field through which the particle passes;
ii.b) sensing a distance from the orifice to the receiving surface of the conditioning chamber (e.g. the sensor (such as a non-contact sensor or a contact sensor) may sense a height of the orifice of the dispensing unit or a height of the receiving surface in the conditioning chamber) and the apparatus is configured to change that distance to match a desired distance (e.g. the apparatus is configured to change a pressure or a partial pressure of a displacement entity, such as a gas, in the conditioning chamber);
iii.) sensing a parameter, such as a parameter of one or more particles or a parameter of a fluid.
iv) modulating a distance between a receiving surface of the first fluid and the orifice by modulating a volume of a displacement entity e.g., a gas, e.g., a pressurized gas, e.g., pressurized air, $O_2$, $N_2$, or a mixture thereof, or a liquid, in the chamber;

v) directing a received particle, can flow though the conditioning chamber and through an exit portal in the conditioning chamber;

vi) introducing a first fluid, e.g., fresh first fluid, through a first fluid inlet port into the conditioning chamber;

vii) providing a substantially linear path for conditioned particles transiting the first-solution chamber;) such that the residence time of conditioned particles in the conditioning chamber are substantially similar;

viii) separating conditioned particles are separated from the first fluid in an exchange unit;

ix) providing a plurality of exchange units connected in series and selectively connecting or disconnecting an exchange unit of the plurality, e.g. setting the exchange unit to be one of in-line and off-line, e.g., the apparatus can be configured to take an exchange unit off-line or on-line responsive to an input; or x) maintaining sterility of the orifice, the receiving surface of the conditioning fluid, and optionally a housing having a voltage potential through which the dispensed particles pass.

210. The method of embodiment 209, wherein the retention time in the first fluid chamber for a first particle does not differ substantially from the retention time for a second particle.

211. The method of any one of embodiments 209 or 210, wherein the conditioning fluid in the first fluid chamber comprises an agent which interacts with, e.g., covalently modifies, a particle.

212. The method of any one of embodiments 209 through 211, wherein the conditioning fluid in the first fluid chamber comprises an agent which cross-links a first moiety on the particle to a second moiety on a particle.

213. The method of any one of embodiments 209 through 212, wherein the conditioning fluid comprises an agent which cross-links a first polymeric moiety on the particle to a second polymeric moiety on a particle.

214. The method of any one of embodiments 209 through 213, wherein the conditioning fluid comprises an agent comprises a divalent cation, e.g., barium chloride, calcium chloride, or strontium chloride.

215. The method of any one of embodiments 209 through 214, wherein the concentration of the agent is maintained within a predetermined range during the production of a plurality of particles.

216. The method of any one of embodiments 209 through 215, wherein the particle is formed by expelling it from an orifice, e.g., from a conduit, e.g., a needle.

217. The method of any one of embodiments 209 through 216, wherein the particle is formed by expelling it from a conduit having a single lumen.

218. The method of any one of embodiments 209 through 217, wherein the particle is formed by expelling it from a conduit having a plurality of lumens.

219. The method of any one of embodiments 209 through 218, wherein the plurality of lumens is configured coaxially.

220. The method of any one of embodiments 209 through 219, comprising supplying a particle dispensing module which comprises an orifice for forming particles.

221. The method of any one of embodiments 209 through 220, wherein the particle dispensing module is disposed relative to the conditioning chamber so as to have a flight distance between the particle dispensing unit and the surface of the conditioning fluid.

222. The method of any one of embodiments 209 through 221, wherein the apparatus comprises a housing through which the flight distance passes 223. The method of any one of embodiments 209 through 222, wherein the particle comprises a polymer and a cell.

224. The method of any of embodiments 209 through 223, wherein the particle comprises a single compartment.

225. The method of any of embodiments 209 through 223, wherein the particle comprises a plurality of compartments.

226. The method of any one of embodiments 209 through 223, wherein the particle comprises a first compartment and a second compartment.

227. The method of embodiment 226, wherein the first compartment comprises a polymer (e.g., an alginate).

228. The method of embodiment 227, wherein the second compartment comprises a polymer (e.g., an alginate).

229. The method of embodiment 226, wherein the second compartment comprises a cell.

230. The method of embodiment 226, wherein both the first compartment and the second compartment independently comprise a polymer (e.g., an alginate) and the second compartment comprises a cell (e.g., an engineered cell).

231. The method of any one of embodiments 209 through 230, wherein the time for which each particle of a plurality of particles is:

exposed to conditioning fluid;
spends in the conditioning chamber; or
spends in the transit lumen;

does not differ substantially between the particles of a plurality of particles.

232. The method of any one of embodiments 209 through 231, wherein the time for which each particle of a plurality of particles is:

exposed to conditioning fluid;
spends in the conditioning chamber; or
spends in the transit lumen;

is within a predetermined range of time.

233. A method of making a conditioned particle comprising:

providing the apparatus of any of claims embodiments 1-193;
operating the apparatus to produce a conditioned particle.

234. The method of embodiment 233, wherein a plurality of conditioned particles is made.

235. The method of embodiment 233, wherein a preparation of conditioned particles is made.

236. The method of any one of embodiments 233 through 235, wherein exchange chamber is configured such that a flow of conditioning fluid comprising particles impinges on and is deflected by a flow of subsequent conditioning fluid, and at the point of deflection the particles are transferred into the subsequent conditioning fluid flow.

237. A method of assembling or maintaining an apparatus described herein.

238. The method of embodiment 237, wherein the assembling or maintaining comprises refilling a fluid, attaching a component, and/or replacing a component.

239. The method of any one of embodiments 237-238, wherein the assembling or maintaining comprises removing a component that has had contact with a fluid and replacing it with the same.

240. The method of any one of embodiments 237-238, wherein the assembling or maintaining comprising adjusting a parameter on a sensor or a flow device.

241. The apparatus of any one of the preceding embodiments, wherein the apparatus comprises a module capable generating a message to the operator.

242. An apparatus of any one of the preceding embodiments, disposed within a clean room or facility, an enclosure, a box, or fume hood.

EXAMPLES

Example 1: Preparation of Exemplary Modified Polymers

1A. Chemically-modified Polymer. Particles prepared by an apparatus described herein may comprise a polymeric material chemically modified with a compound of Formula (I) (or pharmaceutically acceptable salt thereof) using methods known in the art.

For example, in the case of alginate, the alginate carboxylic acid is activated for coupling to one or more amine-functionalized compounds to achieve an alginate modified with the compound of Formula (I). The alginate polymer is dissolved in water (30 mL/gram polymer) and treated with 2-chloro-4,6-dimethoxy-1,3,5-triazine (0.5 eq) and N-methylmorpholine (1 eq). To this mixture is added a solution of the compound in acetonitrile (0.3M). The compound of Formula (I) may be prepared using methods known in the art, for example, as described in WO2018/067615, which is incorporated herein by reference in its entirety.

The amounts of the compound and coupling reagent added depends on the desired concentration of the compound bound to the alginate, e.g., conjugation density. To prepare a polymer solution comprising a low molecular weight alginate modified with a medium density of the compound (e.g., CM-LMW-Alg-Medium polymer solution), the dissolved unmodified low molecular weight alginate (e.g., PRONOVA™ VLVG alginate, NovaMatrix® Cat. #4200506, approximate MW<75 kDa, G:M ratio 1.5) is treated with 2-chloro-4,6-dimethoxy-1,3,5-triazine (5.1 mmol/g alginate) and N-methylmorpholine (10.2 mmol/g alginate) and the compound (5.4 mmol/g alginate). To prepare a polymer solution comprising a low molecular weight alginate modified with a high density of the compound (CM-LMW-Alg-High polymer solution), the dissolved unmodified low-molecular weight alginate (approximate MW<75 kDa, G:M ratio ≥1.5) is treated with 2-chloro-4,6-dimethoxy-1,3,5-triazine (5.1 mmol/g alginate) and N-methylmorpholine (10.2 mmol/g alginate) and the Compound (5.4 mmol/g alginate).

The reaction is warmed to 55° C. for 16 h, then cooled to room temperature and gently concentrated via rotary evaporation, then the residue is dissolved in water. The mixture is filtered through a bed of cyano-modified silica gel (Silicycle) and the filter cake is washed with water. The resulting solution is then extensively dialyzed (10,000 MWCO membrane) and the alginate solution is concentrated via lyophilization to provide the desired chemically-modified alginate as a solid or is concentrated using any technique suitable to produce a chemically modified alginate solution with a viscosity of 25 cP to 35 cP.

The conjugation density of a chemically modified alginate is measured by combustion analysis for percent nitrogen. The sample is prepared by dialyzing a solution of the chemically modified alginate against water (10,000 MWCO membrane) for 24 hours, replacing the water twice followed by lyophilization to a constant weight. A CM-LMW-Alg-Medium polymer solution is typically between 2% to 5% N, and a CM-LMW-Alg-High is 5.1% to 8% N.

1B. Peptide-modified Polymers. Particles prepared by an apparatus described herein may comprise a polymeric material covalently modified with a peptide (e.g., a cell-binding peptide) using methods known in the art, see, e.g., Jeon O, et al., *Tissue Eng Part A*. 16:2915-2925 (2010) and Rowley, J. A. et al., Biomaterials 20:45-53 (1999).

For example, in the case of alginate, an alginate solution (1%, w/v) is prepared with 50 mM of 2-(N-morpholino)-ethanesulfonic acid hydrate buffer solution containing 0.5M NaCl at pH 6.5, and sequentially mixed with N-hydroxysuccinimide and 1-ethyl-3-[3-(dimethylamino)propyl]carbodiimide (EDC). The molar ratio of N-hydroxysuccinimide to EDC is 0.5:1.0. The peptide of interest is added to the alginate solution. The amounts of peptide and coupling reagent added depends on the desired concentration of the peptide bound to the alginate, e.g., peptide conjugation density. By increasing the amount of peptide and coupling reagent, higher conjugation density can be obtained. After reacting for 24 h, the reaction is purified by dialysis against ultrapure deionized water (diH2O) (MWCO 3500) for 3 days, treated with activated charcoal for 30 min, filtered (0.22 mm filter), and concentrated to the desired viscosity.

The conjugation density of a peptide-modified alginate may be measured by combustion analysis for percent nitrogen. The sample is prepared by dialyzing a solution of the peptide-modified alginate against water (10,000 MWCO membrane) for 24 hours, replacing the water twice followed by lyophilization to a constant weight.

Example 2: Preparation of Exemplary Alginate Solutions for Making Hydrogel Particles 70:30 mixture of chemically-modified and unmodified alginate. A CM-LMW-Alg solution with a viscosity of 25 cP to 35 cP was prepared as described in Example 1A. A solution of high molecular weight unmodified alginate (U-HMW-Alg) was prepared by dissolving unmodified alginate (PRONOVA™ SLG100, NovaMatrix, Sandvika, Norway, cat. #4202106, approximate MW of 150 kDa-250 kDa, G:M ratio ≥1.5) at 3% weight to volume in 0.9% saline. The CM-LMW-Alg solution was blended with the U-HMW-Alg solution at a volume ratio of 70% CM-LMW-Alg to 30% U-HMW-Alg (referred to herein as a 70:30 CM-LMW-Alg:U-HMW-Alg solution).

Peptide-modified alginate solution. A solution of a peptide-modified alginate (PM-alginate) was prepared by conjugating a peptide consisting of GRGDSP to an unmodified medium molecular weight alginate (SLG20, NovaMatrix, Sandvika, Norway, cat. #4202006, approximate molecular weight of 75-150 kDa) at a desired density and the solution was concentrated to a viscosity of between 80 cP to 120 cP. The resulting solution is referred to herein as a PM-MMW-Alg solution.

Mixture of cells and PM-alginate. RPE cells engineered to express a human Factor VIII BDD protein were cultured as single cells and immediately before encapsulation, the cultured, engineered RPE cells were centrifuged at 1,400 r.p.m. for 1 min and washed with calcium-free Krebs-Henseleit (KH) Buffer (4.7 mM KCl, 25 mM HEPES, 1.2 mM $KH_2PO_4$, 1.2 mM $MgSO_4 \times 7H_2O$, 135 mM NaCl, pH≈7.4, ≈290 mOsm). After washing, the cells were centrifuged again and all of the supernatant was aspirated. The cell pellet was then resuspended in the PM-MMW-Alg solution at a density of 40M single cells/mL alginate solution.

Example 3: Preparation of Two-Compartment Hydrogel Particles

The cell:PM-MMW-Alg mixture (e.g., the first particle solution) and the 70:30 CM-LMW-Alg:U-HMW-Alg solution (e.g., second particle solution) were used to form the outer and inner compartments, respectively, of two-compartment hydrogel particles of about 1.5 mm diameter. The particles were prepared by a manual process or by an automated process using an exemplary apparatus of the disclosure. All buffers and alginate solutions used in these encapsulation processes were sterilized by filtration through a 0.2-μm filter using aseptic processes.

Example 3A. Manual Encapsulation Process. To Prepare Particles Configured as Two-Compartment hydrogel millicapsules of about 1.5 mm diameter, an electrostatic droplet generator was set up as follows: an EPR series 0-30-kV, high-voltage power generator (EPR series, Matsusada, Charlotte, NC, USA) was connected to the midpoint of a coaxial needle (inner lumen of 22G, outer lumen of 18G, Ramd-Hart Instrument Co., Succasunna, NJ, USA). The inner lumen was attached to a first 5-ml Luer-lock syringe (BD, Franklin Lakes, NJ, USA), which was connected to a syringe pump (Pump 11 Pico Plus, Harvard Apparatus, Holliston, MA, USA) that was oriented vertically. The outer lumen was connected via a Luer lock to a second 5-ml Luer-lock syringe which was connected to a second syringe pump (Pump 11 Pico Plus) that was oriented horizontally. The first particle solution comprising the cells was placed in the first syringe and the second particle solution lacking cells was placed in the second syringe. Each Pico Plus syringe pump was set to a flowrate of 5 mL/h and droplets of the particle solutions (e.g., unconditioned particles) were extruded from the coaxial needle at a rate of 12 droplets per 10 seconds and collected in a glass vessel containing a cross-linking (e.g., conditioning) solution (25 mM HEPES buffer, 20 mM $BaCl_2$, 0.2M mannitol and 0.01% poloxamer 188).

After extrusion of the desired volumes of the first and second particle solutions, the particles (e.g., two-compartment capsules) remained in the cross-linking solution for five additional minutes. Particles that had fallen to the bottom of the vessel were transferred into a 50 mL conical tube and then allowed to settle to obtain a preparation of cross-linked particles. The cross-linking solution was removed from above the cross-linked particle preparation, and the particles were washed to remove the residual cross-linking solution in the particle preparation. This was done by resuspending the particles in a sterile, aqueous wash solution, using at least 10-fold higher volume of wash solution than the volume of the particle preparation. The tube with the resuspended particles was rotated on a multipurpose tube rotator (Fisher Scientific, Cambridge, MA, USA) at 40 rpm for 2 minutes, and then the supernatant over the particles was removed. The particle resuspension in wash solution, tube rotation and supernatant removal steps were repeated to achieve a total of 15 washes of the particle preparation. The wash solution in the particle preparation was exchanged for a storage solution by resuspending the particles in a sterile, aqueous storage solution, using at least 10-fold higher volume of storage solution than the volume of the washed particle preparation. The particles were allowed to settle and the supernatant was removed. This process of exchanging wash solution with storage solution was repeated once and the particles were then resuspended in at least ten-fold higher volume of the storage solution. The resulting particle preparation was stored in the conical tube at room temperature (20-25° C.).

Example 3B. Automated Encapsulation Process

An exemplary automated encapsulation apparatus similar to the apparatus illustrated in FIG. 1 was set up and used to prepare the particle preparations described in Example 4 below. This apparatus did not have the level sensor 78 shown in FIG. 1. Also, the fluid exchange modules were configured differently than shown in FIG. 1, but functioned in the same general way as illustrated in FIG. 1 and described herein above.

The first and second exchange modules contained a total of twelve fluid exchange units 106: (i) the first exchange module contained a connected series of ten of the exchange unit 106a-lumen 130 combination, with each fluid supply segment 122 (FIG. 4) of the 10 exchange units 106a in fluid connection with a single fluid reservoir 102 and (ii) the second fluid exchange module contained a connected series of two of the exchange unit 106b-lumen 133 combination, with each fluid supply segment 122 of the 2 exchange units 106b in fluid connection with a single fluid reservoir 108. Three Masterflex® L/S® peristaltic pump systems (Cole-Parmer, Vernon Hills, IL, USA) were used to deliver exchange fluid from the reservoirs 102 and 108 to their designated exchange units as well as pull the exchanged fluid through the discharge segments 124 (FIG. 4). Each pump system contained a Masterflex L/S Computer-Compatible Digital Drive (Cat. No. EW-07551-30) on which was mounted up to four pump heads (Masterflex L/S MFLEX Easy-Load® Head (Cat. No. EW-77202-60 or EW-77201-60): ten of the total of twelve pump heads were in fluid connection with reservoir 102 and the remaining two pump heads were in fluid connection with reservoir 108. Reservoir 102 was connected to a fluid manifold with a single inlet port and ten outlet ports and reservoir 108 was connected to a fluid manifold with a single inlet port and two outlet ports.

The apparatus also included pulse dampeners to help reduce instantaneous deviations of the flow rate between the different fluids added during the conditioning process. A total of 24 pulse dampeners were used in the first and second fluid exchange modules: each of the twelve pump heads was in fluid connection with two dampeners, one of which was disposed between the pump head and the fluid supply segment 122 (FIG. 4) and the other dampener was disposed between the pump head and the discharge segment 124 (FIG. 4). Three additional pulse dampeners were located in lumens upstream of the fluid exchange modules: one in each of the lumens that supply fluid from the conditioning fluid reservoir 74 to the two inlet ports 72 and one in the lumen that supplies fluid from the subsequent conditioning fluid reservoir 77.

The disposable apparatus was assembled from injection-molded polycarbonate components (features 16, 56, 14, 106a, and 106b), stainless steel components (feature 46), extruded Teknor-Apex MD-50357 BT resin for all lumens, and a coaxial needle with an inner lumen of 22G and outer lumen of 18G (Ramé-Hart Instrument Co., Succasunna, NJ, USA). All lumens through which particles flowed had 0.125-inch inner and 0.25 inch outer diameters. The lengths of certain lumens were as follows: each lumen 68, 31 feet; each lumen 130, 14 feet; each lumen 133, about 1 foot. All other lumens were of a length that was easily manageable by a human operator. All of the components in the disposable apparatus were joined by cyanoacrylate adhesive (Loctite, Hartford, CT, USA). The disposable apparatus was sterilized by irradiation with 26-36 kGy of gamma radiation (Steris, Northborough, MA, USA).

This disposable apparatus was placed into a biosafety cabinet and connected to the particle collection chamber 24 and fluid reservoirs 74, 77, 102, and 108 as shown in FIG. 1, except that (a) fluid reservoirs 74 and 77 were in fluid connection with each other (both containing the same fluid)

and (b) a 0.2-μm filter (Pall Corporation, New York, NY, USA) was located just downstream of each connection to fluid reservoirs 74, 77, 102, and 108.

The particle collection chamber 24 was a 2 L sterile bottle (Thermo Fisher Scientific, Cambridge, MA, USA) and all fluid reservoirs were single or multiple connected 20 L bioprocessing bags with MPC ports (Thermo Fisher Scientific (Cat No. SH3070903), Waltham, MA, USA), except that fluid reservoirs 74 and 77 were in fluid connection with a third 20 L bioprocessing bag. The fluid in reservoirs 74 and 77 was a sterile, endotoxin-free cross-linking solution (sterile, endotoxin-free water with 0.2M mannitol, 25 mM HEPES, 20 mM barium chloride, 0.01% Poloxamer 188) (e.g., first conditioning fluid). The fluid in reservoir 102 was a sterile, endotoxin-free aqueous wash solution (e.g., second conditioning fluid). The fluid in reservoir 108 was a sterile, endotoxin-free aqueous storage solution (e.g., third conditioning fluid). A particle storage solution was added to the particle collection chamber in an amount sufficient to cover a single layer of particles. The particle collection chamber and fluid reservoirs were then connected to their associated Masterflex® L/S® peristaltic pump systems.

The disposable apparatus was primed by pumping fluid from fluid reservoirs 74, 77, 102 and 108 until the apparatus was filled with fluid from the receiving surface 20 to the particle collection chamber 24 and no bubbles were in the lumens between these two components.

Three mL of the first and second particle fluids prepared in Example 2 were added to separate BD disposable 5-mL syringes with Luer-Lok™ tip (BD (Cat. No., 309646), Franklin Lakes, NJ, USA) and the syringe tip of each syringe was connected to the tubing (1.78 mm inner diameter tubing (#470101, B. Braun, Melsungen, Germany) in the disposable apparatus that was connected to the inner lumen (first particle fluid) or outer lumen (second particle fluid) of the coaxial needle. The needle was then primed by manually pushing first and second particle fluids from the syringes through the needle. The dispensing function illustrated by pumps 38 and 42 in FIG. 1 was provided by connecting both syringes to the syringe pumping apparatus in a single PHD Ultra™ Syringe Pump (Harvard Apparatus, Holliston, MA, USA).

The controller 50 was a Lenovo laptop computer (Lenovo, Quarry Bay, Hong Kong) which ran custom software from Ximedica, Providence, RI, USA. The computer was in electrical communication with all of the pumps and the following components: voltage source 48, which was a PHV Series DC Power Supply (TDK Lambda, Hauppauge, NY, USA) connected to the midpoint of the coaxial needle and a grounding wire connected to conducting plate 46; actuator 80, which was a 100 mL syringe (Wilburn Medical USA, Kernersville, NC, USA)); pressure sensors 87 and 99, which were Omega PX309 Series Stainless Steel Pressure transducers (Omega Engineering Model No. PX309-005GI, Norwalk, CT, USA); droplet sensor 136, which was a Keyence LV-NH300 digital laser sensor (Keyence Corporation of America, Itasca, IL, USA); and valve 97.

To operate the apparatus, the operator switched on the TDK Lambda power supply (reference numeral 48) and the computer 50. All pumps except the syringe pumps were run at 15 mL/min flow rate with valve 97 closed. The syringe pumps were run at 5 mL/h flow rate. Two independent control loops were managed at the same time. In the first control loop, the computer used a PID algorithm to sense droplet rate via the sensor 136. The computer then output a varying setpoint for the power supply to maintain the droplet rate at 72 droplets (e.g., unconditioned particles) per minute+/−5%. The conditioned particles formed during this initial period were diverted to a waste container through lumen 95. Meanwhile, the receiving surface of the conditioning fluid (reference numeral 20) was maintained in the conditioning fluid level range (dotted region in FIG. 1) and the pressure in the upper compartment 15 (as measured by sensor 87) converged to the steady-state pressure measured by sensor 99. This was done by actuating pressure with the actuator 80 and pausing and restarting pumps 76 and 79.

Once pressures, flowrates, and droplet rates were within 5% of the set values stated above, pumps 75 and 79 were stopped and valve 97 was opened to allow particles to enter the remainder of the first conditioning chamber. Conditioned particles that passed through the last exchange unit 106*b* were collected in particle collection chamber 24.

The apparatus was run at steady state until about 0.1 mL of the first and second particle fluids remained in the BD syringes, at which time the operator instructed the controller to switch off pumps 76 and 79 and the syringe pump, close valve 97 and switch on pump 75. Once all particles downstream of valve 97 had proceeded through the remainder of the apparatus, the operator switched off pump 75 and clamped all lumens connecting to the particle collection chamber 24 with a hemostatic clamp (VWR, Philadelphia, PA, USA) and the particle collection chamber was separated from the apparatus and capped. The chamber, which contained the preparation of conditioned particles encapsulating engineered RPE cells in storage fluid, was stored at room temperature (20-25° C.).

Example 4. Comparison of Particle Compositions Prepared by the Manual and Automated Processes Preparations of conditioned particles made according to Example 3A (manual particles) and Example 3B (automated particles) were compared with respect to the following properties: particle strength as assessed by initial fracture force; particle barium concentration; particle size; one-week post implant of human FVIII levels in blood plasma of nude mice; and barium levels in CD-1 mice bones at 1-week post implant. The results are shown in FIGS. 9-13.

Figure 12:
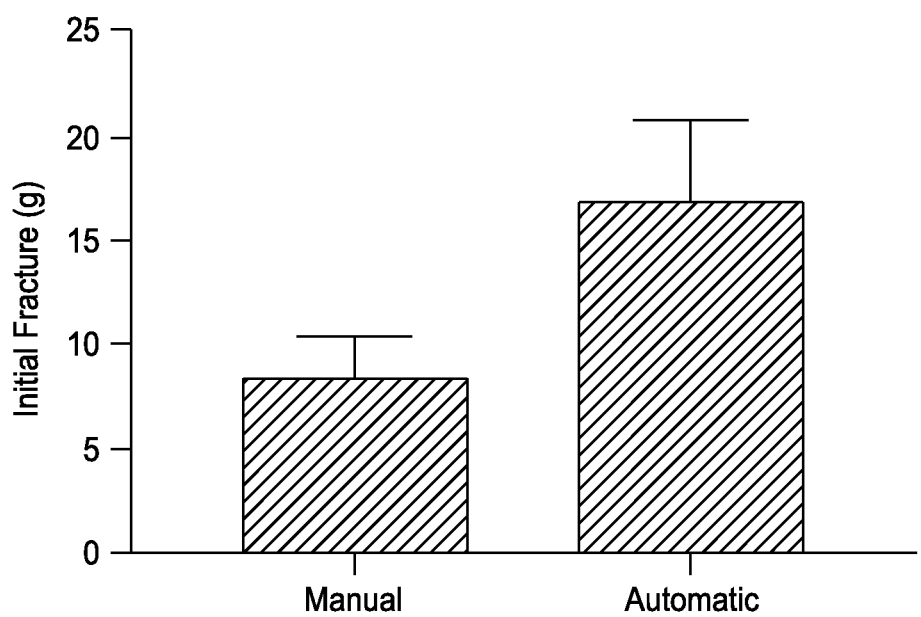
FIG. 12 is a bar graph showing the average initial fracture of particles (e.g., two-compartment hydrogel capsules) in particle preparations manufactured using exemplary manual and automated processes described herein.
Figure 13:
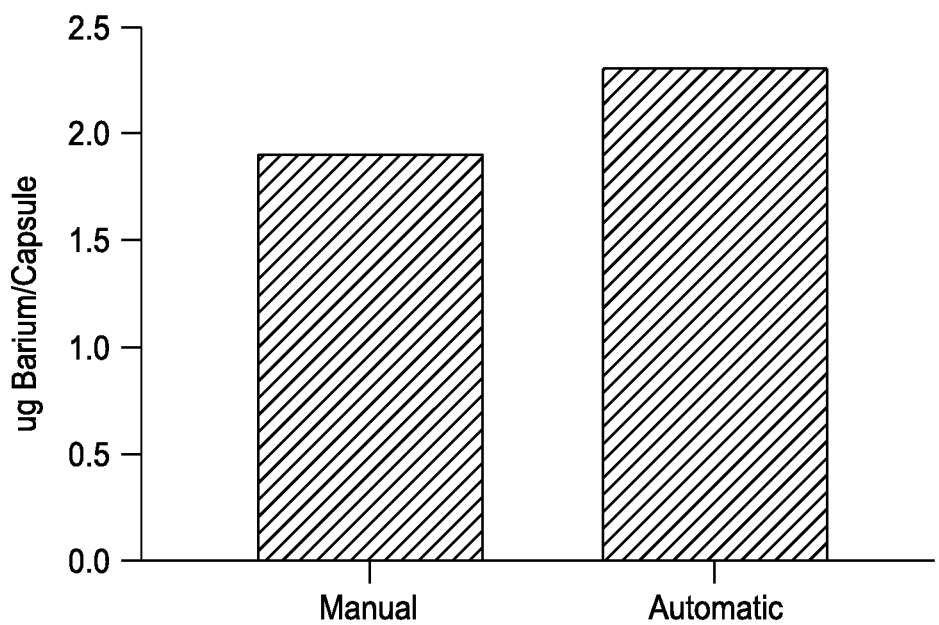
FIG. 13 is a bar graph showing the average amount of barium per particle in a subsample of the same particle preparations shown in FIG. 12.

As seen in FIG. 12, particles made via the automatic process had a significantly higher initial fracture score, and thus greater strength, than particles made by the manual process. This greater strength is likely due to the presence of a higher amount of barium in the automatic particles than in the manual particles, as shown in FIG. 13.

Figure 14:
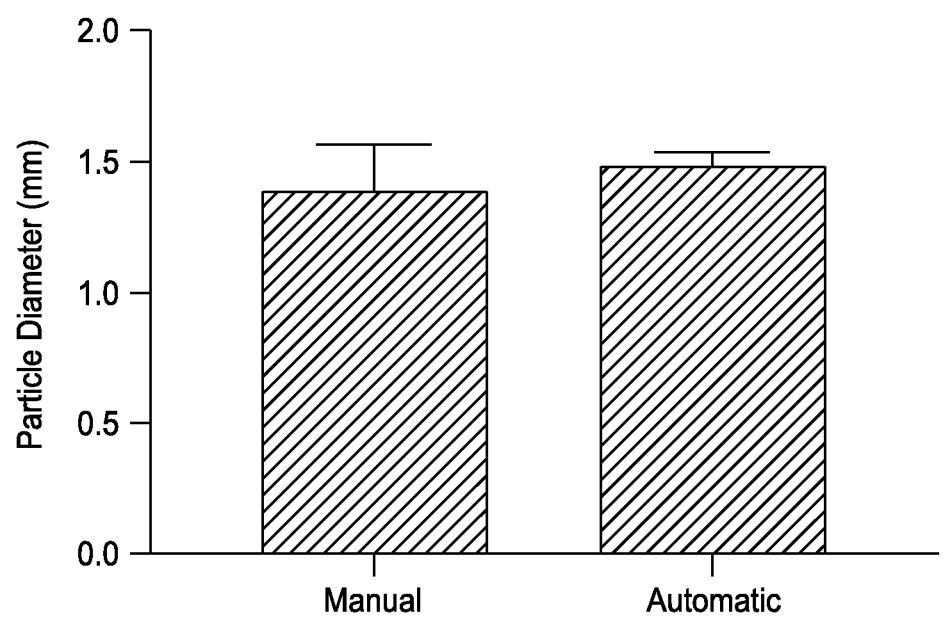
FIG. 14 is a bar graph showing the average particle diameter (in millimeters) for the same particle preparations shown in FIG. 12.

FIG. 14 shows that the particles in the preparation generated by the automatic process were more uniform in size than particles in the preparation generated by the manual process, indicating that the automated process generated particles with a more accurate size (average diameter closer to 1.5 mm) and more precise (smaller standard deviation).

Figure 15:
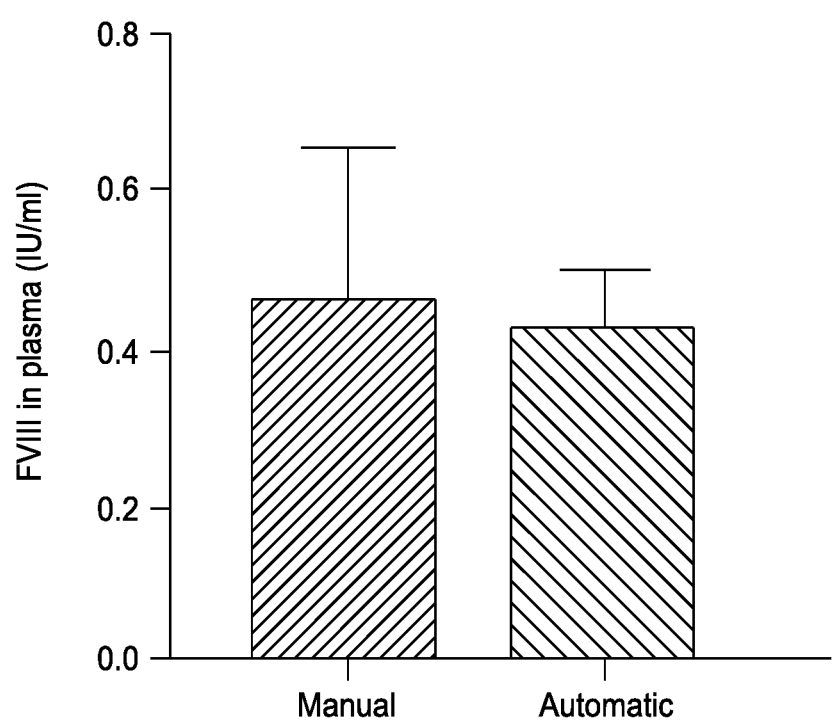
FIG. 15 is a bar graph showing the average amount of human FVIII in plasma of 4 mice at 1-week post implant with particles from the same particle preparations shown in FIG. 12.

These properties of higher strength and higher size uniformity of the automatic particle preparation appears to provide more consistent performance after implant. As shown in FIG. 15, when particles prepared by the manual and automatic processes were implanted into nude mice, there was less inter-mouse variation in human FVIII plasma levels in the mice implanted with the automatic particles compared to mice implanted with the manual particles.

Figure 16:
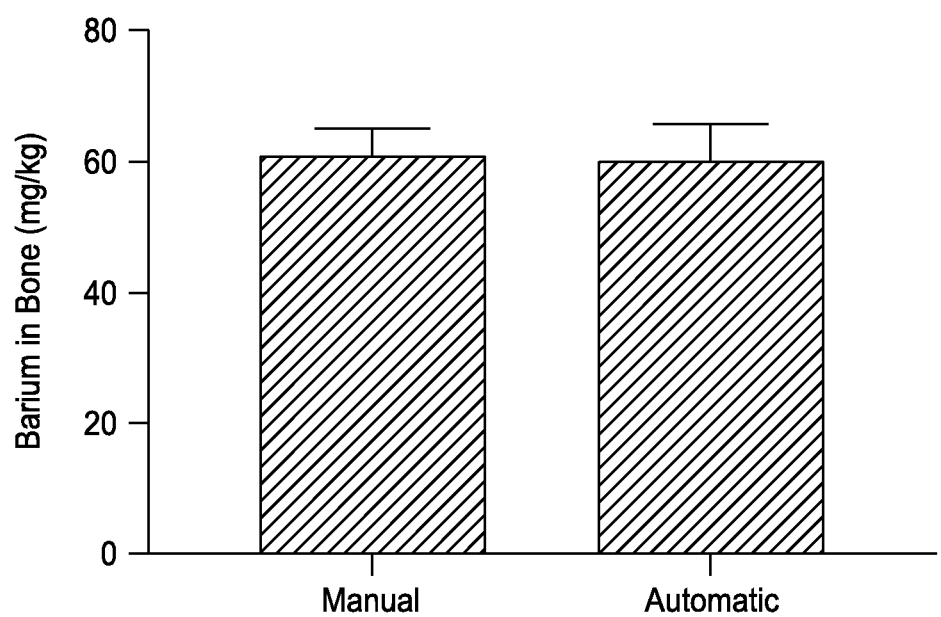
FIG. 16 is a bar graph showing the average amount of barium in bone samples obtained from 4 mice at 1-week post implant with particles from the same particle preparations shown in FIG. 12.

FIG. 16 shows similar barium levels in bones of the CD-1 mice at 1 week after implantation with the manual and automatic particles. Thus, the higher level of barium in particles prepared with the automatic process did not lead to higher barium bone levels.

Example 5. Evaluation of Exchange Unit Designs

In some embodiments, exchange units of the present disclosure are designed to prevent clogging. Testing of various embodiments of the exchange unit showed how the design of these embodiments affected fluid exchange between a first fluid, such as a conditioning fluid, carrying capsules into the exchange unit and a second fluid, such as a clean wash fluid, to carry the capsules out of the exchange unit.

Figure 17:
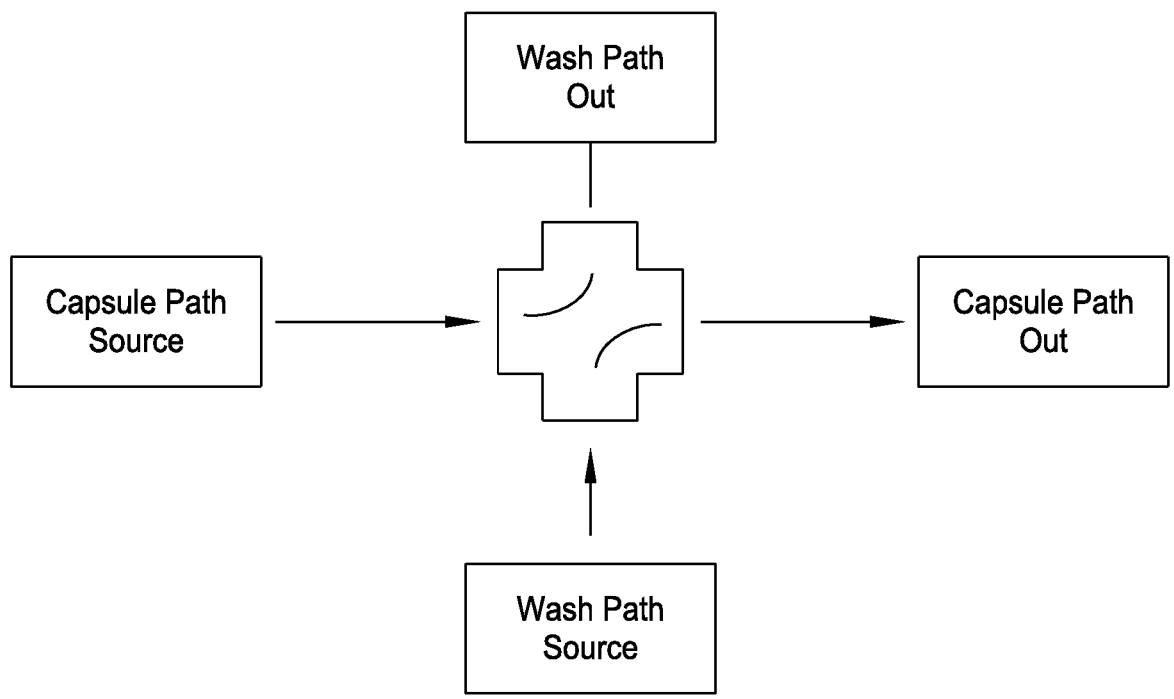
FIG. 17 is a schematic of an embodiment of an exchange unit of the present disclosure.

To examine the mixing efficiency of various exchange unit designs, a pH test was set up to measure the capsule path fluid after two source fluids, one acidic and one basic, passed through the cross-pieces. FIG. 17 shows a schematic of flow through an exchange unit that is 100% efficient. In FIG. 17, the capsules generally travel from the port on the left to the port on the right. In an ideal exchange of fluids, a first fluid carries capsules into the port on the left in FIG. 17 and exits through the port at the top of FIG. 17. To replace this first fluid, a second fluid enters the port at the bottom of FIG. 17 and carries the capsules out of the port on the right of FIG. 17.

Figure 18:
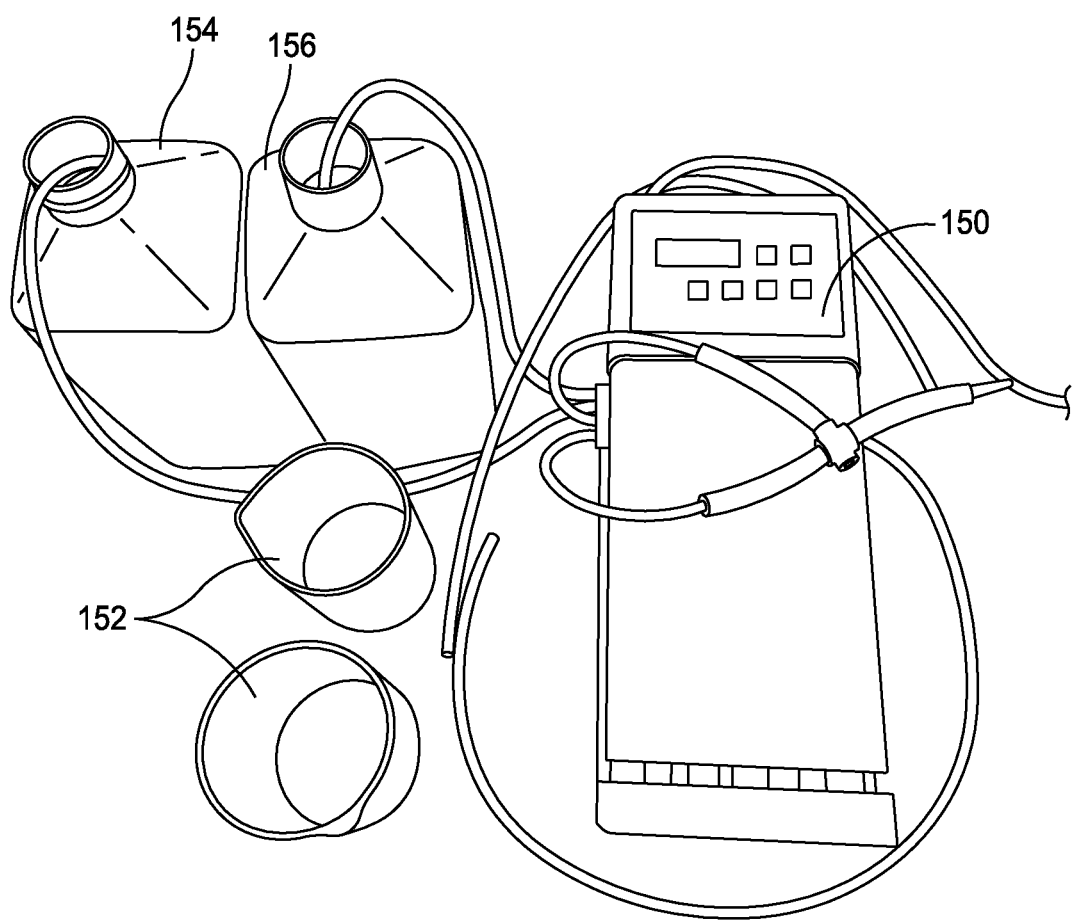
FIG. 18 is an experimental setup for testing the mixing efficiency of an exchange unit.

FIG. 18 shows a testing setup for an exchange unit. FIG. 18 shows a pump 150, beakers 152, a first bottle 154 containing a first buffer solution and a second bottle 156 containing a second buffer solution. Testing materials included:

Dr.meter PH100-V 0.01 Resolution, High Accuracy pH Meter with Auto-Temperature Compensation, 0-14 pH Measurement Range
4.0 and 10.0 pH buffer solution mixture
50 mL beakers
Ismatech peristaltic pump, model IPC ISM934C The testing procedure was performed using the following protocol. Prior to testing, mix acidic buffer with distilled water in a container and mix basic buffer with distilled water in another container. Dispense 15 mL of acidic solution into a beaker and record the pH. Dispense 15 mL of basic solution into a beak and record the pH. Mix 7.5 mL of basic solution and 7.5 mL of acidic solution into a beaker and record the pH. The pH meter should read in the middle of the acidic and basic solution readings.

Then, for each exchange unit to be tested, perform the following steps. Place the tubing from the exchange unit into the peristaltic pump so that two adjacent legs of the exchange unit are pumping fluid in and the other two legs are pulling fluid out of the pump, as seen in FIG. 18. Place the capsule path end of the tubing attached to the peristaltic pump into the basic buffer solution. Place the other end into acidic buffer solution. Place the ends of the tubing not attached to the peristaltic pump into two separate empty beakers to collect fluid. Set the peristaltic pump to 15 mL/min and turn on the pump. Allow the cross-piece component to prime with fluid for a minimum of 30 seconds. While the pump is running, replace the two collection beakers with two new beakers. Allow the peristaltic pump to run for a minimum of 60 seconds. Turn off the pump. Measure and record the pH of the two collection beakers. Remove the exchange unit from the peristaltic pump and wash beakers.

Figure 19:
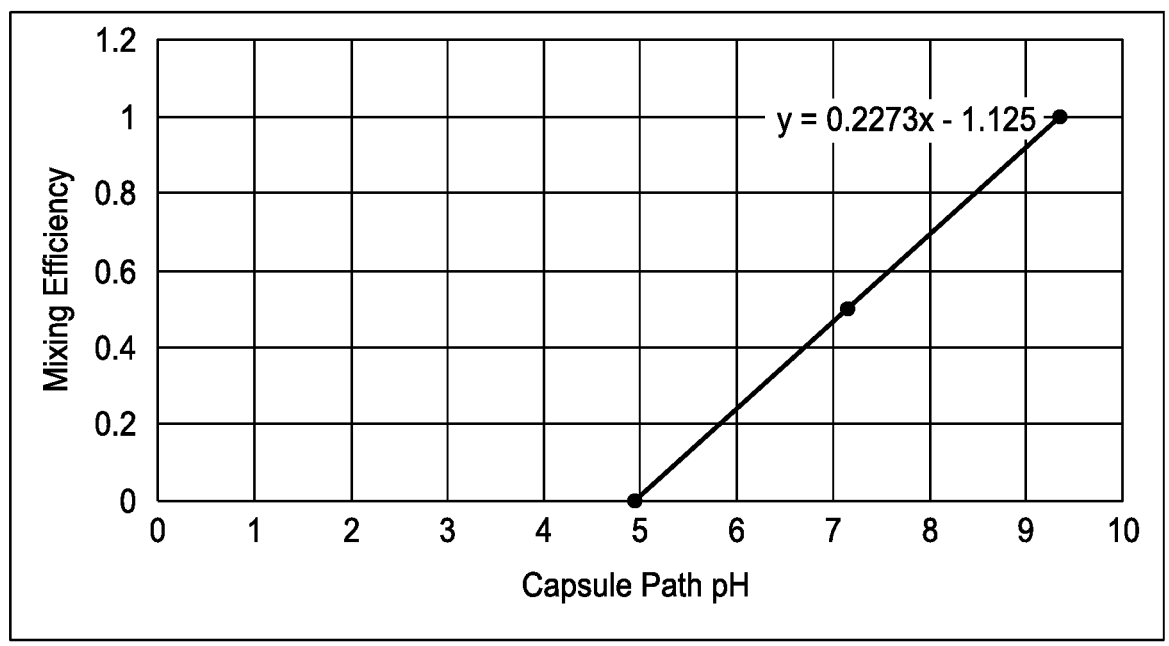
FIG. 19 is a plot of mixing efficiency.

If the source fluids exchange at 100% efficiency, the fluid carrying the capsules out of the exchange unit will have the same pH as the wash fluid source. Therefore, the mixing efficiency was calculated by graphing the pH of both source fluids over mixing efficiency, then solving for the equation of the graphed line. As shown in FIG. 19, the relationship of the mixing efficiency for this test can be characterized as $y=0.2273x-1.125$, where y is the mixing efficiency and x is the capsule path pH. The pH data from each exchange unit was then placed into the equation and solved for efficiency of the exchange unit design. The table below shows pH levels for different mixing efficiency values.

|  | Capsule Path pH | Mixing Efficiency |
| --- | --- | --- |
| Wash Fluid Source | 9.35 | 1 |
| 50% Mixing | 7.15 | 0.5 |
| Capsule Fluid Source | 4.95 | 0 |

FIGS. 20A-26D show drawings for various exchange unit designs. FIGS. 20A-20D shows a baseline exchange unit design that was tested. FIG. 21A-21E shows an "Oval Venturi Vertical" exchange unit design. FIG. 22A-22E shows an "Oval Venturi Horizontal" exchange unit design. FIG. 23A-23E shows a "Large Leg Vertical" exchange unit design. FIG. 24A-24D shows a "Large Leg, Vertical, Symmetric" exchange unit design. FIG. 25A-25D shows a "Large Leg, Horizontal" exchange unit design. FIG. 26A-26D shows a "Large Leg, Horizontal, Symmetric" exchange unit design. Dimensions in FIGS. 20A-26D are shown in millimeters.

Figure 20A:
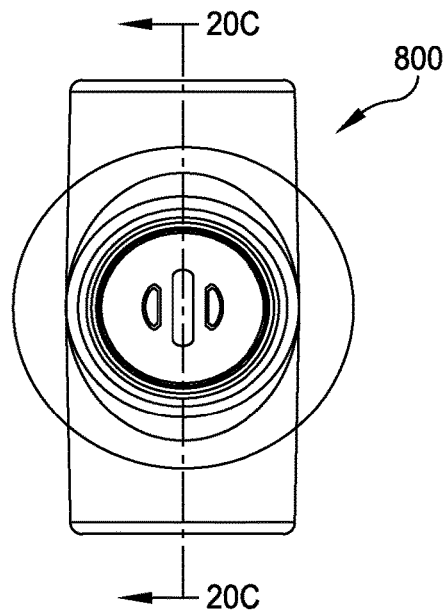
FIGS. 20A-20D are a set of drawings for a design of an exchange unit of the present disclosure.
Figure 20B:
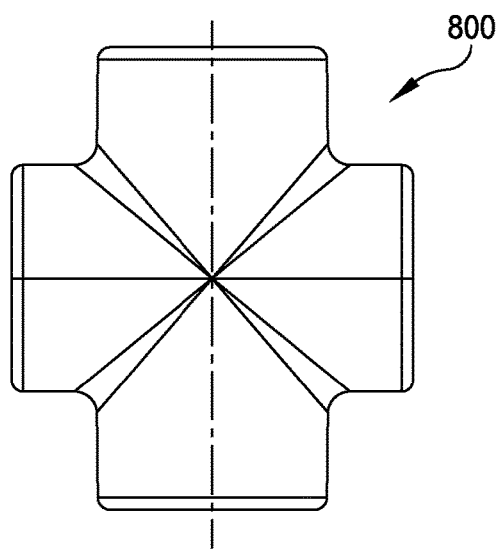
Figure 20C:
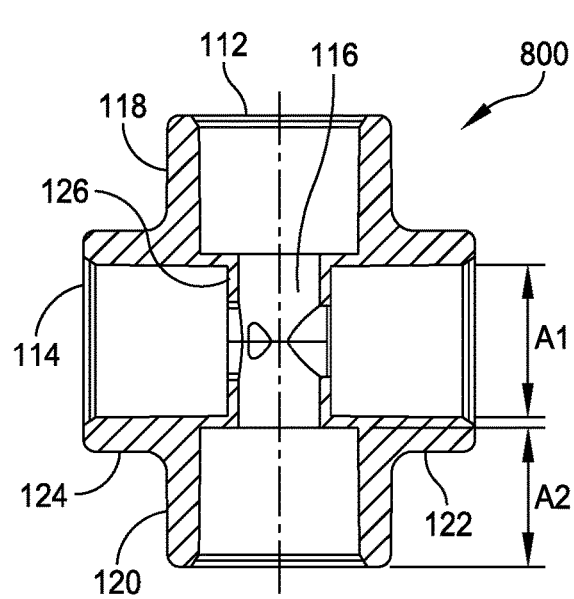
Figure 20D:
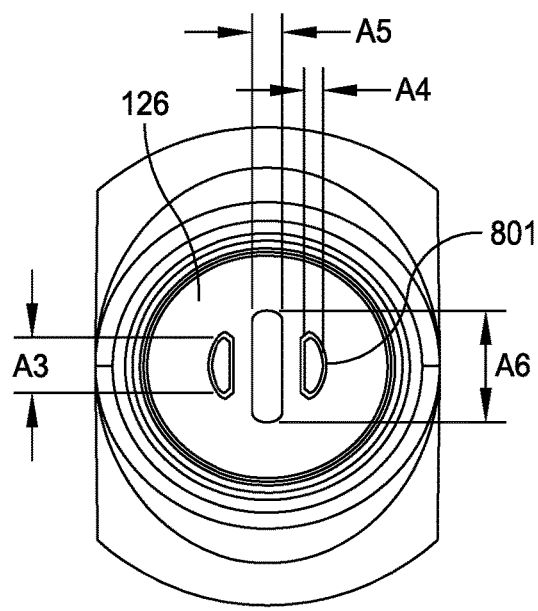

FIGS. 20A-20D show an exemplary embodiment of an exchange unit 800. The exchange unit is similar to the exchange unit 106 described above, with like feature numbers indicating like features. The exchange unit 800 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124. The exchange unit can be constructed with various dimensions. In FIG. 20C, in some embodiments, A1 is 6.45 millimeters, and A2 is 6.00 millimeters.

The filter element (e.g. sieve) 126 within the transfer junction 116 covers an inlet of the discharge lumen segment 124. The filter element 126 of the exchange unit 800 has a pattern of openings 801 including one or more filter element apertures. Each filter element aperture is configured to allow removal of particles that are smaller than a desired size. FIGS. 20A-20D show two apertures having dimensions A3 by A4 and a third aperture having dimensions A5 by A6. In some embodiments, A3 is 1.59 millimeters, A4 is 0.53 millimeters, A5 is 0.75 millimeters, and A6 is 3.07 millimeters.

FIGS. 21A-21E show an exemplary embodiment of an exchange unit 802. The exchange unit is similar to the exchange unit 106 described above, with like feature numbers indicating like features. The exchange unit 802 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124. The exchange unit can be constructed with various dimensions.

Figures 21A, 21B:
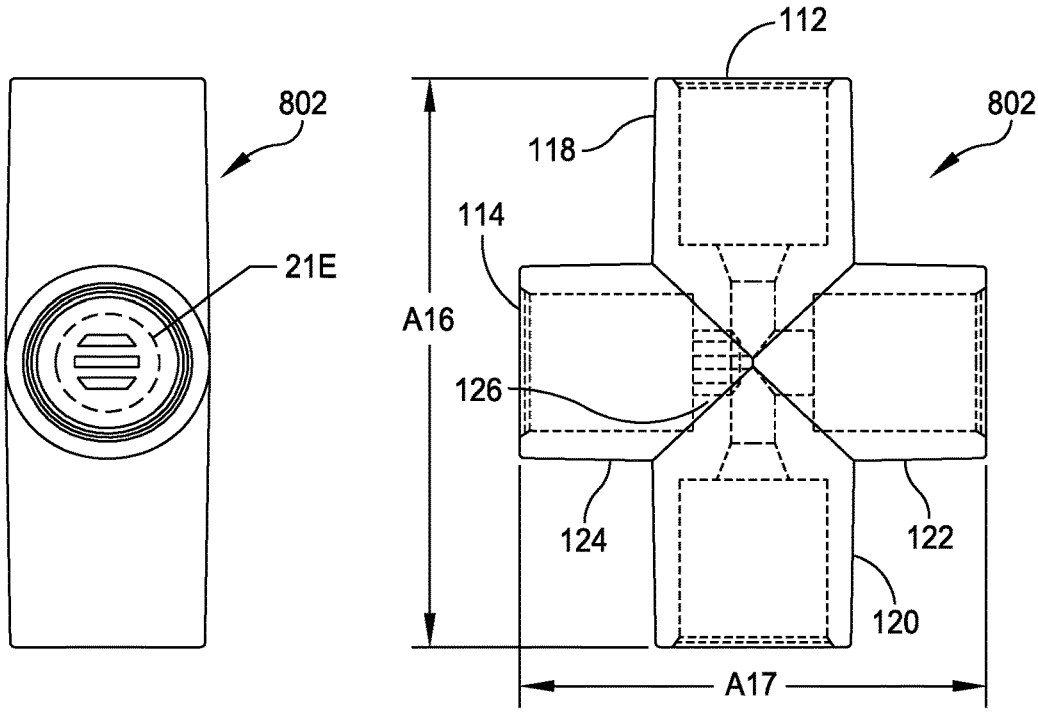
FIGS. 21A-21E are a set of drawings for a design of another exchange unit of the present disclosure.
Figure 21C:
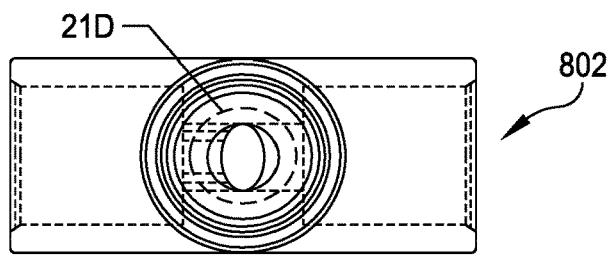

The filter element (e.g. sieve) 126 within the transfer junction 116 covers an inlet of the discharge lumen segment 124. The filter element 126 of the exchange unit 802 has a pattern of openings 803 including one or more filter element apertures. Each filter element aperture is configured to allow removal of particles that are smaller than a desired size. FIG. 21E shows three apertures. The apertures have dimensions shown by A7, A8, A9, A10, A11, and A12. In some embodiments, A7 is 1.87 millimeters, A8 is 2.76 millimeters, A9 is 3.18 millimeters, A10 is 0.50 millimeters, A11 is 0.50 millimeters, and A12 is 0.57 millimeters.

Figure 21D:
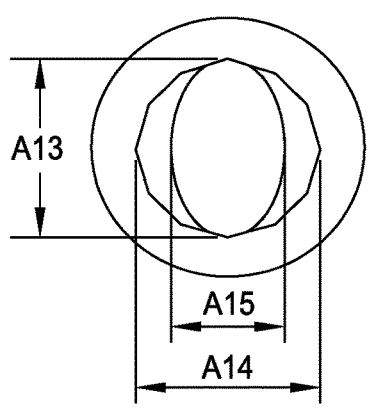
Figure 21E:
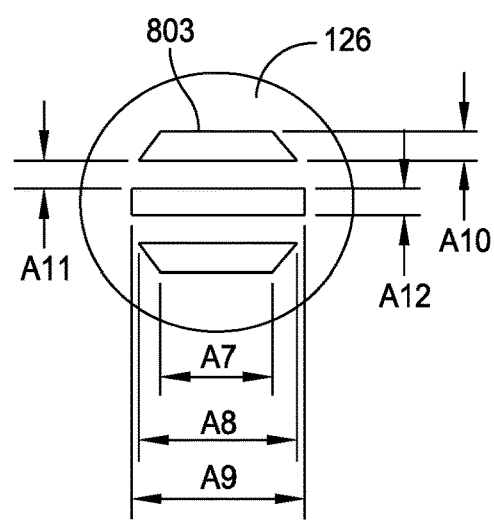

FIG. 21D shows the interior of the first exchange lumen 112 defined by the dimensions A13, A14, and A15. The opening tapers from the width of A14 to A15. In some embodiments, A13 is 3.18 millimeters, A14 is 3.18 millimeters, and A15 is 2.00 millimeters.

The overall footprint of the exchange unit 802 is show by the dimensions A16 and A17 in FIG. 21B. In some embodiments, A16 is 27.37 millimeters and A17 is 21.50 millimeters.

FIGS. 22A-22E show an exemplary embodiment of an exchange unit 804. The exchange unit is similar to the exchange unit 106 described above, with like feature numbers indicating like features. The exchange unit 804 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124. The exchange unit can be constructed with various dimensions.

The filter element (e.g. sieve) 126 within the transfer junction 116 covers an inlet of the discharge lumen segment 124. The filter element 126 of the exchange unit 804 has a pattern of openings 805 including one or more filter element apertures. Each filter element aperture is configured to allow removal of particles that are smaller than a desired size. FIG. 22E shows three apertures. The apertures have dimensions shown by A18, A19, A20, A21, A22, and A23. In some embodiments, A18 is 3.17 millimeters, A19 is 2.76 millimeters, A20 is 1.87 millimeters, A21 is 0.50 millimeters, A22 is 0.50 millimeters, and A23 is 0.50 millimeters.

Figures 22A, 22B:
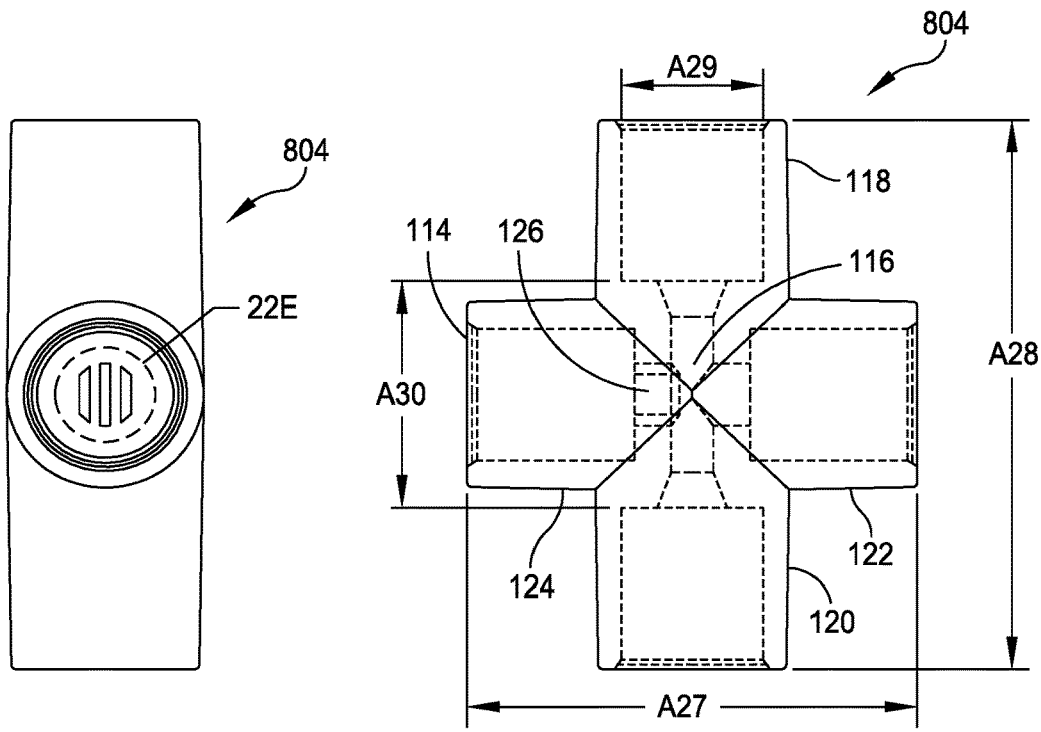
FIGS. 22A-22E are a set of drawings for a design of another exchange unit of the present disclosure.
Figure 22C:
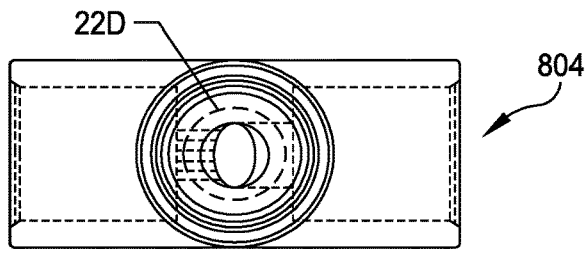
Figures 22D, 22E:
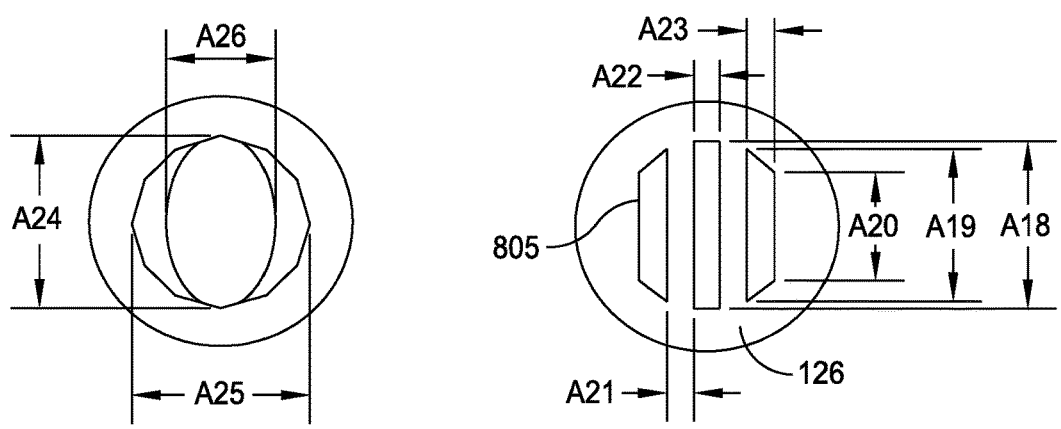

FIG. 22D shows the interior of the first exchange lumen 112 of FIG. 22B defined by the dimensions A24, A25, and A26. The opening tapers from the width of A25 to A26. In some embodiments, A24 is 3.17 millimeters, A25 is 3.18 millimeters, and A26 is 2.00 millimeters.

The overall footprint of the exchange unit 804 is show by the dimensions A27 and A28 in FIG. 22B. In some embodiments, A27 is 21.50 millimeters and A28 is 27.45 millimeters. The inner diameter of the inlet particle lumen segment 118 is A29. In some embodiments, A29 is 6.45 millimeters. The distance between the full diameter portions of the inlet particle lumen segment 118 and the outlet particle lumen segment is shown as A30. In some embodiments, A30 is 11.45 millimeters.

FIGS. 23A-23D show an exemplary embodiment of an exchange unit 806. The exchange unit is similar to the exchange unit 106 described above, with like feature numbers indicating like features. The exchange unit 806 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124. The exchange unit can be constructed with various dimensions.

The filter element (e.g. sieve) 126 within the transfer junction 116 covers an inlet of the discharge lumen segment 124. The filter element 126 of the exchange unit 806 has a pattern of openings 807 including one or more filter element apertures. Each filter element aperture is configured to allow removal of particles that are smaller than a desired size. FIG. 23D shows three apertures. The apertures have dimensions shown by A31, A32, and A33. In some embodiments, A31 is 0.50 millimeters, A32 is 3.18 millimeters, and A33 is 0.50 millimeters.

Figure 23A:
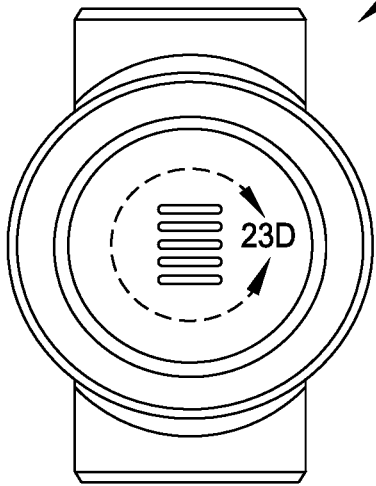
FIGS. 23A-23D are a set of drawings for a design of another exchange unit of the present disclosure.
Figure 23B:
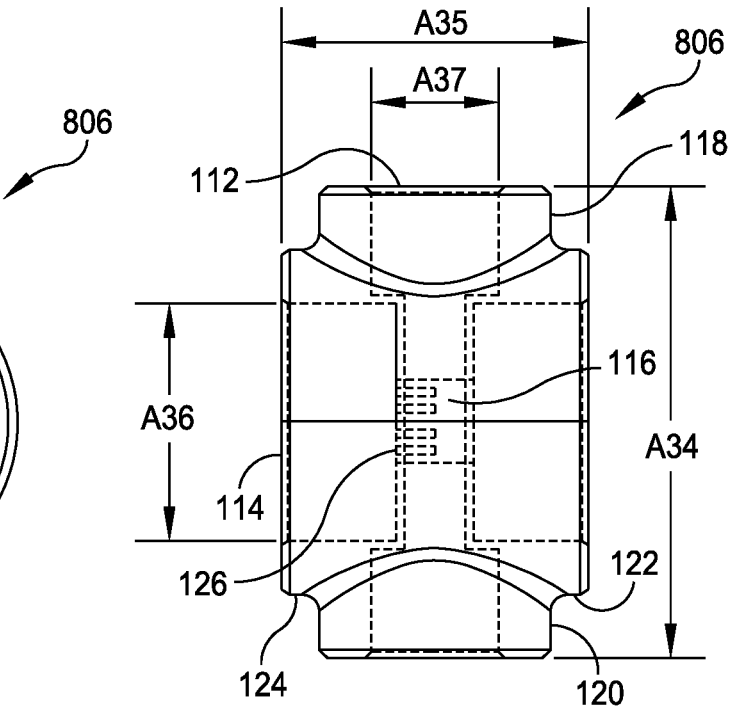
Figure 23C:
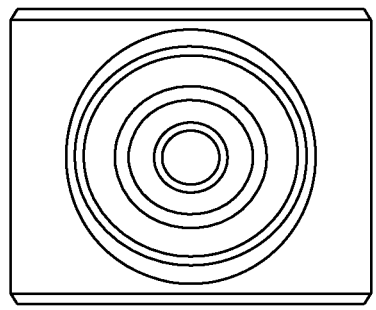
Figure 23D:
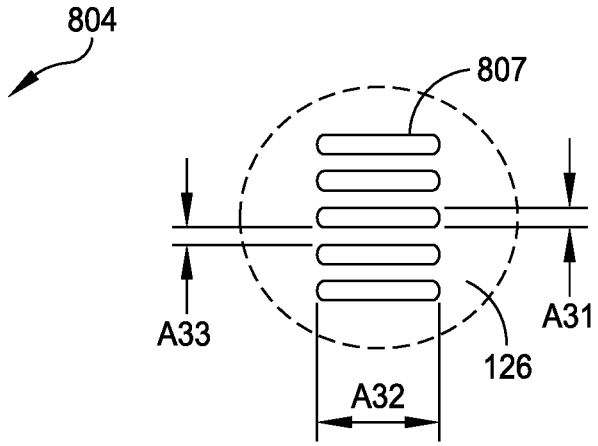

The overall footprint of the exchange unit 806 is show by the dimensions A34 and A35 in FIG. 23B. In some embodiments, A34 is 25.90 millimeters and A35 is 16.18 millimeters. The inner diameter of the inlet particle lumen segment 118 is A37. In some embodiments, A37 is 6.45 millimeters. The inner diameter of the discharge lumen segment 124 is A36. In some embodiments, A36 is 12.90 millimeters.

FIGS. 24A-24D show an exemplary embodiment of an exchange unit 808. The exchange unit is similar to the exchange unit 106 described above, with like feature numbers indicating like features. The exchange unit 808 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124. The exchange unit can be constructed with various dimensions.

The filter element (e.g. sieve) 126 within the transfer junction 116 covers an inlet of the discharge lumen segment 124. The filter element 126 of the exchange unit 808 has a pattern of openings 809 including one or more filter element apertures. Each filter element aperture is configured to allow removal of particles that are smaller than a desired size. FIG. 24D shows three apertures. The apertures have dimensions shown by A38, A39, and A40. In some embodiments, A38 is 0.50 millimeters, A39 is 3.18 millimeters, and A40 is 0.50 millimeters.

Figure 24A:
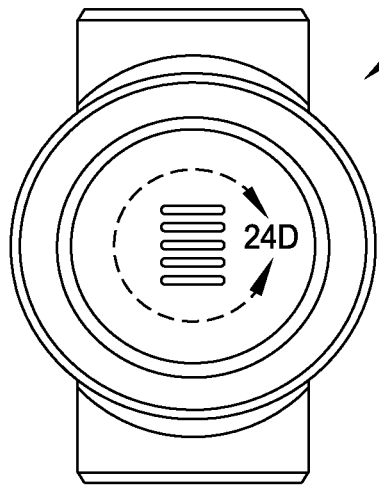
FIGS. 24A-24D are a set of drawings for a design of another exchange unit of the present disclosure.
Figure 24B:
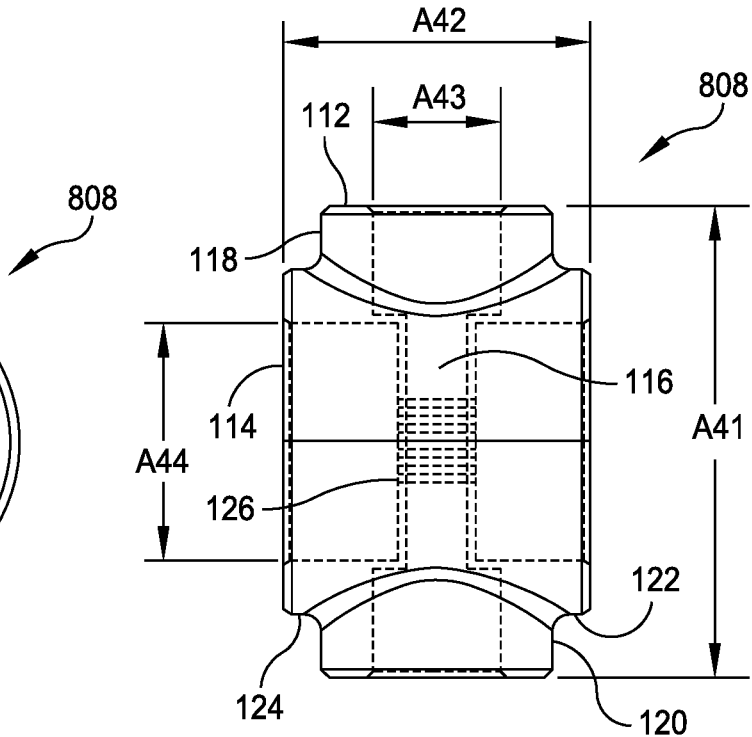
Figure 24C:
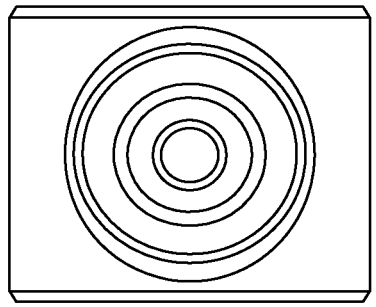
Figure 24D:
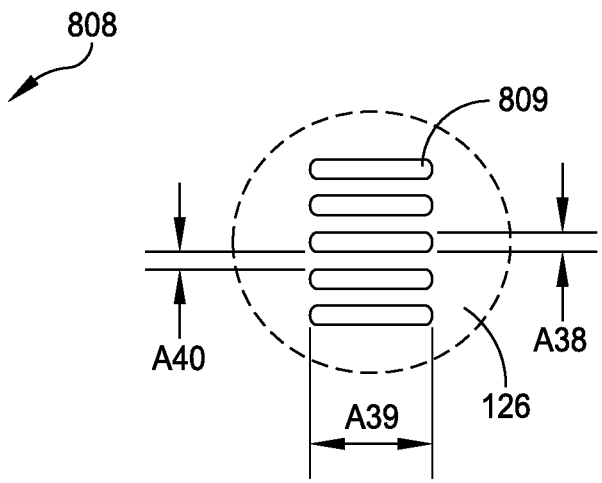

The overall footprint of the exchange unit 808 is show by the dimensions A41 and A42 in FIG. 24B. In some embodiments, A41 is 25.90 millimeters and A42 is 16.18 millimeters. The inner diameter of the inlet particle lumen segment 118 is A43. In some embodiments, A43 is 6.45 millimeters. The inner diameter of the discharge lumen segment 124 is A44. In some embodiments, A36 is 12.90 millimeters.

FIGS. 25A-25D show an exemplary embodiment of an exchange unit 810. The exchange unit is similar to the exchange unit 106 described above, with like feature numbers indicating like features. The exchange unit 810 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124. The exchange unit can be constructed with various dimensions.

The filter element (e.g. sieve) 126 within the transfer junction 116 covers an inlet of the discharge lumen segment 124. The filter element 126 of the exchange unit 810 has a pattern of openings 811 including one or more filter element apertures. Each filter element aperture is configured to allow removal of particles that are smaller than a desired size. FIG. 25D shows three apertures. The apertures have dimensions shown by A45, A46, and A47. In some embodiments, A45 is 0.50 millimeters, A46 is 0.50 millimeters, and A47 is 5.50 millimeters.

Figure 25A:
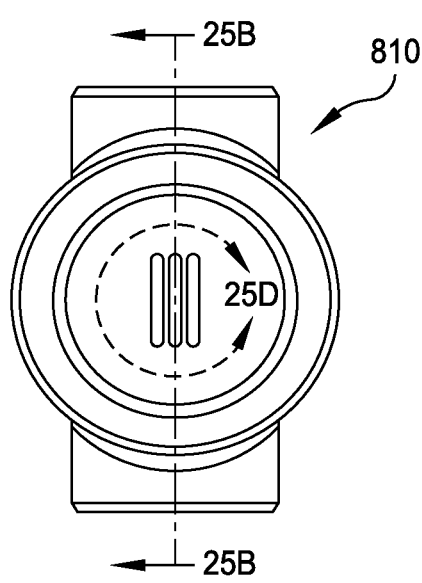
FIGS. 25A-25D are a set of drawings for a design of another exchange unit of the present disclosure.
Figure 25B:
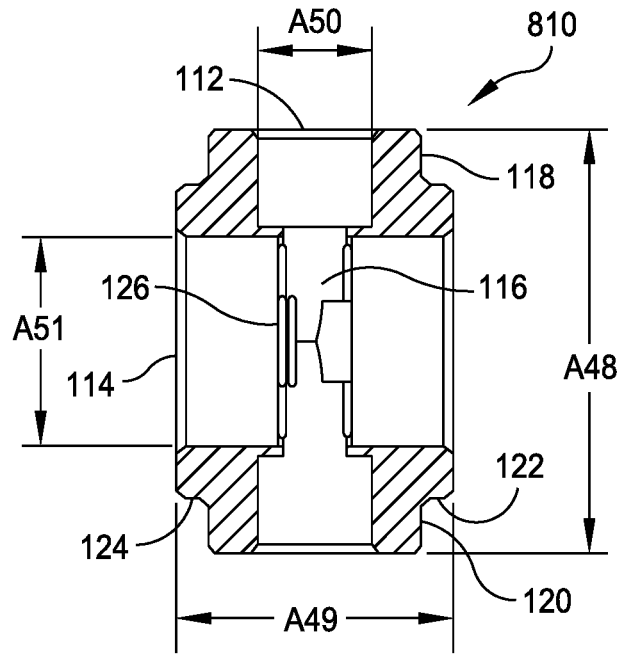

The overall footprint of the exchange unit 810 is show by the dimensions A48 and A49 in FIG. 25B. In some embodiments, A48 is 25.90 millimeters and A49 is 16.18 millimeters. The inner diameter of the inlet particle lumen segment 118 is A50. In some embodiments, A50 is 6.45 millimeters. The inner diameter of the fluid supply lumen segment 122 is A51. In some embodiments, A51 is 12.14 millimeters.

Figure 25C:
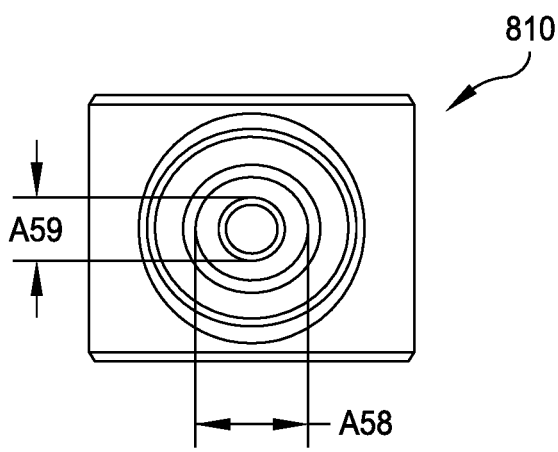
Figure 25D:
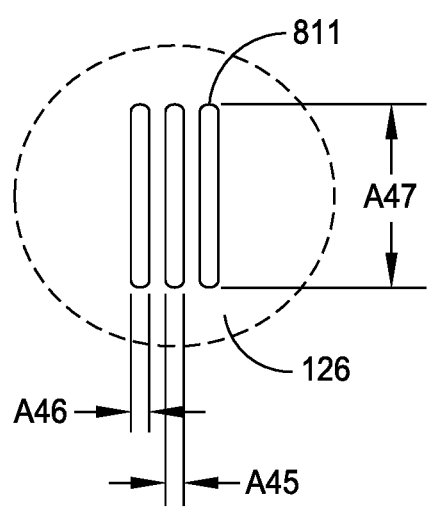

FIG. 25C shows the interior of the first exchange lumen 112 of FIG. 25B defined by the dimensions A58 and A59, as shown in FIG. 25C. The opening tapers from the width of A58 to A59. In some embodiments, A58 is 6.45 millimeters and A59 is 3.66 millimeters.

FIGS. 26A-26D show an exemplary embodiment of an exchange unit 812. The exchange unit is similar to the exchange unit 106 described above, with like feature numbers indicating like features. The exchange unit 812 includes a first exchange lumen 112 that intersects a second exchange lumen 114 at a transfer junction 116. The first exchange lumen 112 includes an inlet particle lumen segment 118 and an outlet particle lumen segment 120. The second exchange lumen 114 includes a fluid supply lumen segment 122 and a discharge lumen segment 124. The exchange unit can be constructed with various dimensions.

The filter element (e.g. sieve) 126 within the transfer junction 116 covers an inlet of the discharge lumen segment 124. The filter element 126 of the exchange unit 810 has a pattern of openings 813 including one or more filter element apertures. Each filter element aperture is configured to allow removal of particles that are smaller than a desired size. FIG. 26D shows three apertures. The apertures have dimensions shown by A52, A53, and A54. In some embodiments, A52 is 0.50 millimeters, A53 is 0.50 millimeters, and A54 is 5.50 millimeters.

Figure 26A:
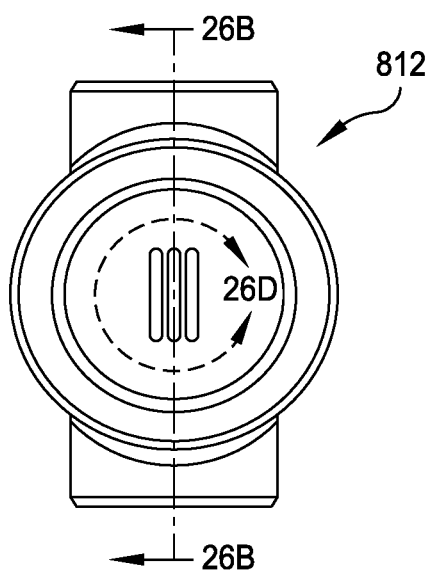
FIGS. 26A-26D are a set of drawings for a design of another exchange unit of the present disclosure.
Figure 26B:
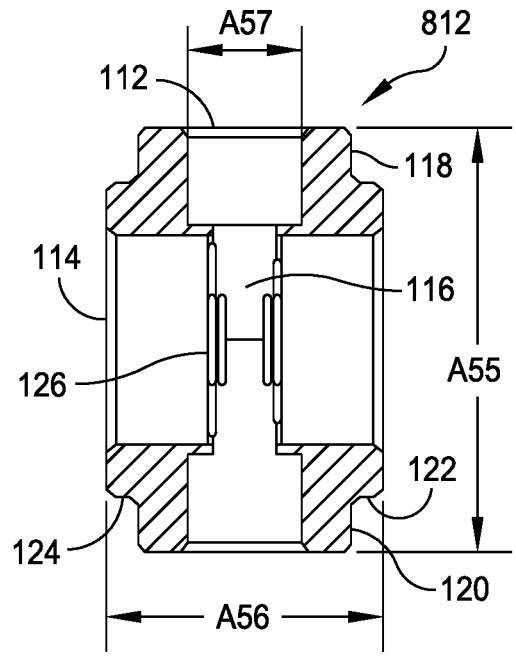

The overall footprint of the exchange unit 812 is show by the dimensions A55 and A56 in FIG. 26B. In some embodiments, A55 is 25.90 millimeters and A56 is 16.18 millimeters. The inner diameter of the inlet particle lumen segment 118 is A57. In some embodiments, A57 is 6.45 millimeters.

Figure 26C:
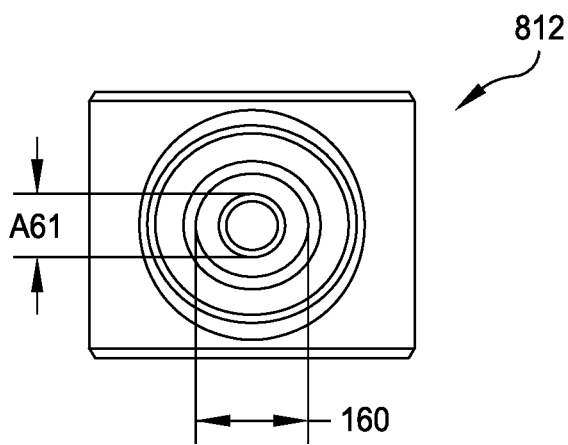
Figure 26D:
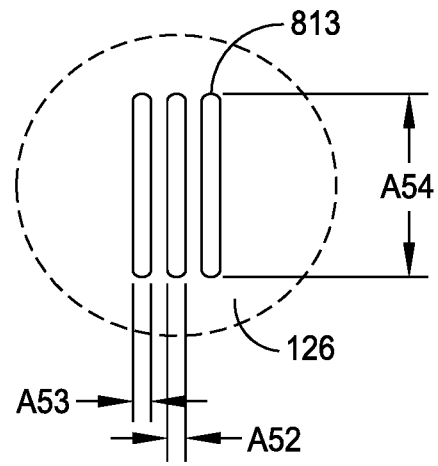

FIG. 26C shows the interior of the first exchange lumen 112 of FIG. 26B defined by the dimensions A60 and A61, as shown in FIG. 26C. The opening tapers from the width of A60 to A61. In some embodiments, A60 is 6.45 millimeters and A61 is 3.66 millimeters.

Mixing efficiency results for the designs of FIGS. 20-26 are shown in the table below.

| Cross-Piece Design | Wash Path after cross (pH) | Capsule Path after cross (pH) | Efficiency |
| --- | --- | --- | --- |
| Source Fluid (Pre-cross) | 4.95 | 9.35 | |
| 1. Baseline | 9.23 | 5.08 | 97.3% |
| 2. Oval Venturi Vertical | 9.20 | 5.10 | 96.6% |
| 3. Oval Venturi Horizontal | 9.09 | 5.22 | 94.1% |
| 4. Large Leg Vertical | 9.05 | 5.24 | 93.2% |
| 5. Large Leg, Vertical, Symmetric | 9.16 | 5.14 | 95.7% |
| 6. Large Leg, Horizontal | 9.20 | 5.10 | 96.6% |
| 7. Large Leg, Horizontal, Symmetric | 9.20 | 5.11 | 96.6% |

The data from pH testing demonstrated that the baseline cross design had the best mixing efficiency with an efficiency of 97.3%. The other six designs in this test performed between 93.2% and 96.6% efficiency. These mixing efficiencies can be used to calculate the fluid exchange and concentration of clean wash fluid throughout the apparatus. Exchange unit designs can also be evaluated for other flow characteristics, such as maximal and minimal flow rates, clog prevention, which may be beneficial to an apparatus for making conditioned particles.

EQUIVALENTS AND SCOPE

This application refers to various issued patents, published patent applications, journal articles, and other publications, all of which are incorporated herein by reference in their entirety. If there is a conflict between any of the incorporated references and the instant specification, the specification shall control. In addition, any particular embodiment of the present disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment of the disclosure can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, Figures, or Examples but rather is as set forth in the appended claims. Those of ordinary skill in the art will appreciate that various changes and modifications to this description may be made without departing from the spirit or scope of the present disclosure, as defined in the following claims.

The invention claimed is:

1. An apparatus for making conditioned particles comprising:
    a) a particle dispensing unit comprising a first orifice from which particles are dispensed;
    b) a conditioning chamber comprising an exit portal, wherein the conditioning chamber is configured to hold a first fluid to present a receiving surface of the first fluid, and to receive the particles from the particle dispensing unit;
    c) an exchange unit in fluid connection with the exit portal of the conditioning chamber in which the particles are separated from a conditioning fluid; and
    d) a property selected from i) to x):
    i) the apparatus is configured to separate particles from one another based on an attribute of the particles,
    ia) the apparatus is configured to separate a particle of a first class from a particle of a second class after particle dispensation but prior to the dispensed particles impinging on the receiving surface of the first fluid disposed in the conditioning chamber, and comprises a capture element disposed between the orifice and the receiving surface and configured and to hinder, the second class particle from impinging on the receiving surface of the first fluid; or
    ib) the apparatus comprises a filter element for fractionation of conditioned particles in the exchange unit;
    ii) a component of the apparatus is configured to receive a signal and responsive to the signal modulate the process parameter or the particle parameter;
    iia) the apparatus is configured such that responsive to the signal a field through which the particle passes is modulated;
    iib) the apparatus is configured to sense a distance from the orifice to the receiving surface of the first fluid in the conditioning chamber and to change to a desired distance;
    iii) the apparatus includes one or more sensors for sensing a parameter;

iv) the first orifice and the receiving surface are disposed within a housing wherein the housing comprises a port in connection with a source of displacement entity;

v) the conditioning chamber comprises, in fluid connection, a portion configured to present the receiving surface and an exit portal, configured such that a received particle flows through the conditioning chamber and through the exit portal;

vi) the apparatus comprises a source of the first fluid in fluid connection with a first-fluid inlet port on the conditioning chamber and the apparatus is configured so as to allow introduction of the first fluid through the first-fluid inlet port into the conditioning chamber vii) a portion, or all, of the conditioning chamber beneath the receiving surface is configured to provide a substantially linear path;

viii) the apparatus comprises the exchange unit in fluid connection with the exit portal of the conditioning chamber in which conditioned particles are separated from the first fluid by introduction of a second fluid; and x) the apparatus is configured such that the orifice and the receiving surface of the first fluid, are disposed within a housing that can maintain sterility.

2. The apparatus of claim 1, wherein the first fluid comprises conditioning fluid and the second fluid comprises a subsequent conditioning fluid.

3. The apparatus of claim 1, comprising one of the following combinations of properties:

a), b), ii), wherein responsive to a signal related to size from a sensor which is distal to the orifice, a parameter of the field is modulated;

a), b), iia), wherein responsive to a signal related to particle size or particle droplet rate, a parameter of the field is modulated to cause a change in a dispensing parameter;

a), b), iib), wherein the desired distance is selected to allow the apparatus to separate at least one class of particles from at least one other class of particles as the particles move from the orifice towards the receiving surface; or a), b), iii), wherein the parameter or the attribute is a number of particles or a frequency of particles passing a point, and the sensor includes a sensor that counts particles passing the point within the apparatus between the orifice and the receiving surface, a location in the conditioning chamber, or another location.

4. The apparatus of claim 1, further comprising a collection chamber in fluid connection with the exchange unit and configured to receive particles that have passed through the exchange unit; and, a first particle fluid reservoir for holding a particle component, and a cell, in fluid connection with the orifice.

5. The apparatus of claim 4, wherein the particle dispensing unit comprises a second orifice, in fluid connection with a second particle fluid reservoir for holding a particle component.

6. The apparatus of claim 5, wherein the first orifice and the second orifice are disposed co-axially.

7. The apparatus of claim 5, wherein the first orifice and the second orifice are configured to produce a particle comprising a first compartment and a second compartment surrounding the first compartment.

8. The apparatus of claim 1, wherein the particle dispensing unit comprises a second orifice and a third orifice.

9. The apparatus of claim 1, wherein the particle dispensing unit is configured to receive a signal related to the particle attribute and, responsive to the signal, modulate the particle attribute or the process parameter.

10. The apparatus of claim 1, wherein the conditioning chamber comprises, in a direction of fluid flow through the apparatus, at least one of (i) a proximal subcomponent and (ii) a distal subcomponent.

11. The apparatus of claim 1, wherein the conditioning chamber comprises a funnel element that has an inner surface that is configured to:

(i) minimize swirling of particles within the funnel element at a predetermined residence time; and/or (ii) cause particles to transit the funnel element substantially along a predetermined path through the funnel element at a predetermined rate.

12. The apparatus of claim 1, wherein the conditioning chamber comprises a first fluid outlet port.

13. The apparatus of claim 1, wherein the apparatus is configured such that responsive to a signal, the first fluid can be supplied through the first fluid inlet port.

14. The apparatus of claim 1, further comprising a first fluid reservoir in fluid connection with the conditioning chamber and a pump for moving the first fluid from the first-fluid reservoir to the conditioning chamber.

15. The apparatus of claim 1, configured such that the particles dispensed from the particle dispensing unit enter the conditioning chamber through a receiving portal.

16. The apparatus of claim 1, wherein the conditioning chamber comprises a sensor which monitors a condition of the first fluid and transmits a signal related to the condition of the first fluid, and a controller which responds to the signal.

17. The apparatus of claim 1, wherein the orifice and the receiving surface of the first fluid are disposed within a housing wherein the housing comprises a port in gaseous connection with a source of gas and the housing is configured such that the distance between the receiving surface and the orifice can be modulated by increasing or decreasing a pressure within the housing.

18. The apparatus of claim 1, wherein the exchange unit comprises:

(i) an exchange unit inlet portal configured to receive inlet flow of a fluid comprising first fluid and conditioned particles;

(ii) an exchange unit exit portal configured to allow a fluid comprising a second fluid and conditioned particles and having a reduced level of first fluid or a component thereof, to exit the exchange unit;

(iii) a first fluid exit portal configured to allow exit from the exchange unit of the first fluid in which a concentration of conditioned particles has been reduced; and (iv) a second fluid supply portal configured to allow a second fluid to enter the exchange unit;

wherein the exchange unit is configured to allow:

a flow of fluid comprising first fluid and conditioned particles to flow into the exchange unit through the exchange unit inlet portal and to impinge on a flow of second fluid, flowing into the exchange unit through the second fluid supply portal and produce a post-impingement flow comprising the second fluid and conditioned particles and having the reduced level of first fluid or a component thereof to flow through the exchange unit exit portal.

19. The apparatus of claim 1, wherein the exchange unit is configured such that an interface is formed between the first fluid flowing through the exchange unit and a second fluid flowing through the exchange unit.

20. The apparatus of claim 1, wherein the exchange unit comprises:
a conditioning fluid exit portal configured to allow exit from the exchange unit of the conditioning fluid in which a concentration of particles has been reduced;

a subsequent conditioning fluid supply portal configured to allow a subsequent conditioning fluid to enter the exchange unit; and a filter element which hinders the passage of particles through the conditioning fluid exit portal.

21. The apparatus of claim 4, wherein the collection chamber comprises an inlet port and a fluid runoff port toward an upper end of the collection chamber, and a lower end configured to retain conditioned particles; and, at least one of:

the collection chamber is configured to receive particles and hold them in enough fluid to allow for suspension, the collection chamber is sterile and free from leaks, the collection chamber is configured to be maintained sealed from atmospheric pressure or vented to atmosphere through a sterile filter; and the collection chamber includes sensors or probes to monitor Ba, Ca, pH, pressure, or temperature.

22. The apparatus of claim 1, configured to separate a first particle of a first class of particle from a second particle of a second class of particle by size after dispensation but prior to impinging on the receiving surface of the conditioning fluid.

23. The apparatus of claim 1, which comprises the capture element configured such that a second class particle impinges on the capture element and does not impinge on the receiving surface of the first fluid.

24. The apparatus of claim 23, wherein the capture element comprises a conical member configured to collect second class particles and a diverter located along the conditioning chamber.

25. The apparatus of claim 1, wherein the apparatus comprises a housing configured to allow a differential to be maintained between a pressure at the surface of conditioning fluid disposed in the conditioning chamber and ambient pressure and a heating/cooling unit.

26. The apparatus of claim 1, comprising a sensor for detecting the particles and/or monitoring at least one of pressure, temperature, voltage, or another property and a processing unit configured to receive an input from the sensor and transmit an output signal to another component of the apparatus.

27. A method of making a plurality of conditioned particles comprising:

pumping at least two particle forming fluids to a dispensing port;

causing each particle to move from the dispensing port towards a receiving surface of a first conditioning fluid in a conditioning chamber;

at least one of: i) separating particles from one another based on a property of the particles, ia) separating a particle of a first class from a particle of a second class after particle dispensation but prior to the dispensed particles impinging on the receiving surface of the first conditioning fluid disposed in the conditioning chamber, and comprises a capture element disposed between the dispensing port and the receiving surface and configured and to hinder a second class particle from impinging on the receiving surface of the first conditioning fluid; or ib) filtering particles received by the conditioning fluid;

ii) receiving a signal and responsive to the signal modulating a process parameter or a particle parameter, iia) responsive to the signal modulating a field through which the particles pass;

iib) sensing a distance from the dispensing port to the receiving surface of the conditioning fluid in the conditioning chamber;

iii.) sensing a parameter;

iv) modulating a distance between the receiving surface of the first conditioning fluid and the dispensing port by modulating a volume of a displacement entity in the conditioning chamber;

v) directing flow of a received particle;

vi) introducing a first fluid through a first fluid inlet port into the conditioning chamber;

vii) providing a substantially linear path for conditioned particles transiting the conditioning chamber such that a residence time of conditioned particles in the conditioning chamber are substantially similar;

viii) separating conditioned particles from the first conditioning fluid in an exchange unit;

ix) providing a plurality of exchange units connected in series; or x) maintaining sterility of the dispensing port, and the receiving surface of the conditioning fluid.

28. The method of claim 27, wherein the particle comprises a first compartment and a second compartment.

29. A preparation of particles prepared by the apparatus of claim 1.

* * * * *